US008345648B2

(12) United States Patent
Mukai et al.

(10) Patent No.: US 8,345,648 B2
(45) Date of Patent: Jan. 1, 2013

(54) WIRELESS BASE STATION, WIRELESS COMMUNICATION TERMINAL, AND WIRELESS COMMUNICATION SYSTEM

(75) Inventors: Tsutomu Mukai, Osaka (JP); Hitoshi Takai, Osaka (JP)

(73) Assignee: Panasonic Corporation, Osaka (JP)

( * ) Notice: Subject to any disclaimer, the term of this patent is extended or adjusted under 35 U.S.C. 154(b) by 436 days.

(21) Appl. No.: 12/504,806

(22) Filed: Jul. 17, 2009

(65) Prior Publication Data

US 2010/0027522 A1 Feb. 4, 2010

(30) Foreign Application Priority Data

Jul. 22, 2008 (JP) ................................. 2008-189049

(51) Int. Cl.
*H04W 48/08* (2009.01)
*H04W 12/08* (2009.01)
*H04L 12/26* (2006.01)

(52) U.S. Cl. ........ 370/338; 370/328; 370/252; 370/401; 726/4

(58) Field of Classification Search .................. 370/328, 370/338, 412, 252, 312, 432, 401; 726/26–28; 713/170, 176; 709/225
See application file for complete search history.

(56) References Cited

U.S. PATENT DOCUMENTS

| 7,792,128 | B2 * | 9/2010 | Batz et al. ...................... 370/401 |
| 7,962,154 | B2 * | 6/2011 | Nakakita et al. ............ 455/456.1 |
| 2003/0166397 | A1 * | 9/2003 | Aura ............................... 455/410 |
| 2005/0118997 | A1 | 6/2005 | Wu et al. |
| 2005/0148322 | A1 * | 7/2005 | Jei ................................. 455/412.1 |
| 2005/0172117 | A1 * | 8/2005 | Aura .............................. 713/155 |
| 2006/0121918 | A1 * | 6/2006 | Nakakita et al. .............. 455/458 |
| 2007/0053332 | A1 * | 3/2007 | Kashiwagi et al. ........... 370/338 |
| 2007/0149173 | A1 * | 6/2007 | Jeon ............................... 455/411 |
| 2007/0150732 | A1 * | 6/2007 | Suzuki et al. ................. 713/168 |
| 2008/0123543 | A1 * | 5/2008 | Do et al. ........................ 370/252 |
| 2009/0070863 | A1 * | 3/2009 | Shimizu et al. ................... 726/7 |
| 2009/0298515 | A1 * | 12/2009 | Czaja et al. ................ 455/456.5 |

FOREIGN PATENT DOCUMENTS

| JP | 10-200493 | 7/1998 |
| JP | 2002-186024 | 6/2002 |
| JP | 2003-008642 | 1/2003 |
| JP | 2003-091467 | 3/2003 |
| JP | 2003-199171 | 7/2003 |
| JP | 2004-48395 | 2/2004 |
| JP | 2006-287767 | 10/2006 |
| JP | 2007-310738 | 11/2007 |
| WO | 2007/099414 | 9/2007 |

* cited by examiner

*Primary Examiner* — Kwang B Yao
*Assistant Examiner* — Candal Elpenord
(74) *Attorney, Agent, or Firm* — Wenderoth, Lind & Ponack, L.L.P.

(57) ABSTRACT

A wireless communication system transmits information requested by a wireless communication terminal to the wireless communication terminal moving through a spot wireless area. In a wireless base station, an external information communication control section controls communication with a server. A contents memory stores at least a part of contents received from the server. A wireless communication section communicates with the communication terminal using a predetermined communication method. A control section establishes connection with the communication terminal using a first connection which does not require an authentication procedure, or using a second connection which requires the authentication procedure. An access control (restriction) section permits access from the communication terminal to the contents memory and prohibits access to the server when a type of connection is the first connection, and permits access from the communication terminal to the contents memory and to the server in the case of the second connection.

17 Claims, 42 Drawing Sheets

F I G. 2
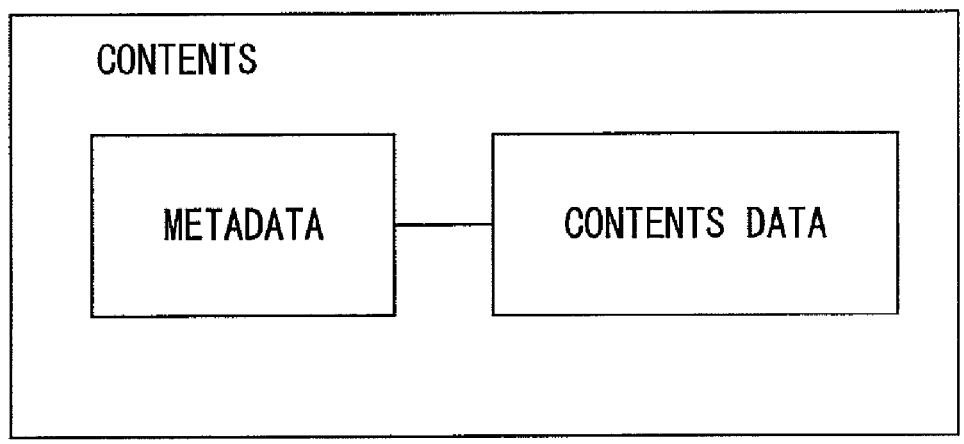

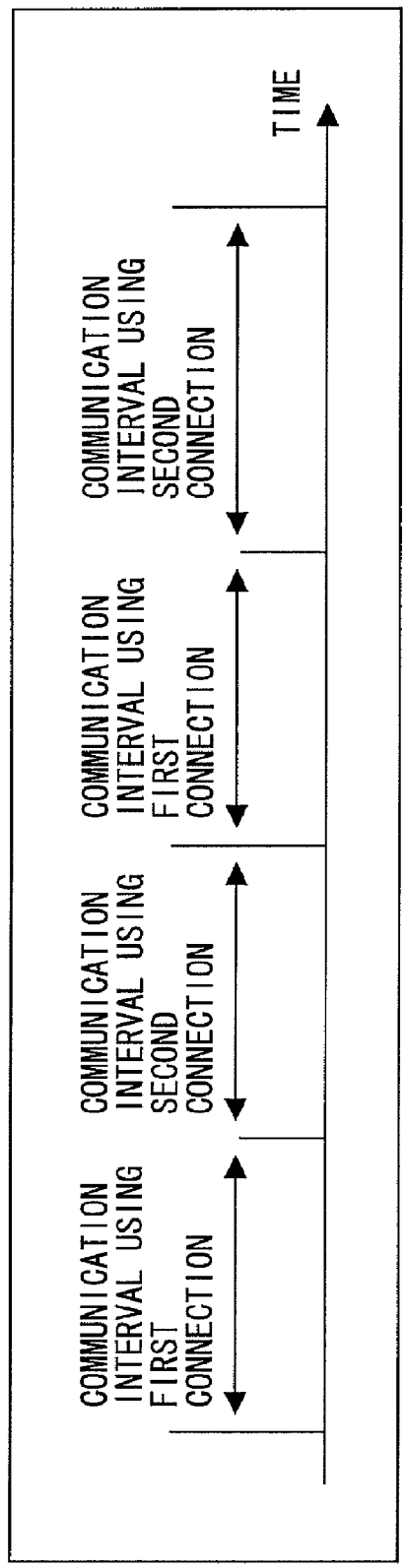
F I G. 7

FIG. 16

| CONTENTS \ TAG | NEWS | COUPON | RESTAURANT | ENTERTAINMENT |
|---|---|---|---|---|
| NEWS | O | | | |
| MOVIE INFORMATION | O | | | O |
| A CLOTHING STORE INFORMATION | | O | | |
| B RESTAURANT INFORMATION | | O | O | |
| C RESTAURANT INFORMATION | | O | O | |
| D MUSEUM INFORMATION | | | | O |
| E MOVIE THEATER INFORMATION | | | | O |

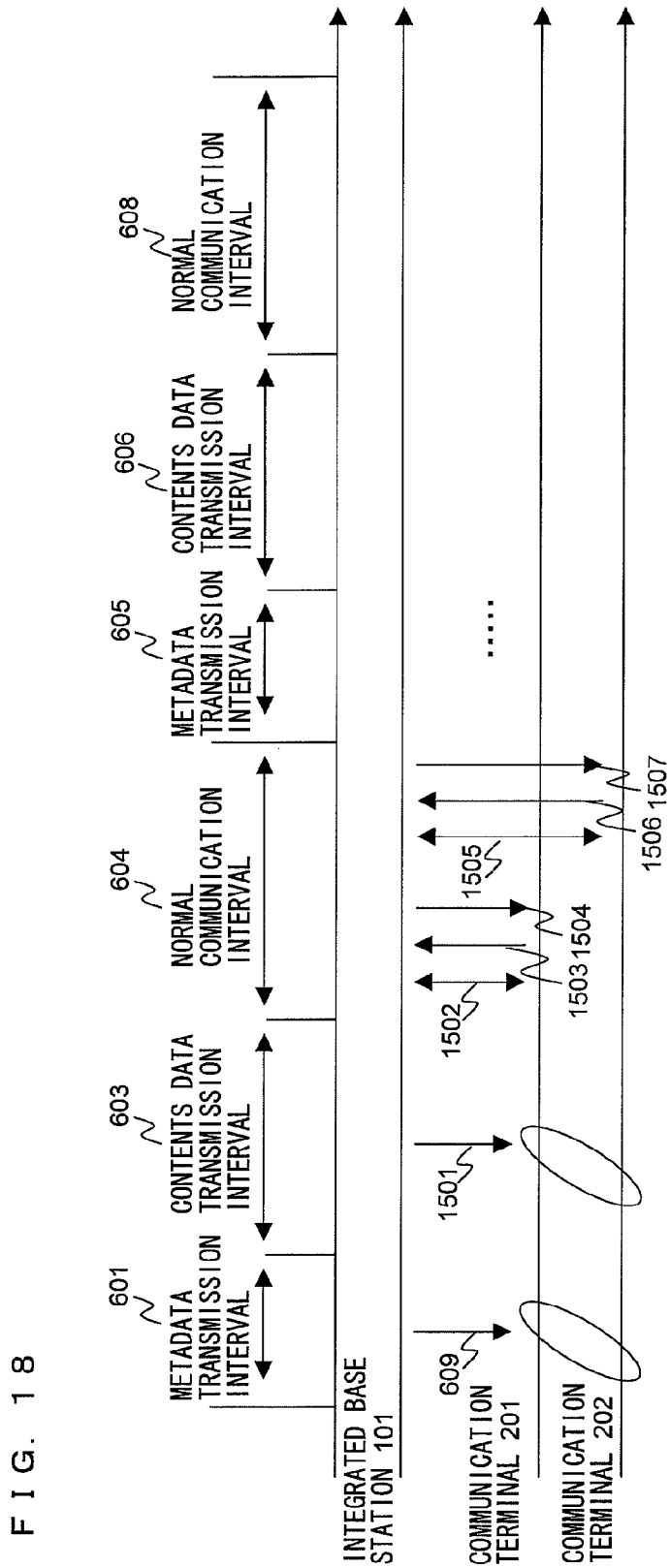

F I G. 1 9 A
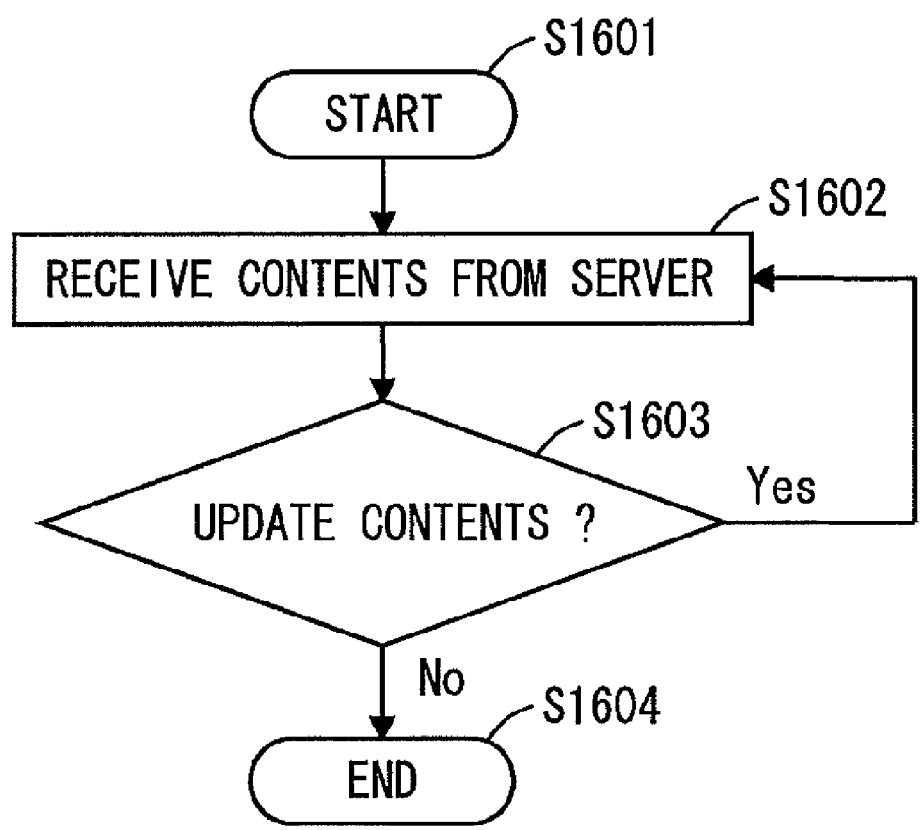

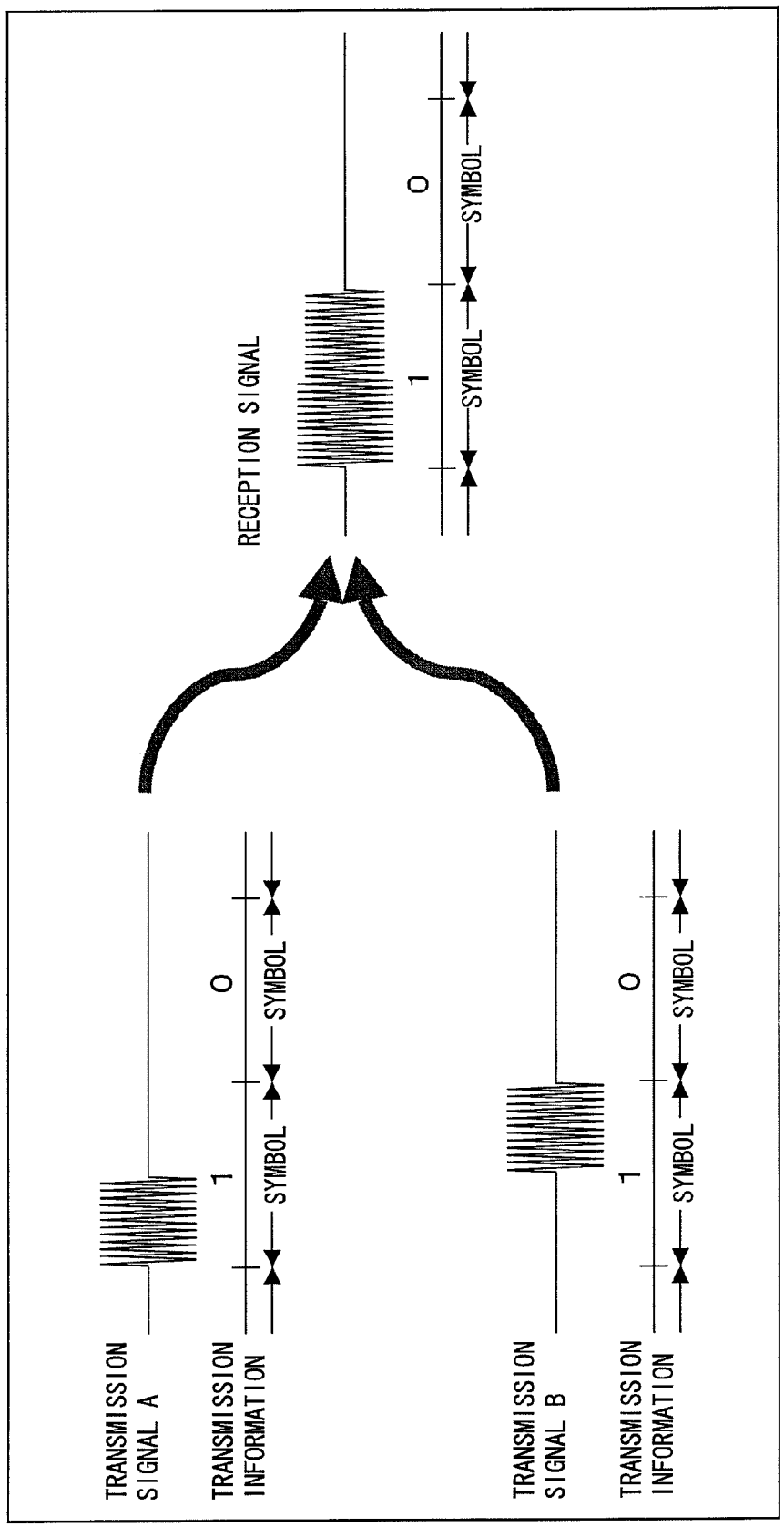

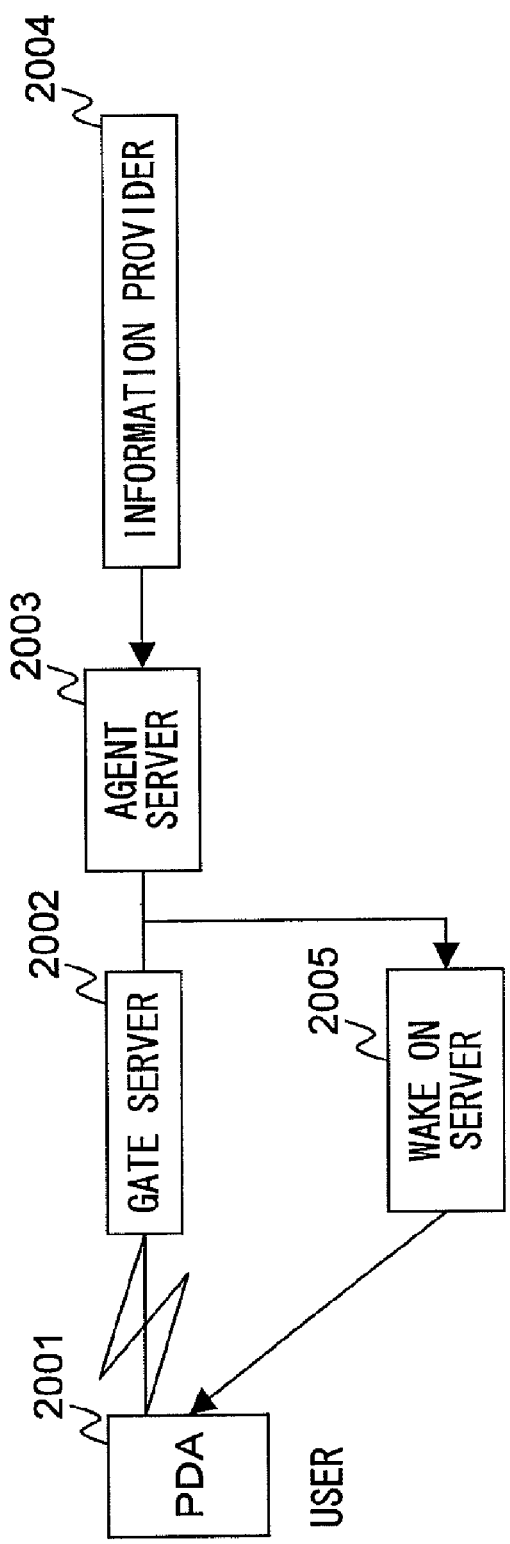
F I G. 4 0    PRIOR ART

WIRELESS BASE STATION, WIRELESS COMMUNICATION TERMINAL, AND WIRELESS COMMUNICATION SYSTEM

BACKGROUND OF THE INVENTION

1. Field of the Invention

The present invention relates to a wireless base station, a wireless communication terminal, and a wireless communication system, and more particularly to a wireless base station, a wireless communication terminal that establishes connection with the wireless base station, and a wireless communication system which perform communication in a spot communication area.

2. Description of the Related Art

In recent years, portable equipment equipped with a communication function that meets the IEEE802.11 standard (hereinafter referred to as a wireless LAN communication function) is increasingly becoming widespread. In addition, an area of use is not limited to an office or a house, but areas usable as a so-called hotspot are rapidly increasing outdoors, although the area is an isolated spot communication area. In response to this, wireless LAN is not only limitedly mounted on such apparatuses as a personal computer or office equipment, but is also mounted to various apparatuses, including household electrical appliances. Particularly, the wireless LAN is increasingly used in various portable-type or in-vehicle type apparatuses such as a mobile phone.

In the IEEE802.11 standard, in order to establish connection between a communication terminal and a wireless LAN base station, the following basic process is required. First, the communication terminal scans all communication channels so as to receive beacons periodically sent by wireless LAN base stations. Next, the communication terminal specifies communication channels of the wireless LAN base stations, determines a wireless LAN base station desired to be connected, and decides whether or not connection with the wireless LAN base station is permissible by using an identifier, called an SSID (Service Set Identifier). When connection is permissible, a communication path between the wireless LAN base station and the communication terminal is encrypted by using an encryption format typified by a WEP (Wired Equivalent Privacy), and a WPA (Wi-Fi Protected Access). Upon completion of recognition and encryption, the communication terminal finally becomes capable of starting communication with the wireless LAN base station.

In this manner, the IEEE802.11 standard has a feature that communication is started upon completion of a series of connection processes including communication channel scanning, detection of a wireless LAN base station, authentication, and encryption. Two modes are defined as communication methods, that is, a unicast mode in which information is transmitted to specific communication terminals only by registering addresses of the communication terminals as destinations of communication packets; and a broadcast mode in which information is transmitted to an indefinite number of communication terminals by registering a broadcast address as the destination.

In the future, as a service using a wireless LAN-mounted apparatus, it is expected that a service having the following system will be increasingly widely used. That is, wireless LAN base stations are located outdoors, and when a communication terminal passes through a spot communication area of one of the wireless LAN base stations, information is transmitted/received between the communication terminal and the wireless LAN base station. In the future, the communication terminal will not be merely used in a semi-fixed state, but will be used during walking. In addition, it is expected that the communication terminal will be increasingly used for high-speed movement such as movement by bus or by train, or used for a car navigation system equipped with a wireless LAN communication function. As the movement speed of the communication terminal is increased, there is need for reduction in time elapsing from start of communication between the communication terminal and the wireless LAN base station to reception of contents from a server by the communication terminal, in addition to reduction in time necessary for a user operation. For example, many communication terminals are connected to a wireless LAN wireless base station, a limited communication band is shared by a plurality of communication terminals, and consequently a communication rate for each communication terminal is lowered. As a result there may be a case where a communication terminal hardly transmits/receive information during passing through a spot communication area.

It is expected that the number of communication terminal users will be increased. Moreover, it is expected that data transmitted between an individual communication terminal and a wireless LAN base station will be dominated by such data having large capacity as audio data and visual data rather than text only data. In order for a plurality of communication terminals to receive such information during passing through the spot communication area, it has been needed a communication method that exerts superior transmission efficiency.

Various countermeasures have been considered against the above-described problem. For example, disclosed in Japanese Laid-Open Patent Publication No. 2004-048395 (hereinafter, referred to as Patent Document 1) is a portable information terminal wireless LAN service so as to provide a system that distributes information to a portable information terminal passing through a communication area of a wireless LAN base station. FIG. 40 is a block diagram illustrating a configuration of a conventional portable information terminal wireless LAN service system disclosed in patent document 1. In FIG. 40, suppose that a portable information terminal (PDA) 2001 is owned by a user who, in advance, subscribes to an information service through a mobile phone, a PHS, or the like.

The PDA 2001 has a WOR (Wake-on Ring: automatic activation) function, and in addition, has a wireless LAN client software installed thereon. An information provider 2004 is connected to a wake-on server 2005 and a gate server 2002 which are controlled by an agent server 2003. In a spot communication area where information is provided, a wireless LAN base station (not shown) is located so as to perform data transmission/reception with a PDA 2001 owned by a user. When a user owning the PDA 2001 passes through the spot communication area, the wake-on server 2005 causes client software of the PDA 2001 to start. The client software of the PDA 2001 is connected to the gate server 2002 via the wireless LAN base station, and information distributed from the information provider 2004 is stored in a memory of the PDA 2001.

However, even if the technology disclosed in Patent Document 1 is used, when it is assumed that a communication terminal moves in a spot communication area or the like at a high speed, time taken by the communication terminal to receive contents has not been sufficiently reduced. In Patent Document 1, by having the client software started by the wake-on server 2005, the user operation necessary for connection to the wireless LAN base station has been improved. However, whether or not the communication terminal has improved communication efficiency and whether or not time elapsed until the contents are received are not described therein.

As to the improvement in the communication efficiency, as described above, the broadcast mode is defined under the IEEE802.11 standard, and it is possible to transmit information simultaneously to a plurality of communication terminals. When the broadcast mode of the wireless LAN is used, the information transmission efficiency is improved, however, the base station is to transmit the same information to the plurality of communication terminals regardless of whether or not the communication terminals have requested for such transmission. Since memory capacity of the base station is limited, there is a possibility that contents desired by a communication terminal will not be transmitted thereto. On the other hand, since information requested by an indefinite number of communication terminals is transmitted, unnecessary pieces of information are also broadcasted. As a result, efficiency for transmitting a piece of information requested by a communication terminal is lowered.

BRIEF SUMMARY OF THE INVENTION

Therefore, an object of the present invention is to solve the above-described conventional problems, and to provide: a wireless base station, which is capable of efficiently transmitting information to a wireless communication terminal moving and passing through a spot communication area at a high speed, the information being requested by the wireless communication terminal, by using broadcasting and communication in a combined manner, and is consequently capable of transmitting/receiving a large amount of information; a wireless communication terminal that establishes connection with the wireless base station; and a wireless communication system.

The present invention is directed to a wireless base station connected to a server that distributes contents and to at least one wireless communication terminal. To achieve the above-described object, the wireless base station of the present invention includes: an external communication control section that controls communication with the server; a contents memory section that stores at least a part of the contents received from the server; an access restriction section that monitors a type of connection with the wireless communication terminal, and restricts access for connection from the wireless communication terminal to the server or to the wireless base station; a wireless communication section that communicates with the wireless communication terminal in accordance with a predetermined communication method; and a control section that controls the wireless communication section. The control section controls the wireless communication section, and establishes connection with the wireless communication terminal by using a first connection which does not substantially require an authentication procedure for connection with the wireless communication terminal, or by using a second connection which requires the authentication procedure for connection with the wireless communication terminal. The access control (restriction) section permits access from the wireless communication terminal to the contents memory section and prohibits access from the wireless communication terminal to the server when the type of connection with the wireless communication terminal is the first connection, and permits access from the wireless communication terminal to both of the contents memory section and the server when the type of connection is the second connection.

Preferably, the contents memory section stores therein frequently requested contents data that is frequently requested from the wireless communication terminals, and individually requested contents data that is less frequently requested as compared to the frequently requested contents data. In this case, an interval of the first connection includes a frequently requested contents data broadcasting interval and an individual contents data broadcasting interval. The control section controls the wireless communication section, and broadcasts collectively, to the wireless communication terminal, the frequently requested contents data in the frequently requested contents data broadcasting interval, and transmits the individually requested contents data, which is requested by the wireless communication terminal, in the individual contents data broadcasting interval.

The contents memory section further stores therein metadata relating to the frequently requested contents data and to the individually requested contents data. In this case, the control section controls the wireless communication section, and transmits the metadata to the wireless communication terminals before the first connection is established, and receives contents data request packets from the wireless communication terminals in the interval of the first connection.

Further, the contents memory section stores therein frequently requested contents data that is frequently requested from the wireless communication terminal, and individually requested contents data that is less frequently requested as compared to the frequently requested contents data. In this case, the control section may control the wireless communication section, and collect together and broadcast, to the wireless communication terminals, the frequently requested contents data before the first connection is established, and transmit the individually requested contents data, which is requested by the wireless communication terminals, in the interval of the first connection.

Preferably, the contents memory section further stores therein metadata relating to the frequently requested contents data and the individually requested contents data. In this case, the control section controls the wireless communication section, and transmits the metadata to the wireless communication terminal before collecting together and broadcasting, to the wireless communication terminals, the frequently requested contents data, and receives contents data request packets from the wireless communication terminals in the interval of the first connection.

The contents memory section may partly interchange the frequently requested contents data and the individually requested contents data with each other in accordance with frequency of requests from the wireless communication terminals.

Preferably, the control section omits the authentication procedure in the predetermined communication method in the case of using the first connection for connection with the wireless communication terminals, and executes the authentication procedure in the predetermined communication method in the case of using the second connection for connection with the wireless communication terminals.

The contents memory section stores therein contents that are not subjected to access restriction.

The wireless base station may include a plurality of antennas. In this case, a plurality of wireless areas covered by the plurality of antennas are arranged so as to be at least partially overlapped with one another. Further, the contents memory section stores therein frequently requested contents data that is frequently requested by the wireless communication terminals, and individually requested contents data that is less frequently requested as compared to the frequently requested contents data. In the case of contents transmission to the wireless communication terminals, the wireless communication section: transmits the frequently requested contents data to the wireless communication terminals from the plurality of antennas; and transmits the individually requested contents data to a certain wireless communication terminal via a corresponding antenna among the plurality of antennas, the antenna having received a request from the wireless communication terminal.

Preferably, the wireless communication section includes: a first wireless communication section that communicates with the wireless communication terminals in accordance with a first wireless communication method; and a second wireless communication section that communicates with the wireless communication terminals in accordance with a second wireless communication method. Prior to the first wireless communication section starting communication with the wireless communication terminals, the control section controls the second wireless communication section, and transmits, to the wireless communication terminals, profile information that is necessary for the first wireless communication section to communicate with the wireless communication terminals.

The wireless base station may include at least one antenna for the first wireless communication section and a plurality of antennas for the second wireless communication section. In this case, a wireless area covered by the antenna for the first wireless communication section and wireless areas covered by the antennas for the second wireless communication section are arranged so as to be at least partially overlapped with one another.

Further, wireless base station may include a plurality of antennas for the first wireless communication section and at least one antenna for the second wireless communication section. In this case, wireless areas covered by the antennas for the first wireless communication section and a wireless area covered by the antenna for the second wireless communication section are arranged so as to be at least partially overlapped with one another.

Further, the present invention is directed to a wireless base station transmitting a signal to wireless communication terminals. The wireless base station of the present invention includes: a plurality of antennas; and a wireless communication section that communicates with the wireless communication terminals by using the plurality of antennas in accordance with a predetermined communication method. A plurality of wireless areas covered by the plurality of antennas are arranged so as to be at least partially overlapped with one another. The wireless communication section divides one information symbol into a first half portion and a latter half portion in transmitting a signal to the wireless communication terminals, and transmits the former half portion and the latter half portion including high-frequency signals, separately, via the plurality of antennas as individual signals.

Further, the present invention is directed to a wireless communication terminal connected, via a wireless base station, to a server that distributes contents. In order to achieve the above object, the wireless communication terminal of the present invention includes: a wireless communication section that communicates with the wireless base station in accordance with a predetermined communication method; a control section that controls the wireless communication section; and a terminal control section that controls transmission of information on a contents request to the wireless base station. The control section controls the wireless communication section, and establishes connection with the wireless communication terminal by using a first connection which does not require an authentication procedure for connection with the wireless communication terminal, or by using a second connection which requires the authentication procedure for connection with the wireless communication terminal.

The wireless communication section receives metadata relating to contents from the wireless base station. The terminal control section establishes connection with the wireless base station by using the first connection, and transmits a contents data request packet to the wireless base station to request for contents data desired to be received, among the received metadata.

Preferably, the wireless communication terminal further includes a control-wireless communication section that performs communication in accordance with a control-wireless communication method. In this case, the control section controls the control-wireless communication section prior to communication between the wireless base station and the wireless communication section, and obtains setting information so that the wireless base station and the wireless communication section performs communication in accordance with the predetermined communication method.

Further, the present invention is directed to a method implemented by the above-described wireless base station and the wireless communication terminal.

According to the present invention, it is possible to provide a wireless base station, which is capable of improving efficiency in transmitting information to wireless communication terminals passing through a wireless spot communication area, so as to perform transmission/reception of a large amount of information, a wireless communication terminal connected to the wireless base station, and a wireless communication system. That is, it is possible for the wireless communication terminal to reduce time elapsing until receiving contents since the wireless base station caches contents information. Further, the wireless base station does not cache all pieces of information, but caches a statistical result of requests by a communication terminal, and only such information that is to be transmitted preferentially. Accordingly, a memory capacity can be saved. Further, the present invention has a configuration in which information frequently requested by communication terminals is recognized, and contents thereof is broadcasted in a fixed manner, whereas information of individually requested contents data is interchanged and transmitted in accordance with a request from the communication terminals. Accordingly, the base station is required to interchange a transmission queue less frequently, and consequently, process time for transmission frame generation is reduced. Therefore, the transmission efficiency is improved, and as a result, time elapsed until the wireless terminals receive contents can be reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing exemplary contents data;

FIG. 7 is a conceptual diagram showing a transmission sequence transmitted from the integrated base station 101 according to embodiment 1 of the present invention;

FIG. 16 is a diagram showing exemplary tags;

FIG. 18 is a diagram showing a detailed transmission sequence of data transmitted between the integrated base station 101 and the communication terminals 201 and 202;

FIG. 19A is a diagram showing a process flow in the case where a contents memory 11 in the integrated base station 101 is updated;

FIG. 22 is a diagram showing a transmission sequence of data transmitted/received between an integrated base station 101a and a communication terminals 201a and 202a;

FIG. 27 is a diagram showing a detailed transmission sequence of data transmitted/received between the integrated base station 101a and the communication terminals 201a and 202a;

FIG. 28 is a diagram showing a flowchart of the integrated base station 101a;

FIG. 29 is a diagram showing a flowchart of the communication terminal 201a;

FIG. 36D is a schematic diagram illustrating signals which are transmitted simultaneously and are combined on a reception side;

FIG. 40 is a block diagram showing a configuration of a conventional wireless communication system.

DETAILED DESCRIPTION OF THE INVENTION

Hereinafter, respective embodiments of the present invention will be described with reference to drawings. Generally, in a wireless LAN format, communication between a wireless LAN base station and a communication terminal may be started only after completion of authentication and encryption, which are connection procedures necessary to perform in advance. In this situation, a connection which does not require authentication information such as a password before start of communication and which allows any communication terminal to communicate with a base station without substantially requiring authentication procedures is referred to as a first connection, whereas a connection, which requires the authentication procedures requiring authentication information such as the password is referred to as a second connection.

Embodiment 1

Figure 1:
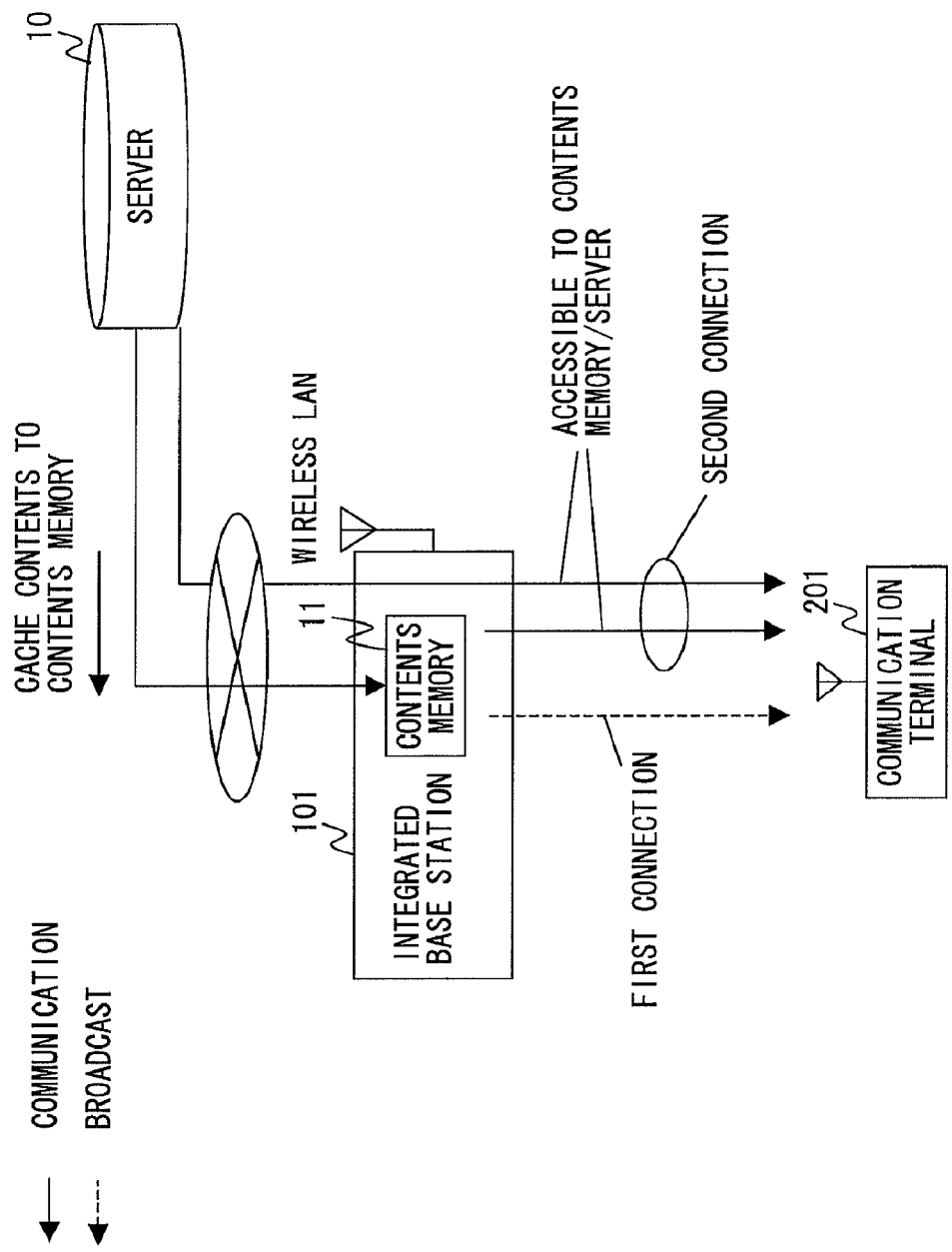
FIG. 1 is a schematic view illustrating an overall configuration of a wireless communication system according to embodiment 1 of the present invention.

FIG. 1 is a schematic view illustrating an overall configuration of a wireless communication system according to embodiment 1 of the present invention. In FIG. 1, the wireless communication system includes an integrated base station (wireless base station) 101, a wireless communication terminal (hereinafter simply referred to as communication terminal) 201, and a server 10. The integrated base station 101 is connected to the server 10, which is capable of distributing information relating to various kinds of contents, by using wireless or wired communication. The integrated base station 101 includes thereinside a contents memory 11 for storing therein contents. Further, the integrated base station 101 is capable of mutually communicating with the server 10, and has a function of caching the contents received from the server 10 into the contents memory 11.

The communication terminal 201 is a communication terminal capable of receiving information while being moved, and is typified by a portable terminal, a PDA, a car navigation device, a PND (Personal Navigation Device) that is a portable car navigation device, and the like, which are hereinafter collectively referred to as a communication terminal. The communication terminal 201 establishes connection with the integrated base station 101 by using a predetermined communication method (typically, a wireless LAN communication), and in accordance with the connection method, accessible information is restricted. In other words, when the integrated base station 101 is connected to the communication terminal 201 by using the first connection, the communication terminal 201 is able to receive information from the contents memory 11 only. On the other hand, when the integrated base station 101 is connected to the communication terminal 201 by using the second connection, the communication terminal 201 is able to receive information from the contents memory 11 as well as from the server 10.

In the following description, an exemplary case where the communication terminal 201 and the integrated base station 101 are connected to each other by using the wireless LAN communication will be described. The present invention, however, is applicable to all communication methods in which the integrated base station 101 and the communication terminal 201, which transmit and receive contents, operate independently of each other, and are capable of performing spot communication. Therefore, although the explanation will be based on the wireless LAN system for convenience, the present invention is not necessarily limited to the wireless LAN system. For example, a WiMAX in which stations are located so as to form a spot-type isolated wireless area, millimeter-wave communication in which communication is performed by using a millimeter wave, optical communication, and the like are also usable.

With reference to FIG. 2, a definition of contents will be described. The contents include metadata and contents data. The contents data indicates contents of information service, and the metadata indicates information relating to the contents data. When a television program is used as an example of contents, contents of a television program corresponds to the contents data, and genre information such as "news" and "sport", start time of a broadcast program, channel information, and the like correspond to the metadata.

Figure 3:
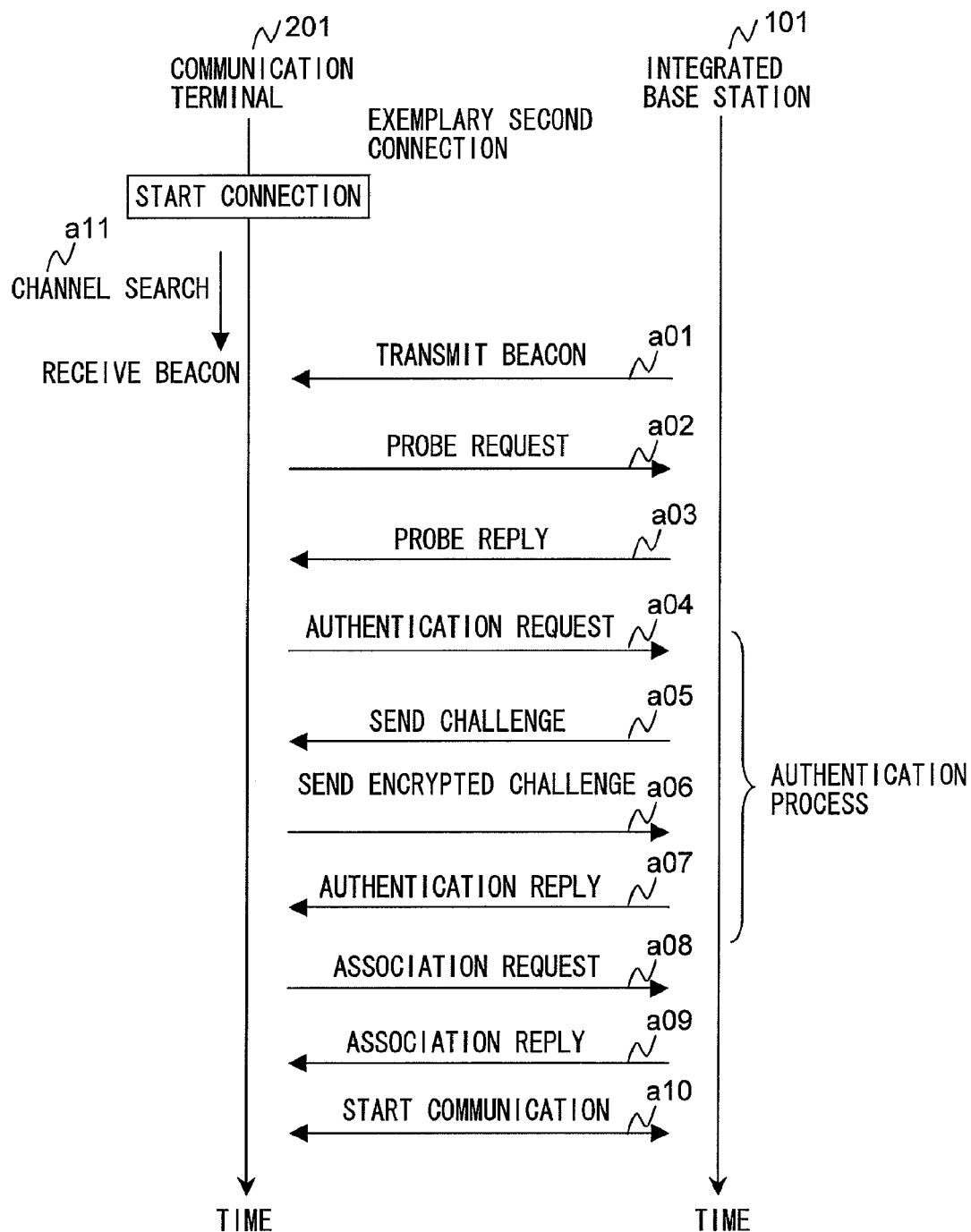
FIG. 3 is a diagram showing exemplary operations performed in a second connection process according to embodiment 1 of the present invention.
Figure 4:
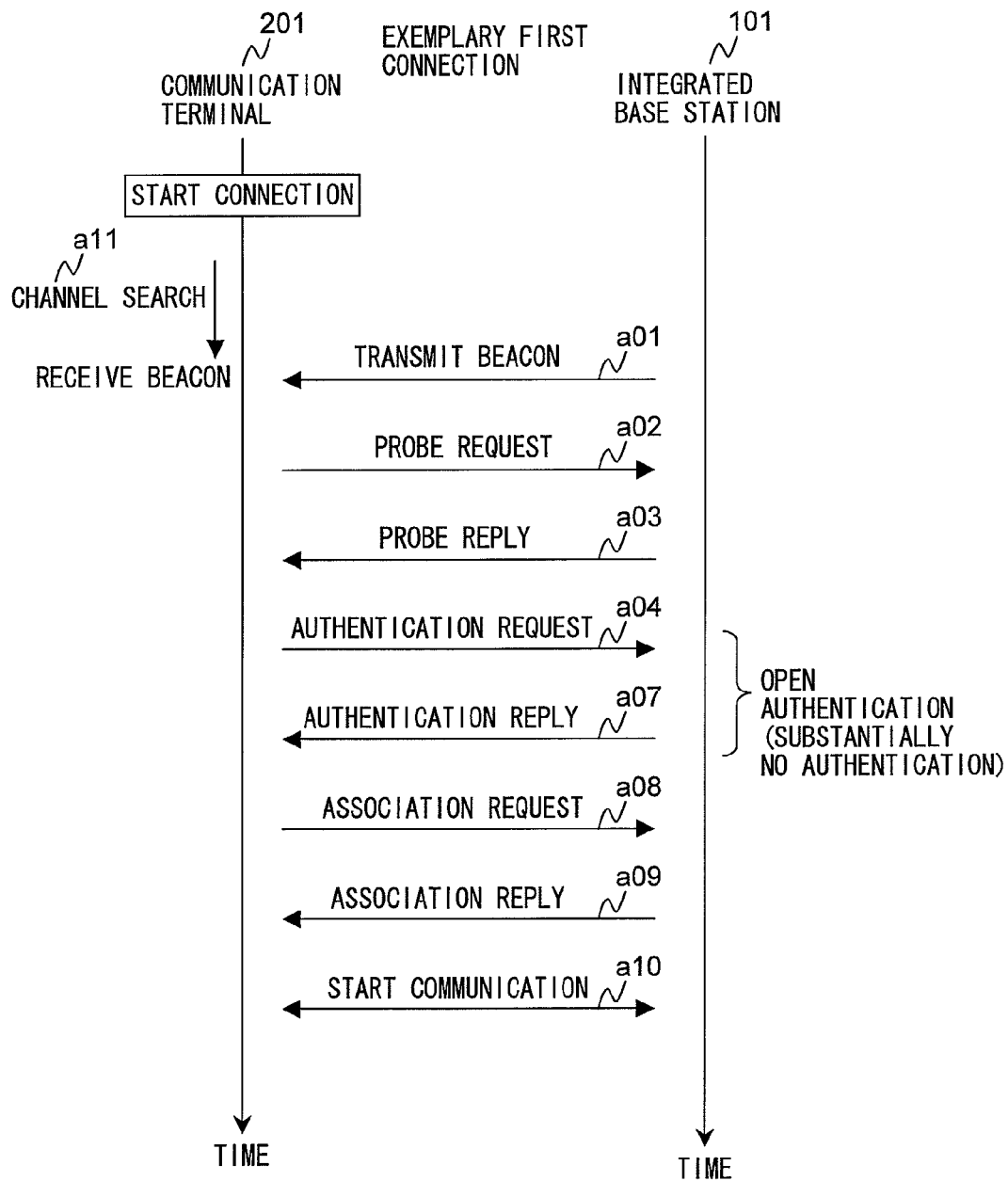
FIG. 4 is a diagram showing exemplary operations performed in a first connection process according to embodiment 1 of the present invention.

Further, with reference to FIGS. 3 and 4, the first connection and the second connection will be described. As shown in FIG. 3, the second connection is a mode in which the integrated base station 101 determines (authenticates) whether or not respective communication terminals 201 are permitted to be connected thereto. As shown in FIG. 4, the first connection is a mode in which the integrated base station 101 substantially permits all communication terminals 201 to be connected thereto (open authentication, substantially no authentication), and is designed to simplify a procedure performed by the integrated base station 101 for determining whether or not connection to the communication terminals 201 are permissible, and to reduce the time elapsing until start of communication between the communication terminals 201 and the integrated base station 101. Details will be described later.

First, the second connection that is a typical authentication process in the wireless LAN communication will be described. FIG. 3 is a sequence diagram illustrating a case where the communication terminal 201 is connected to the integrated base station 101 by using the second connection. As shown in FIG. 3, the communication terminal 201 first performs channel search in order to search for a communication channel of the integrated base station 101 (step a11). During the channel search, the communication terminal 201 monitors all channels for a predetermined period of time, and receives a beacon from the integrated base station 101, thereby confirming the presence of the integrated base station 101 having the channel.

The communication terminal 201 receives the beacon transmitted from the integrated base station 101 (step a01). The beacon includes an SSID transmitted from the integrated base station 101. The communication terminal 201 transmits, to the integrated base station 101, the SSID provided to the beacon, that is, a probe request for requesting start of connection (step a02). Upon reception of the probe request, the integrated base station 101 transmits a probe reply to the communication terminal 201 (step a03).

Next, the communication terminal 201 transmits an authentication request to the integrated base station 101 in order to obtain authentication permission from the integrated base station 101 (step a04). Upon reception of the authentication request, the integrated base station 101 performs a determination process for determining whether or not connection to the communication terminal 20 that has performed the authentication request is permissible. For example, in the wireless LAN communication, the determination process for connection permission is performed through an exchange of an encrypted message. Specifically, the integrated base station 101 transmits a random value called "challenge" to the communication terminal 201 (step a05).

Next, the communication terminal 201 encrypts the challenge by using an encryption key, and transmits the encrypted challenge response to the integrated base station 101 (step a06). Upon reception of the encrypted challenge response, the integrated base station 101 decodes the encrypted challenge, and when the decoded challenge corresponds to its original challenge, connection of the communication terminal 201 is permitted. Based on the series of procedures, the integrated base station 101 determines whether or not connection to the communication terminal 201 is permissible, and when the connection is permitted, the authentication response is transmitted to the communication terminal 201 (step a07).

In FIG. 3, an authentication operation for determining whether or not connection to the communication terminal 201 is permissible is referred to as an authentication process. In the authentication process, when the integrated base station 101 determines that connection is permissible, the communication terminal 201 performs an association request for establishing logical connection with the integrated base station 101 (step a08). On the other hand, the integrated base station 101 returns an association reply (step a09). Upon completion of association, the communication terminal 201 and the integrated base station 101 are able to start communication (step a10).

Next, FIG. 4 a sequence diagram showing a case where the communication terminal 201 is connected to the integrated base station 101 by using the first connection. In the first connection, unlike the second connection, upon reception of an authentication request from the communication terminal 201, the integrated base station 101 promptly returns an authentication response. In FIG. 4, authentication between the authentication request in step a04 and the authentication response in step a07 is referred to as an open authentication. The first connection is a simple connection method in which the authentication process of the second connection is replaced with the open authentication. Although the open authentication is referred to as "authentication", the integrated base station 101 promptly returns the authentication response upon reception of the authentication request, as above described, and thus permits connection of all communication terminals 201 substantially without authentication. Therefore, in the authentication process of the second connection shown in FIG. 3, the integrated base station 101 needs time for various significant processes for strictly determining whether or not connection with the communication terminal 201 is permissible. On the other hand, the first connection does not perform such processes, and thus it is possible to reduce time elapsing from start of connection to start of communication as compared to the second connection.

Figure 5:
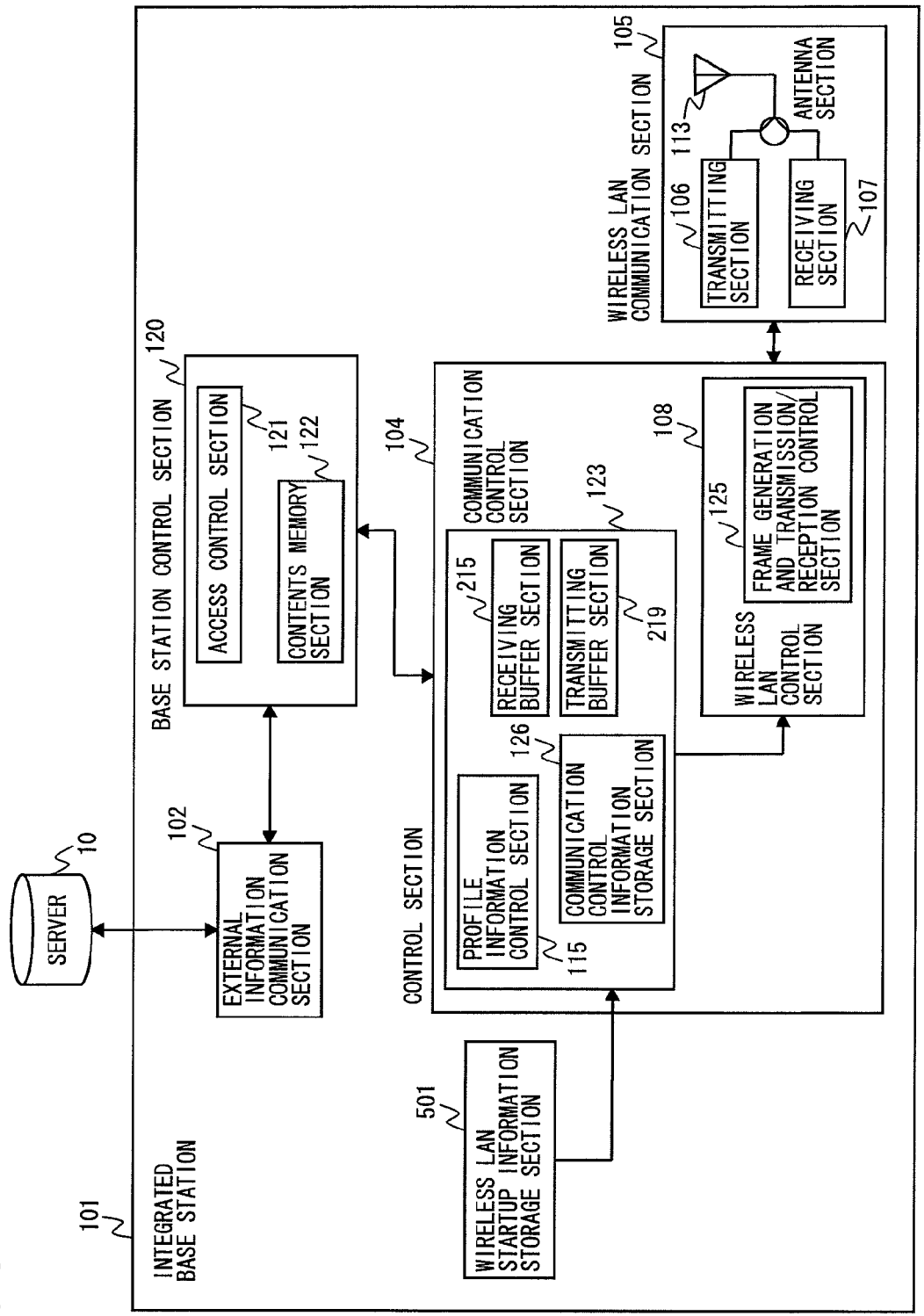
FIG. 5 is a block diagram showing an exemplary configuration of an integrated base station 101 according to embodiment 1 of the present invention.

FIG. 5 is a block diagram showing an exemplary configuration of the integrated base station 101 according to embodiment 1 of the present invention. As shown in FIG. 5, respective sections in the integrated base station 101 are connected via a system bus, and are capable of transferring data mutually. An external information communication section 102 transfers contents information from the server 10 to a memory section, or conversely transfers information from the memory section 103 to the server 10 by using a wired communication technology such as Ethernet (registered trademark) or the like.

Note that, in the present invention, the external information communication section 102 of the integrated base station 101 communicates with the server 10, and the communication need not be performed in a wired manner by using Ethernet (registered trademark), for example. Instead, communication with the server 10 may be performed by using a wireless LAN, an FWA (Fixed Wireless Access), and the like. Accordingly, flexibility in installing the integrated base station 101 can be improved.

The base station control section 120 includes an access restriction section 121 and a contents memory section 122. The access restriction section 121 monitors a connection type of the communication terminal 201 connected to the integrated base station 101, and permits access from the communication terminal 201 to the server 10 and the contents memory section 122 when the connection type is the second connection. On the other hand, when the connection type is the first connection, the access restriction section 121 prohibits access from the communication terminal 201 to the server 10, and only permits access therefrom to the contents memory section 122. The contents memory section 122 mainly caches highly public contents among contents included in the server 10. The highly public contents are, for example, town tourist information, store information, news information, whether information, traffic information, and the like. That is, the contents memory section 122 mainly stores therein contents which are not subjected to access restriction as a result of the authentication of the communication terminal 201. Further, in order to reduce the connection time, the contents memory section 122 may stores therein contents that are very frequently requested from the communication terminal 201.

A control section 104 includes a communication control section 123, and a wireless LAN control section 108. The communication control section 123 is a section for controlling the whole of the integrated base station 101, and includes a profile information control section 115, a communication control information storage section 126, a receiving buffer section 215, and a transmitting buffer section 219. The profile information control section 115 is designed to store therein information (profile information) necessary for the communication terminal 201 to establish connection through communication with the wireless LAN communication section 105.

Here, the profile information will be described. The profile information is a communication channel, identification information (e.g., BSSID), encryption information (e.g., a WEP key) and the like of the wireless LAN control section 108. The profile information is not limited to the above-described information as long as the information is designed to facilitate high-speed simple connection with the wireless LAN control section 108.

The communication control information storage section 126 stores therein an instruction set for controlling the wireless LAN control section 108. A receiving buffer section 215 is used for buffering information received by the wireless LAN control section 108. In a similar manner, the transmitting buffer section 219 is used for buffering information to be transmitted by using the wireless LAN control section 108.

The wireless LAN control section 108 is a section to control the wireless LAN, and includes a frame generation and transmission/reception control section 125. The wireless LAN communication section 105 includes a transmitting section 106, a receiving section 107, and an antenna section 113. A wireless LAN startup information storage section 501 has information for starting the wireless LAN communication section of the communication terminal 201, and attaches wireless LAN startup information to a packet to be transmitted to the communication terminal 201.

Figure 6:
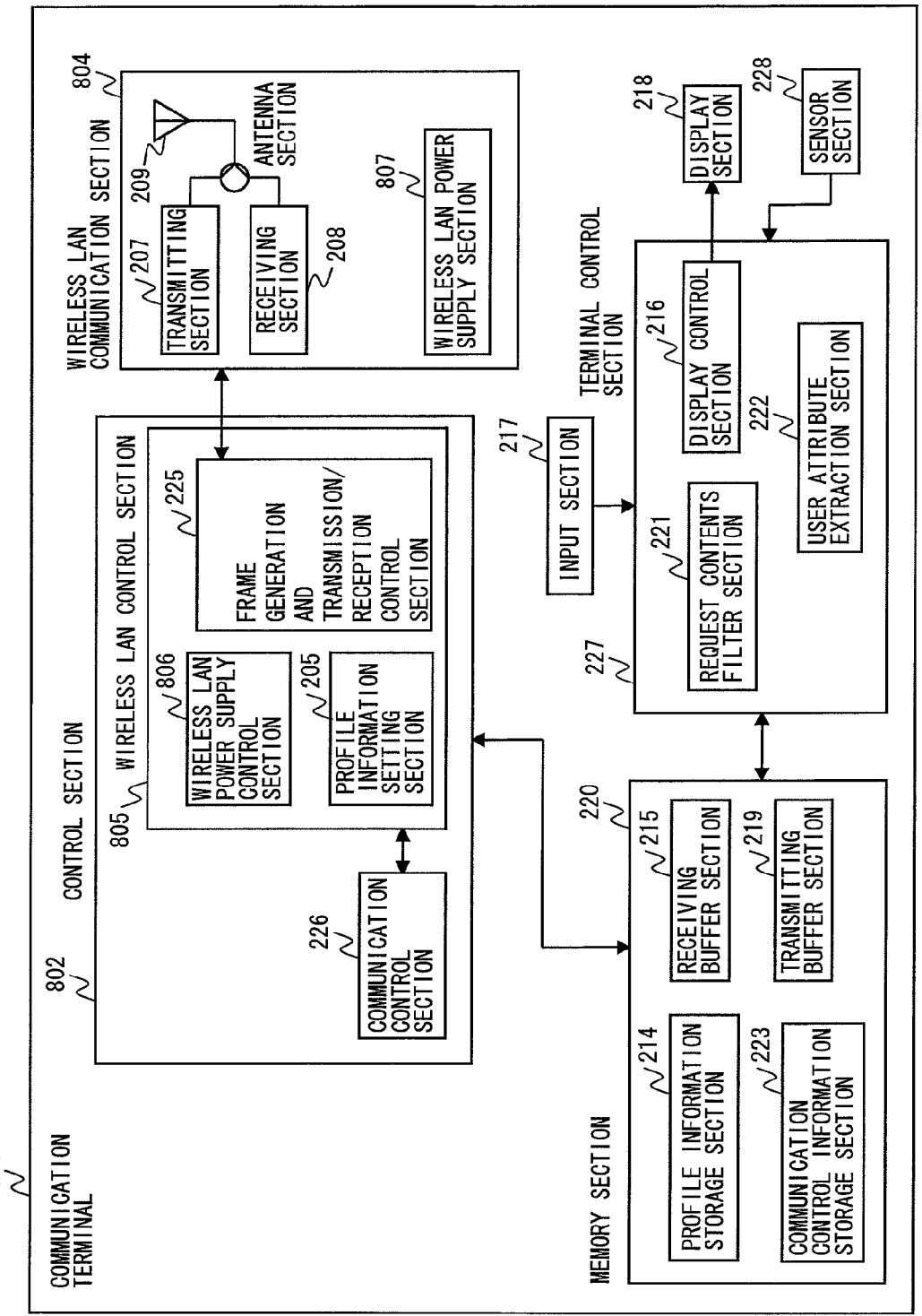
FIG. 6 is a block diagram showing an exemplary configuration of a communication terminal 201 according to embodiment 1 of the present invention.

FIG. 6 is a block diagram showing an exemplary configuration of the communication terminal 201 according to embodiment 1 of the present invention. As shown in FIG. 6, respective sections in the communication terminal 201 are connected via a system bus, and thus are able to transfer data mutually. The communication terminal 201 includes a control section 802, a wireless LAN communication section 804, a memory section 220, an input section 217, a terminal control section 227, a display section 218, and a sensor section 228.

The wireless LAN communication section 804 includes a transmitting section 207, a receiving section 208, an antenna section 209, and a wireless LAN power supply section 807. The control section 802 includes a communication control section 226 and a wireless LAN control section 805. The communication control section 226 controls the wireless LAN control section 805. The wireless LAN control section 805 includes a wireless LAN power supply control section 806, a profile information setting section 205, and a frame generation and transmission/reception control section 225. The profile information setting section 205 obtains, from a profile information storage section 214, profile information of a wireless LAN to be connected, and sets connection information for its own wireless LAN communication.

The memory section 220 is used for storing and buffering data of the communication terminal 201. The memory section 220 includes a profile information storage section 214, a communication control information storage section 223, a receiving buffer section 215, and a transmitting buffer section 219. The profile information storage section 214 stores therein information (i.e., profile information and the like) which is received by the communication terminal 201 and is necessary for connection with the integrated base station 101. Further, the communication control information storage section 223 stores therein an instruction set necessary for the communication terminal 201 to perform communication. The input section 217 is a section to which a user operation is inputted.

The terminal control section 227 is a section for controlling a terminal function of the communication terminal 201, and includes a request contents filter section 221, a display control section 216, and a user attribute extraction section 222. The display control section 216 controls information displayed on a display section 218 of the communication terminal 201. The user attribute extraction section 222 extracts an attribute and a preference of a user (hereinafter referred to as user attribute information) in accordance with information from a sensor section 228. The request contents filter section 221 filters metadata received from the integrated base station 101 so as to obtain contents that coincide with the user in accordance with the user attribute information extracted by the user attribute extraction section 222. Request information obtained through filtering by the request contents filter section 221 is transmitted from the communication terminal 201 to the integrated base station 101. Accordingly, the communication terminal 201 receives information that strongly correlates with the preference of the user of the terminal.

FIG. 7 shows a schematic diagram of a transmission sequence from the integrated base station 101. One of the features of the present invention is that depending on whether connection between the communication terminal 201 and the integrated base station 101 is established by using the first connection or the second connection, information accessible by the communication terminal 201 is restricted. Accordingly, the integrated base station 101 also needs to have communication intervals using these two connections. As shown in FIG. 7, the integrated base station 101 is configured so as to repeat the communication interval using the first connection and the communication interval using the second connection. The two communication intervals need not have fixed time lengths, and may be changed dynamically. That is, when there is a plurality of the communication terminals 201 performing communication with the integrated base station 101, and most of the communication terminals use the first connection, then it is possible to set the length of the communication interval using the first connection longer. Accordingly, it is possible to effectively utilize a communication band.

Figure 8:
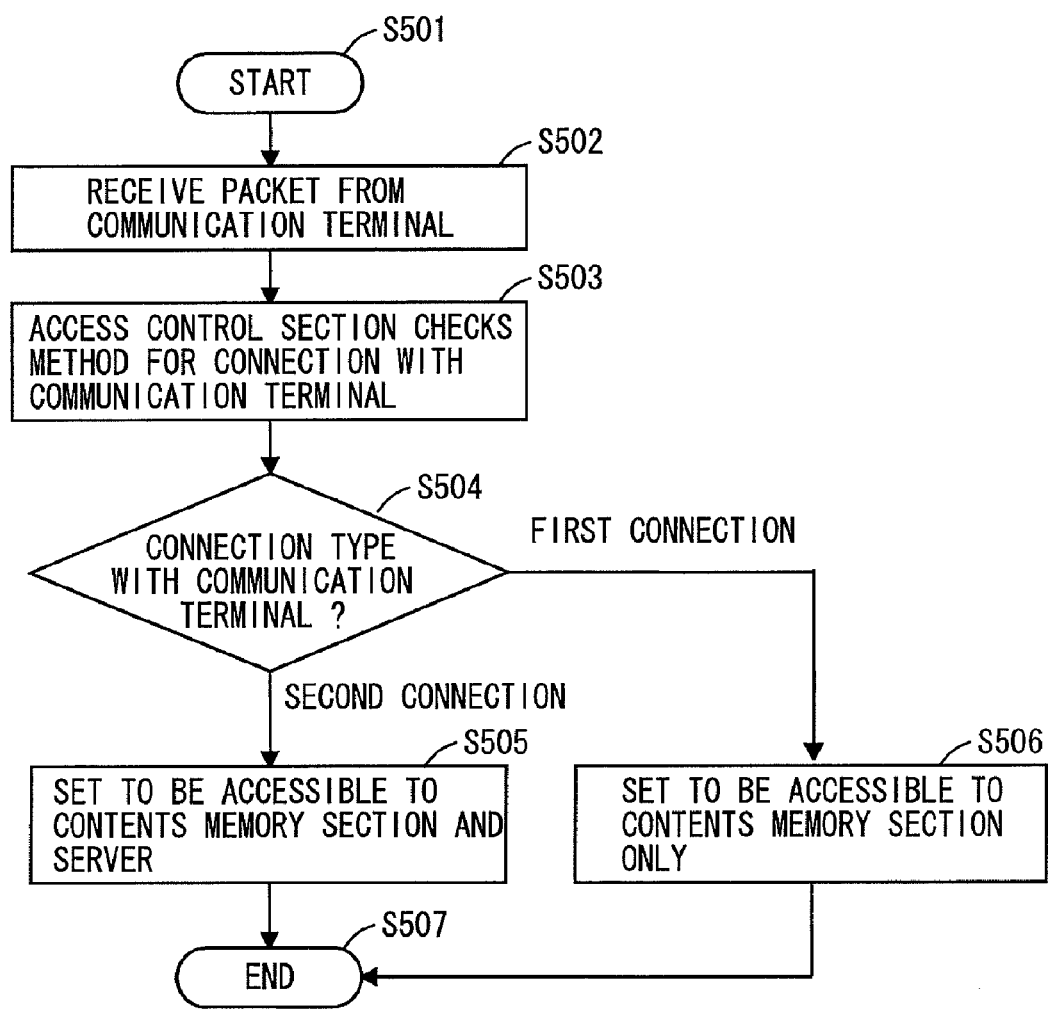
FIG. 8 is a diagram showing exemplary operations of the integrated base station 101 according to embodiment 1 of the present invention.

With reference to FIG. 8, a process flow of the integrated base station 101 (FIG. 6) will be described. As shown in FIG. 8, the integrated base station 101 receives a request packet from the communication terminal 201 (step S502). Next, the access restriction section 121 checks a connection method for connecting with the communication terminal 201 (step S503). When connection with the communication terminal 201 is established by using the second connection, the integrated base station 101 sets such that the communication terminal 201 is accessible to both of the contents memory section 122 and the server 10 (step S505). When the connection with the communication terminal 201 is established by using the first connection, the integrated base station 101 sets such that the communication terminal 201 is accessible to the contents memory section 122 only (step S506).

Here, a method for checking, by the access control (restriction) section 121, the connection method for connecting with the communication terminal 201 and will be described. Various methods may be considered as the method for checking, by the access control (restriction) section 121, the connection method for connecting with the communication terminal 201. For example, the integrated base station 101 preferably stores, in the access restriction section 121 or the like, a MAC address of a communication terminal to be connected thereto and the connection method, so as to identify the connection method for connection with the communication terminal 201 in accordance with a MAC address of a source of a received packet (i.e., the MAC address of the communication terminal 201).

Further, a method may be used in which the integrated base station 101 has an SSID for the first connection and an SSID for the second connection, such that the communication terminal 201 selects the SSID for connection with the integrated base station 101 in accordance with the first connection and the second connection. Still further, by preparing individual encryption keys (e.g., a WEP key or the like) for the first connection and the second connection, it may be possible for the integrated base station 101 to determine whether the communication terminal 201 has sent a packet by using the first connection or the second connection.

The access control (restriction) section 121 may check the connection method for connecting with the communication terminal 201 by using the above-described methods in a combined manner, or need not necessarily use the methods. For example, the access restriction section 121 may determine that the first connection is used for the connection with the communication terminal 201 when contents of a request packet requested by the communication terminal 201 is stored in the contents memory section 122. On the other hand, the access restriction section 121 may determine that the second connection is used for the connection with the communication terminal 201 when the contents of the request packet requested by the communication terminal 201 is not stored in the contents memory section 122, but in the server 10.

Alternatively, the communication terminal 201 may determine, based on metadata received thereby, the connection method for connection with the integrated base station 101, whereas the access control (restriction) section 121 may determine whether the first connection or the second connection is used in accordance with the connection method determined by the communication terminal 201. In this case, the communication terminal 201 is able to identify, based on the received metadata, whether the requested contents are stored in the integrated base station 101 or in the server 10. When the requested contents are stored in the integrated base station 101, the communication terminal 201 establishes connection with the integrated base station 101 using the first connection. On the other hand, when the requested contents are stored in the server 10, the communication terminal 201 establishes connection with the integrated base station 101 using the second connection.

Figure 9:
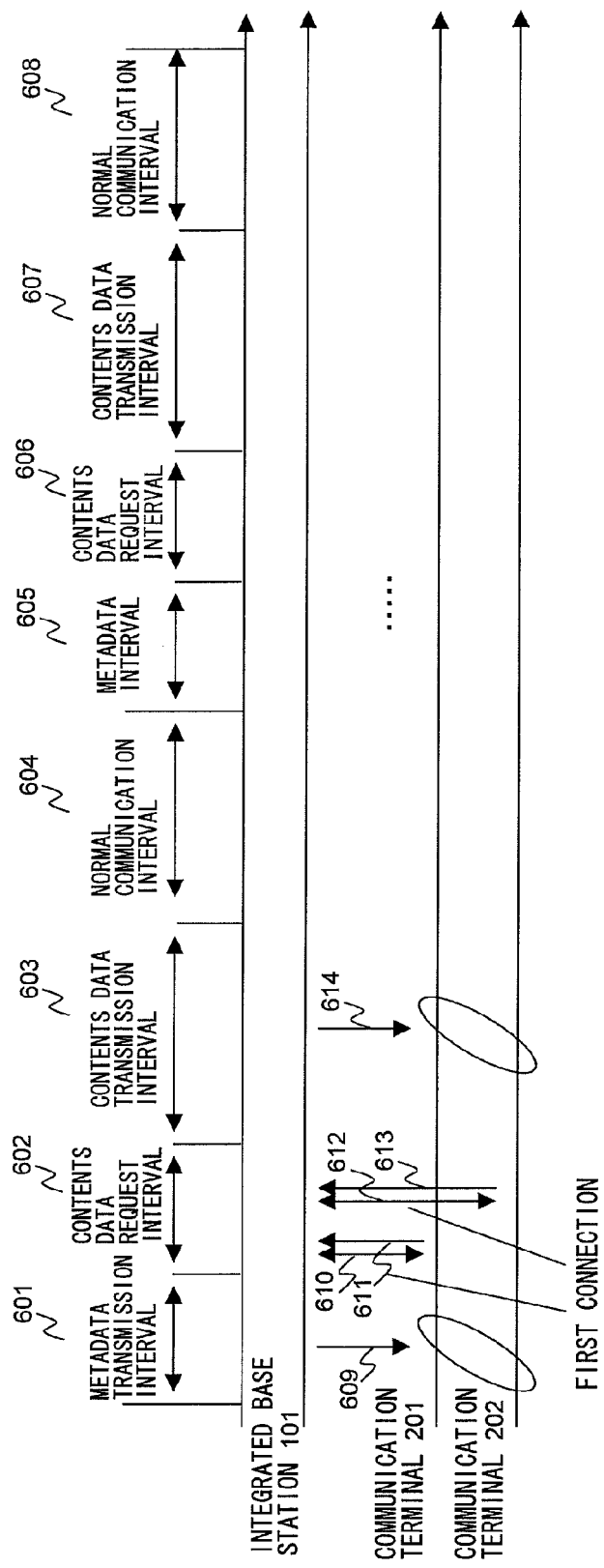
FIG. 9 is a sequence diagram showing, in detail, data transmission between the integrated base station 101 and communication terminals 201 and 202 according to embodiment 1 of the present invention.

Further, another feature of the present invention is that the integrated base station 101 efficiently transmits information while combining broadcasting and communication. FIG. 9 shows, in detail, a data transmission sequence in the present invention. In FIG. 9, data 609 and 614 indicated with ellipses is data transmitted from the integrated base station 101 by using broadcasting. The communication intervals 604 and 608 are each an interval using the second connection. First, the integrated base station 101 broadcasts the metadata 609 in a metadata transmission interval 601 to a communication terminal 201 and a communication terminal 202. The communication terminals 201 and 202 process the received metadata 609 in their request contents filter sections 221, so as to determine contents data to be requested. The communication terminals 201 and 202 transmit and receive, to and from the integrated base station 10, data 610 and 612 used in a first connection process and requests 611 and 613 for contents data. The integrated base station 101 collects the requested contents data in a contents data transmission interval 603, and broadcasts contents data 614 requested as a result of the collection.

Figure 10:
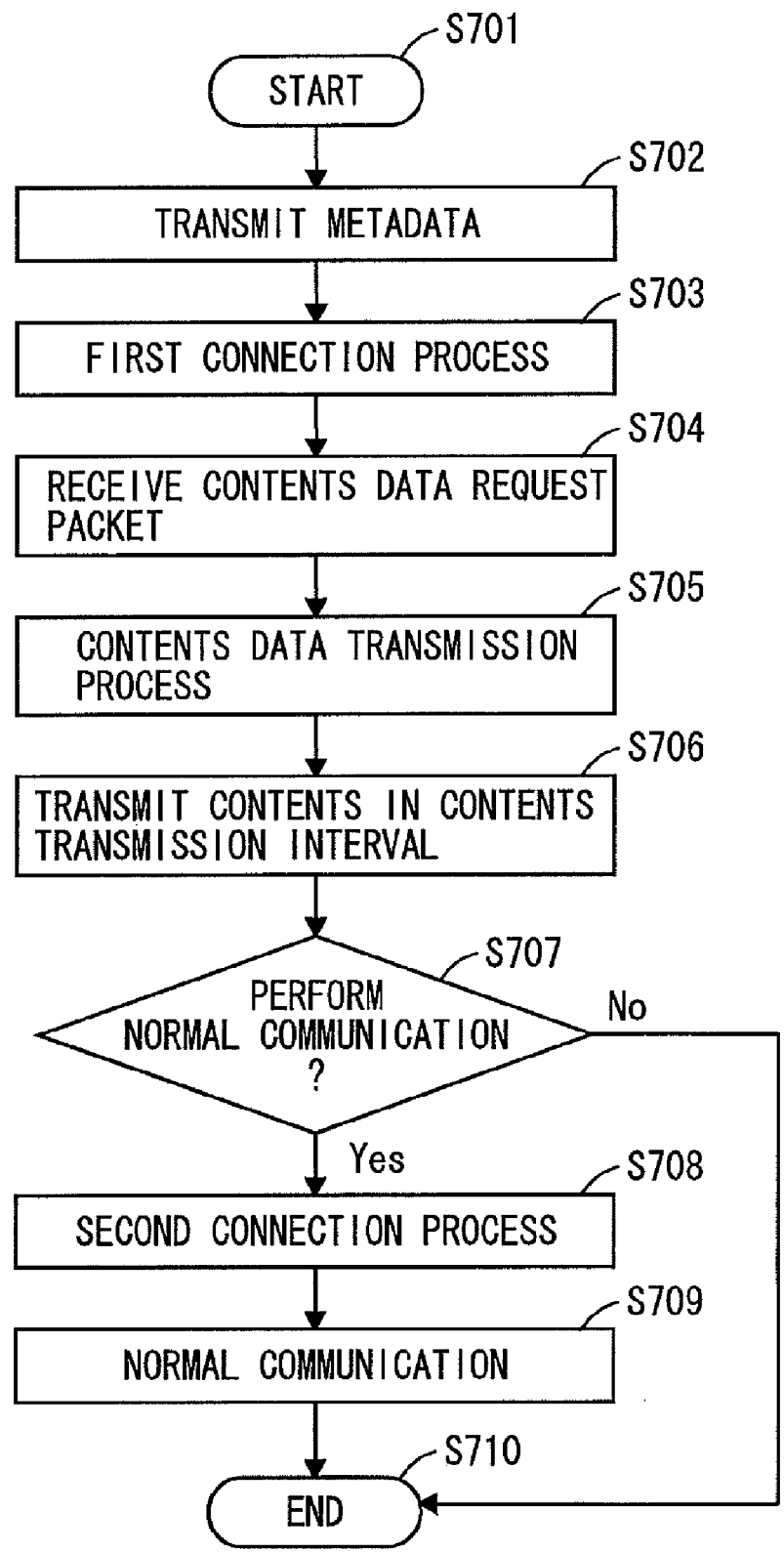
FIG. 10 is a diagram showing exemplary operations of the integrated base station 101 according to embodiment 1 of the present invention.

FIG. 10 shows an exemplary operation performed by the integrated base station 101, in which broadcasting and communication are combined together. As shown in FIG. 9 and FIG. 10, the integrated base station 101 transmits metadata 609 in metadata transmission intervals 601 and 605 (step S702). Next, the integrated base station 101 establishes, by using the first connection, connection with the communication terminal 201 which has received the metadata 609 (step S703). The integrated base station 101 receives contents data request packets 611 and 613 transmitted from the communication terminal 201 in the contents data request intervals 602 and 606 (step S704), and summarizes the contents data request packets so as to generate data to be transmitted (step S705). The integrated base station 101 then transmits the contents data 614 in contents data transmission intervals 603 and 607 (step S706).

Next, when there is a communication terminal 201 requesting a second connection process in normal communication intervals 604 and 608, the integrated base station 101 performs the second connection process for connection with the communication terminal 201 (step S708), and performs normal wireless LAN communication (step S709). When there is no communication terminal 201 requesting the second connection process in the communication intervals 604 and 608, the process is terminated.

Figure 11:
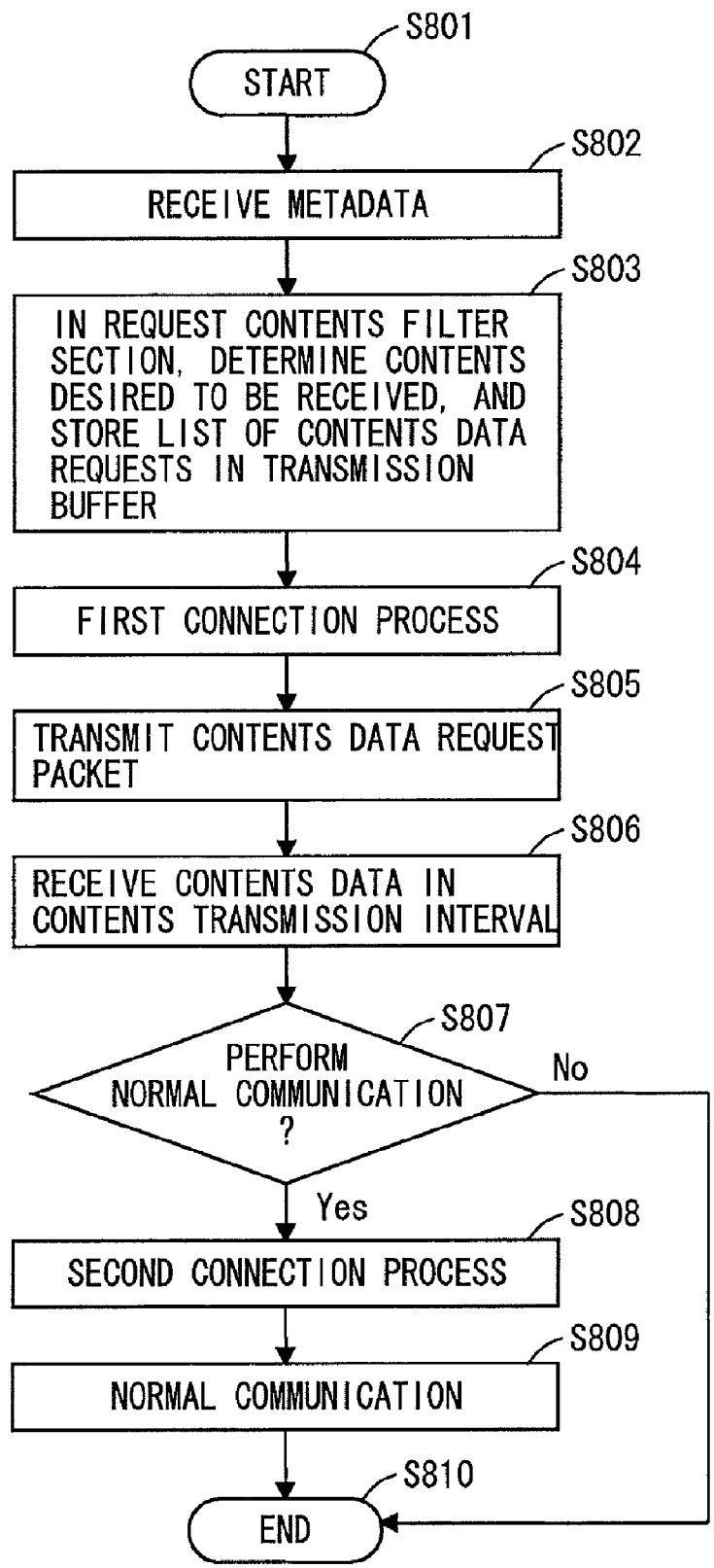
FIG. 11 is a diagram showing exemplary operations of the communication terminal 201 according to embodiment 1 of the present invention.

FIG. 11 shows a process flow of the communication terminal 201. As shown in FIG. 9 and FIG. 11, the communication terminal 201 receives metadata from the integrated base station 101 in metadata transmission intervals 601 and 605 (step S802). Next, the communication terminal 201 determines, in its request contents filter section 221, contents desired to be received, and stores a list of contents data requests in a transmission buffer (step S803). The communication terminal 201 then performs the first connection process for connection with the integrated base station 101 in the contents data request intervals 602 and 606 (step S804), and transmits a contents data request packet to the integrated base station 101 (step S805). Next, the communication terminal 201 receives contents data from the integrated base station 101 in the contents data transmission intervals 603 and 607 (step S806). In the case of requiring more personal information and detailed information, the communication terminal 201 performs normal communication with the integrated base station 101. In the case of performing the normal communication (Yes in step S807), the communication terminal 201 performs the second connection process for connection with the integrated base station 101 (step S808), so as to start the normal communication (step 809). In the case of no normal communication being performed, the process is terminated.

Figure 12:
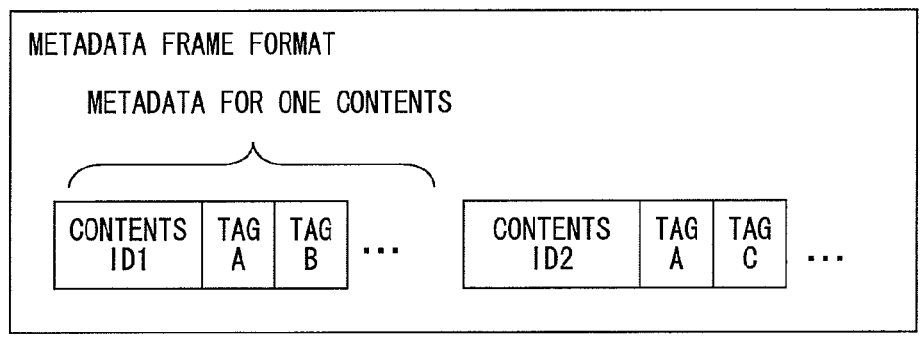
FIG. 12 is a diagram showing an exemplary frame format of metadata.

FIG. 12 shows a frame format of metadata transmitted from the integrated base station 101. As shown in FIG. 12, the metadata transmitted from the integrated base station 101 generally includes data equivalent to a plurality of contents. Metadata corresponding to certain contents has added thereto a contents ID and a tag corresponding to the contents ID.

Figure 13:
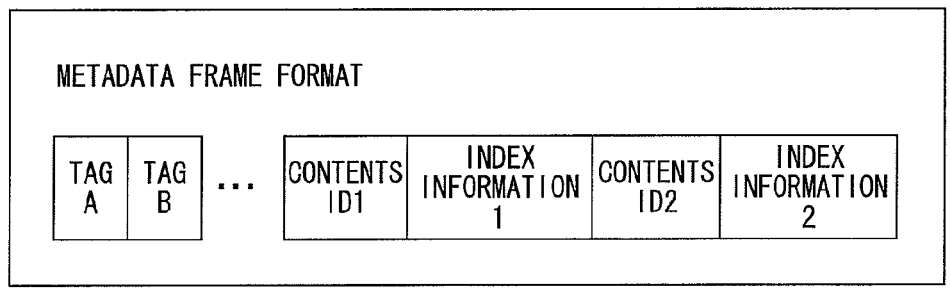
FIG. 13 is a diagram showing an exemplary frame format of the metadata.

The frame format of the metadata is not necessarily limited to such a format shown in FIG. 12 as long as the frame format includes the contents ID and the tag indicative of meta information. For example, a frame format shown in FIG. 13 may be applicable. As shown in FIG. 13, a list of metadata of contents transmitted from the integrated base station 101 is transmitted, and then contents IDs and index information of tags may be added. Accordingly, duplicated tags are not transmitted in a duplicated state, which contributes to reduction in an amount of data to be transmitted.

Figure 14:
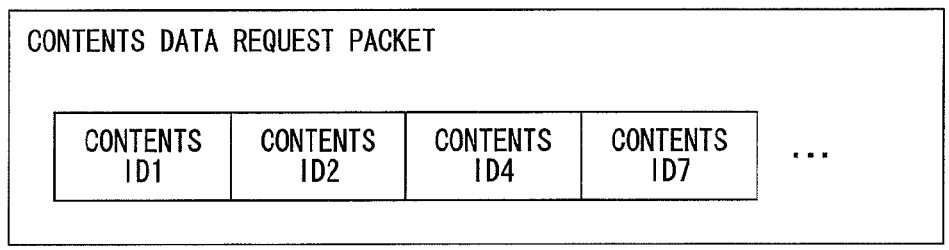
FIG. 14 is a diagram showing an exemplary frame format of a contents data request packet.

FIG. 14 shows an exemplary frame format of a contents data request packet transmitted by the communication terminal 201 to the integrated base station 101. With reference to FIG. 14, the integrated base station 101 transmits requesting contents IDs to the integrated base station 101. In the case of requesting normal data, the communication terminal 201 uses a URL request or the like. However, by assigning ID numbers to contents data cached in the integrated base station 101, it is possible to significantly reduce an amount of data requested by the communication terminal 201.

Figure 15:
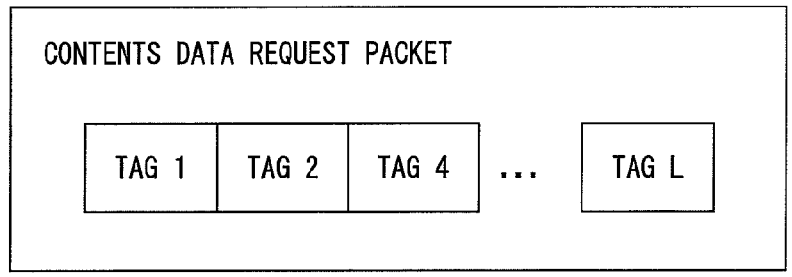
FIG. 15 is a diagram showing an exemplary frame format of the contents data request packet.

The communication terminal 201 need not necessarily use the contents ID for performing contents data request. Instead, as shown in FIG. 15, for example, tags may be used for contents request. Accordingly, in addition that the amount of information of request packets transmitted by the communication terminal 201 is reduced, the communication terminal 201 is able to determine contents desired to be received, in accordance with the tag, instead of individual contents. Thus, it is possible to reduce time required for filtering for obtaining contents to be requested.

FIG. 16 shows exemplary tags. The tag is different from a category in that use of the tag enables addition of a plurality of pieces of attribute information to one piece of information. For example, to movie information, "news" and "entertainment" tags may be added, and to restaurant information, "coupon" and "restaurant" tags may be added. Tags are added to contents, and request for desired contents are performed accordingly, whereby it is possible to request contents suitable to a preference of a user of the communication terminal 201 while a load of a filtering process placed on the communication terminal 201 is reduced.

Figure 17:
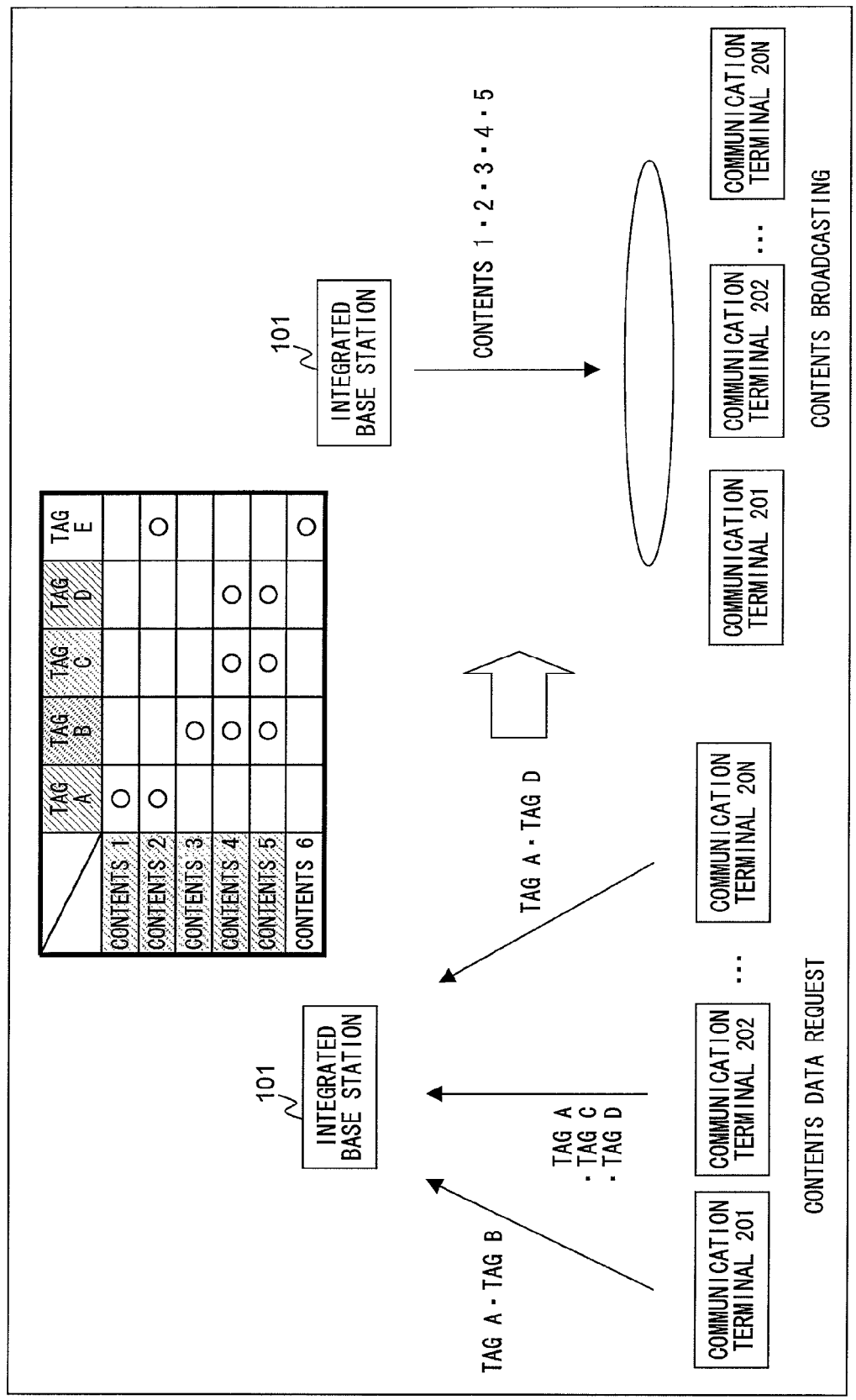
FIG. 17 is a diagram showing a process performed after the integrated base station 101 receives contents data request packets from communication terminals 1 to N until contents are broadcasted.

With reference to FIG. 17, processing from reception of contents data request packets from communication terminals 201 to 20N through to broadcasting of the contents, performed by the integrated base station 101, will be described. The communication terminals 201 to 20N request for tags of their desired contents, respectively. Here, suppose that the communication terminal 201 requests for "tag A" and "tag B", the communication terminal 202 requests for "tag A", "tag C", and "tag D", and the communication terminal 20N requests for "tag A" and "tag D". The integrated base station 101 summarizes tags requested by the communication terminals 201 to 20N, and refers to a table owned thereby. As a result of the summary, the tags requested by the communication terminals 201 to 20N are "tag A", "tag B", "tag C", and "tag D", and thus contents to be transmitted are "contents 1", "contents 2", "contents 3", "contents 4", and "contents 5". The integrated base station 101 broadcasts the summarized contents.

In this manner, the integrated base station 101 summarizes request information from the respective communication terminals 201 to 20N, and broadcasts contents corresponding to the summarized request information, whereby it is possible to minimize an amount of data for transmitting information requested by all the communication terminals 201 to 20N.

As shown in FIG. 18, the integrated base station 101 may be configured so as to broadcast a fixed amount of contents without receiving any request from the communication terminals 201 and 202. In FIG. 18, data 609 and 1501 indicated with ellipses is data transmitted from the integrated base station 101 by using broadcasting. The integrated base station 101 broadcasts metadata 609 to the communication terminal 201 and the communication terminal 202 in the metadata transmission intervals 601 and 605. In this case, the integrated base station 101 performs broadcasting including metadata of contents that are not cached in the contents memory 11. Next, the integrated base station 101 broadcasts the contents data 1501 to the communication terminal 201 and the communication terminal 202 in the contents data transmission intervals 603 and 606. The communication terminals 201 and 202 receive, through individual communication, contents that are not broadcasted in normal communication intervals 604 and 608. Specifically, the communication terminals 201 and 202 transmit and receive data 1502 and 1505 used for the first connection process and contents data request packets 1503 and 1506 to and from the integrated base station 101. The integrated base station 101 transmits individually requested contents data 1504 and 1507 to the communication terminals 201 and 202.

Next, a method for determining contents to be broadcasted by the integrated base station 101 in contents data transmission intervals 603 and 606 will be described. In the contents data transmission intervals 603 and 606 in the integrated base station 101, it is preferable to broadcast contents data very frequently requested by the communication terminals 201 and 202. This is because frequency of individual requests of the contents data is reduced in the normal communication intervals 604 and 608. Data broadcasted by the integrated base station 101 in the contents data transmission intervals 603 and 606 includes contents data frequently requested by the communication terminals 201 and 202 in the normal communication intervals 604 and 608, in addition to contents data to be transmitted by all means such as town notice, emergency information, and the like. Probability that contents data, among all contents data, requested by the communication terminals 201 and 202 are transmitted in the contents data transmission intervals 603 and 606, is defined as a hit rate. In this situation, when information, which is frequently requested by the communication terminals 201 and 202 individually in the normal communication intervals 604 and 608, is broadcasted in the contents data transmission intervals 603 and 606, it is possible to raise the hit rate.

FIG. 19A shows a flow chart of updating of the contents memory 11 in the integrated base station 101, based on the method illustrated in FIG. 18. As shown in FIG. 19A, the integrated base station 101 receives from the server 10 contents to be cached in the contents memory 11 (step S1602). Next, the integrated base station 101 determines whether or not to update the contents, and receives the contents again from the server 10 in the case of updating the contents to be cached (Yes in step S1603). On the other hand, in the case of not updating the contents, the process is terminated (step S1604). Determination of whether or not to update the contents is preferably performed regularly, but is not necessarily performed so. Alternatively, a configuration may be possible in which when contents being cached is updated on the server 10, the server 10 provides a trigger, such that the contents being cached in the integrated base station 101 is updated.

Figure 19B:
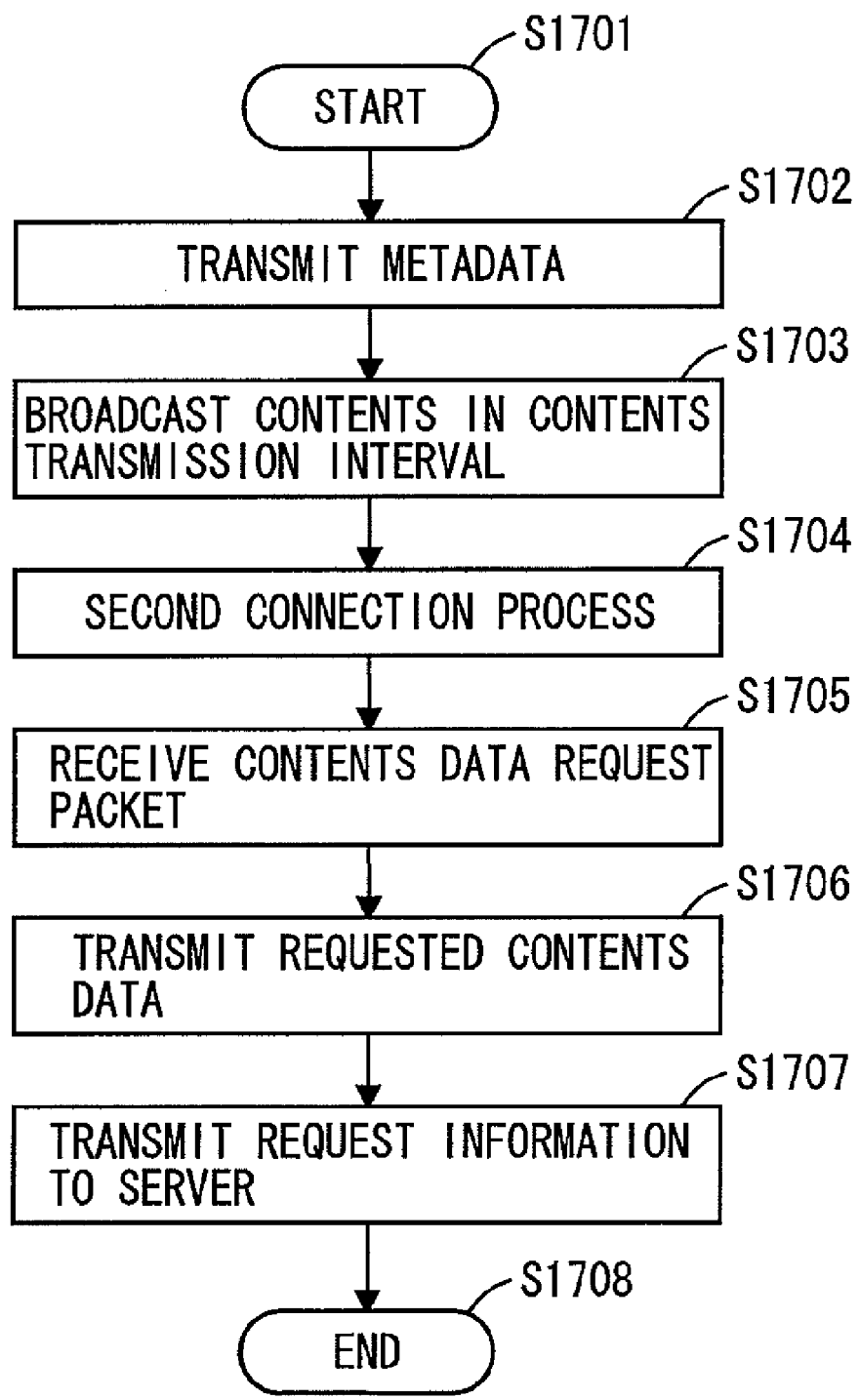
FIG. 19B is a diagram showing a process flow of data transmission/reception in the integrated base station 101.

FIG. 19B shows a flow chart of data transmission/reception performed on the integrated base station 101, based on the method illustrated in FIG. 18. As shown in FIG. 18 and FIG. 19B, the integrated base station 101 transmits metadata 609 in metadata transmission intervals 601 and 605 (step S1702). Next, the integrated base station 101 transmits contents data 1501 in contents data transmission intervals 603 and 606 (step S1703) by using broadcasting. Then, the integrated base station 101 performs the second connection process for connection with the communication terminals 201 and 202 (step S1704), and receives contents data request packets 1503 and 1506 transmitted from the communication terminals 201 and 202 (step S1705). Thereafter, the integrated base station 101 transmits contents data 1504 and 1507 in accordance with a request packet 1503 and 1506 (step S1706). Further, the integrated base station 101 transmits request information to the server 10 in order to improve the hit rate (step S1707).

Figure 20:
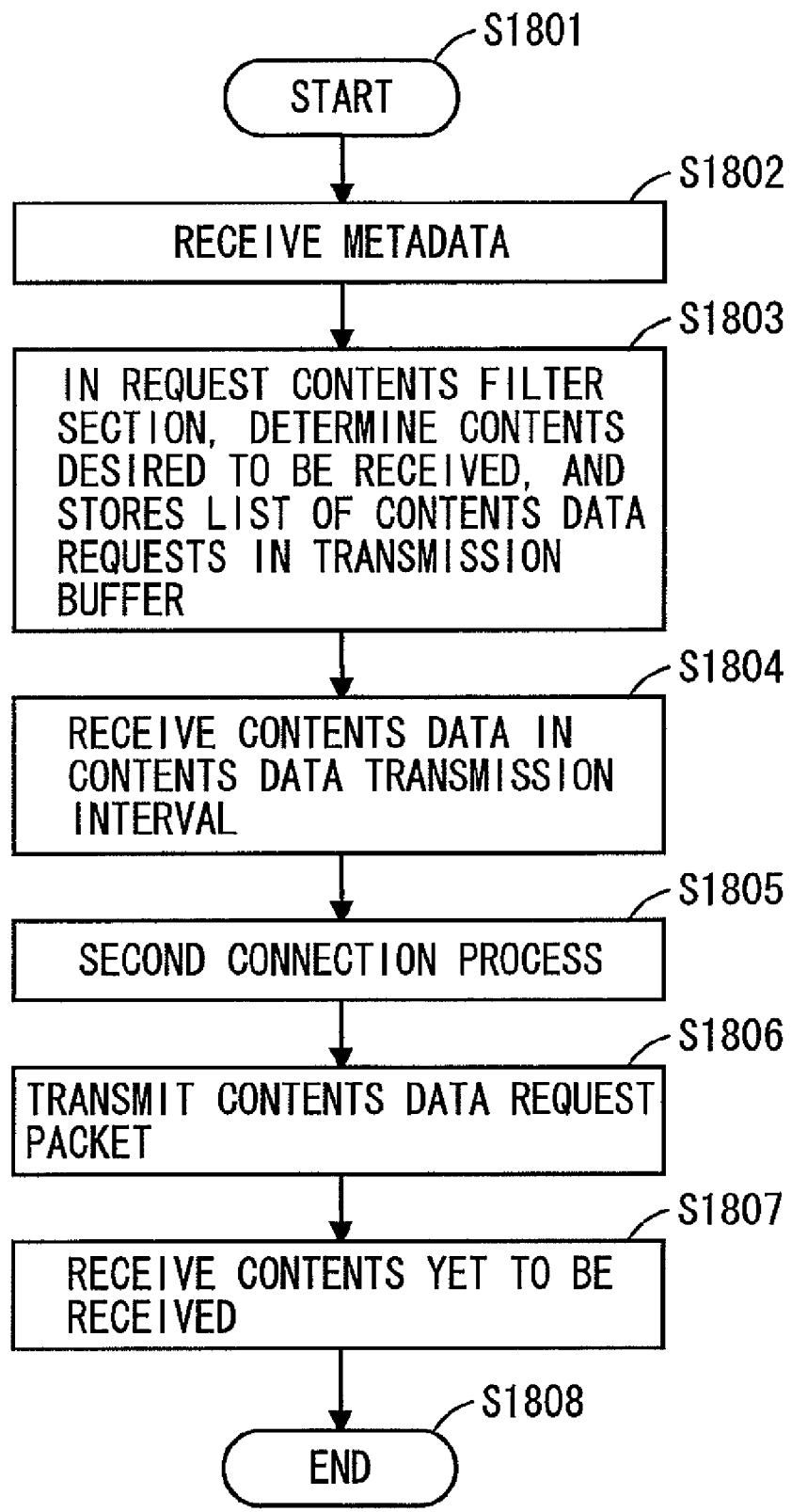
FIG. 20 is a diagram showing a process flow of data transmission/reception in the communication terminal 201.

FIG. 20 shows a flow chart of data transmission/reception performed on the communication terminal 201, based on the method illustrated in FIG. 18. As shown in FIG. 18 and FIG. 20, the communication terminal 201 receives the metadata 609 from the integrated base station 101 in the metadata transmission intervals 601 and 605 (step S1802). Next, the communication terminal 201 determines, in its request contents filter section 221, contents desired to be received, and stores a list of contents data requests in a transmission buffer (step S1803). Next, the communication terminal 201 receives contents data 1501 in the contents data transmission intervals 603 and 606 (step S1804). Then communication terminal 201 performs, in the normal communication intervals 604 and 608, the second connection process for connection with the integrated base station 101 in order to receive, in contents data transmission intervals 603 and 606, contents data yet to be broadcasted (step S1805), and transmits a contents data request packet 1503 to the integrated base station 101 (step S1806). As a result, the communication terminal 201 finally receives contents data 1504 that is yet to be broadcasted or received, in the normal communication interval 604 and 608, from the integrated base station 101 (step S1807).

As described above, according to the present invention, when the integrated base station 101 is connected to the communication terminal 201 by using the first connection, the communication terminal 201 is able to obtain contents stored in the contents memory 11. On the other hand, when the integrated base station 101 is connected to the communication terminal 201 by using the second connection, the communication terminal 201 is able to obtain contents stored in both the contents memory 11 and the server 10. That is, switching between the first connection and the second connection enables reduction in time necessary for the communication terminal 201 to obtain contents while maintaining security.

Embodiment 2

Figure 21:
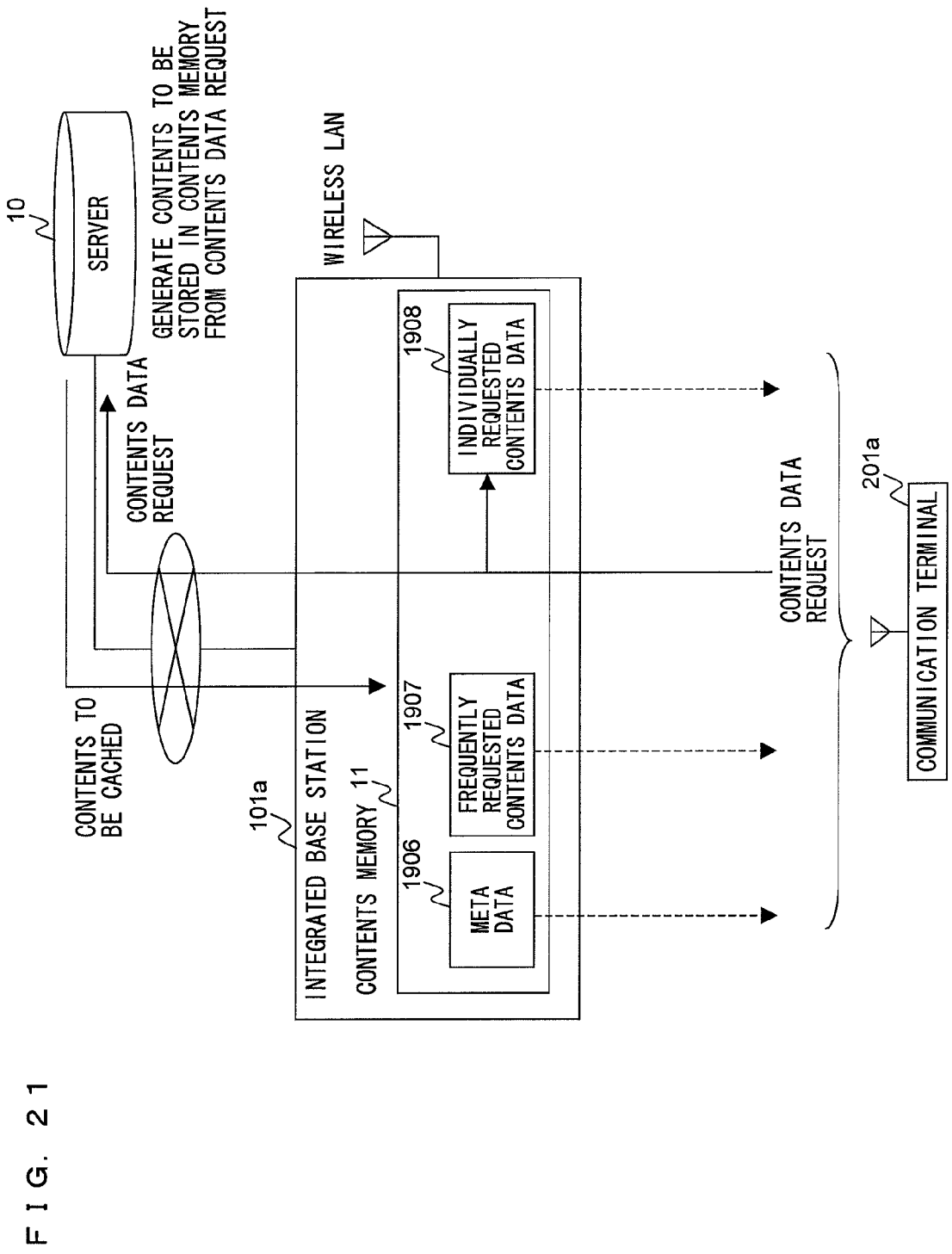
FIG. 21 is a schematic view illustrating an overall configuration of a wireless communication system according to embodiment 2 of the present invention.

FIG. 21 is a schematic view illustrating an overall configuration of a wireless communication system according to embodiment 2 of the present invention. In FIG. 21, the wireless communication system includes an integrated base station 101a, a communication terminal 201a, and a server 10. In FIG. 21, a solid arrow shows a flow of communication data, and a broken arrow shows a flow of broadcast data. The integrated base station 101a has metadata 1906, frequently requested contents data 1907, and individually requested contents data 1908 stored in its contents memory 11.

In comparison with embodiment 1, embodiment 2 has a feature that the contents data accumulated in the contents memory 11 of the integrated base station 101a is divided into frequently requested contents data 1907 which is relatively frequently requested, and individually requested contents data 1908 which is relatively less frequently requested. The individually requested contents data 1908 is transmitted upon request from the communication terminal 201a. Accordingly, the invention according to embodiment 2 can achieve reduction in time necessary for the integrated base station 101a to perform a transmission data generation process, while a high hit rate is maintained. Since basic configurations of the integrated base station 101a and the communication terminal 201a are the same as those shown in embodiment 1, common reference numerals will be applied to common sections, and description thereof will be omitted.

Among the contents data included in the contents memory 11, the frequently requested contents data 1907 is such contents data that is transmitted regardless of the degree of frequency of requests, and is, for example, contents data that is frequently requested from the communication terminal 201a, town information, emergency information, and disaster information. Such contents data is, statistically, highly likely to be requested by the communication terminal 201a, and thus is transmitted regardless of whether or not a request for the contents data is made by the communication terminal 201a at a certain time point. Accordingly, the frequency for changing an arrangement of a transmission queue of the frequently requested contents data 1907 is lower than that for the individually requested contents data 1908.

The individually requested contents data 1908 is such contents data that is less frequently requested by the communication terminal 201a as compared to the frequently requested contents data 1907. The metadata 1906 includes metadata of the frequently requested contents data 1907 and the individually requested contents data 1908. The communication terminal 201a grasps contents data in the contents memory 11 by means of the metadata 1906. Based on the frequently requested contents data 1907, the communication terminal 201a receives contents data which is statistically frequently requested by many users. Thereafter, the communication terminal 201a receives, as the individually requested contents data 1908, contents data that is not able to be received as the frequently requested contents data 1907 in spite of a contents data request made in a contents data request interval.

Figure 22:
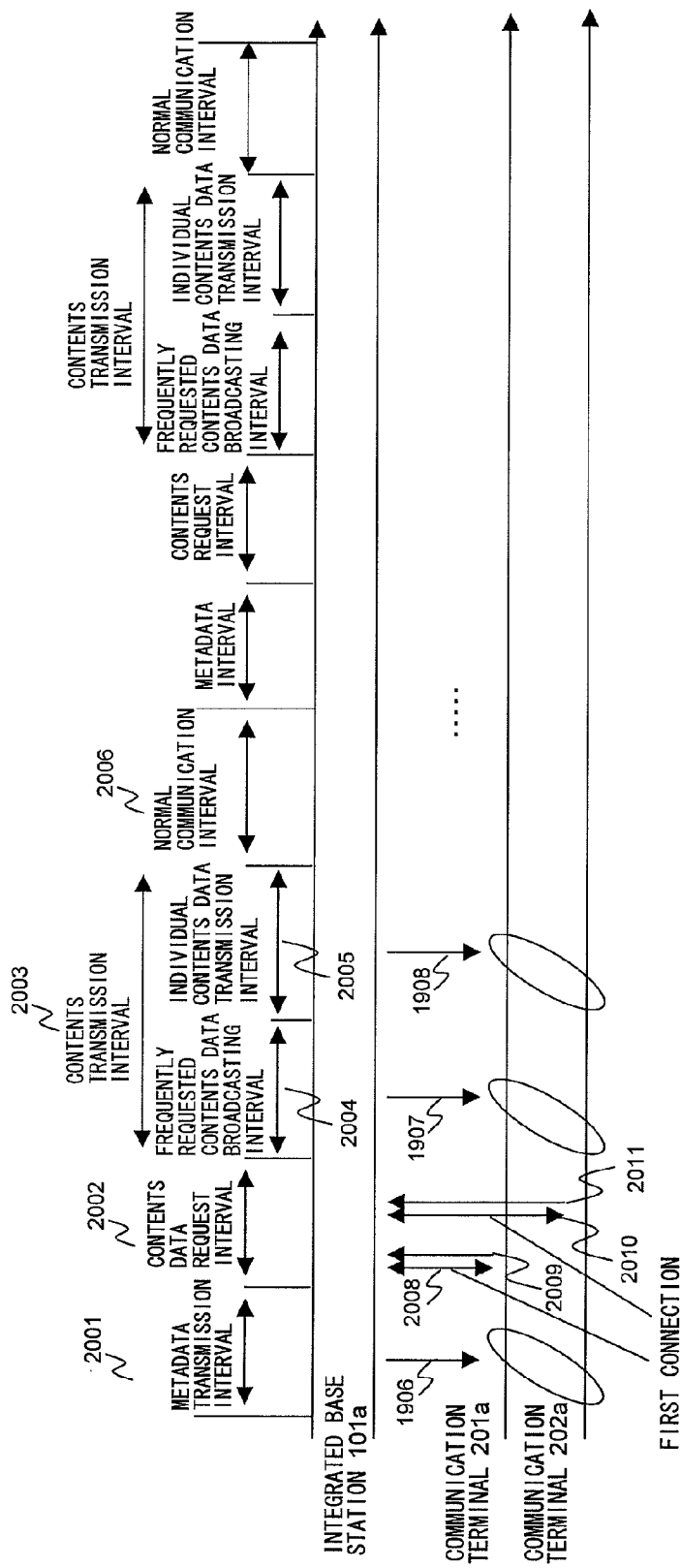

Hereinafter, details will be described. FIG. 22 is a diagram showing a transmission sequence of data transmitted between the integrated base station 101a and the communication terminals 201a and 202a according to embodiment 2. A method used for the data transmission is referred to as a two-step broadcasting A method. In FIG. 22, data 1906, 1907, and 1908 indicated with ellipses is data transmitted from the integrated base station 101a by using broadcasting.

The integrated base station 101a has a metadata transmission interval 2001, a contents data request interval 2002, a contents transmission interval 2003, and a normal communication interval 2006. Further, the contents transmission interval 2003 includes a frequently requested contents data broadcasting interval 2004 and an individual contents data transmission interval 2005.

Figure 23:
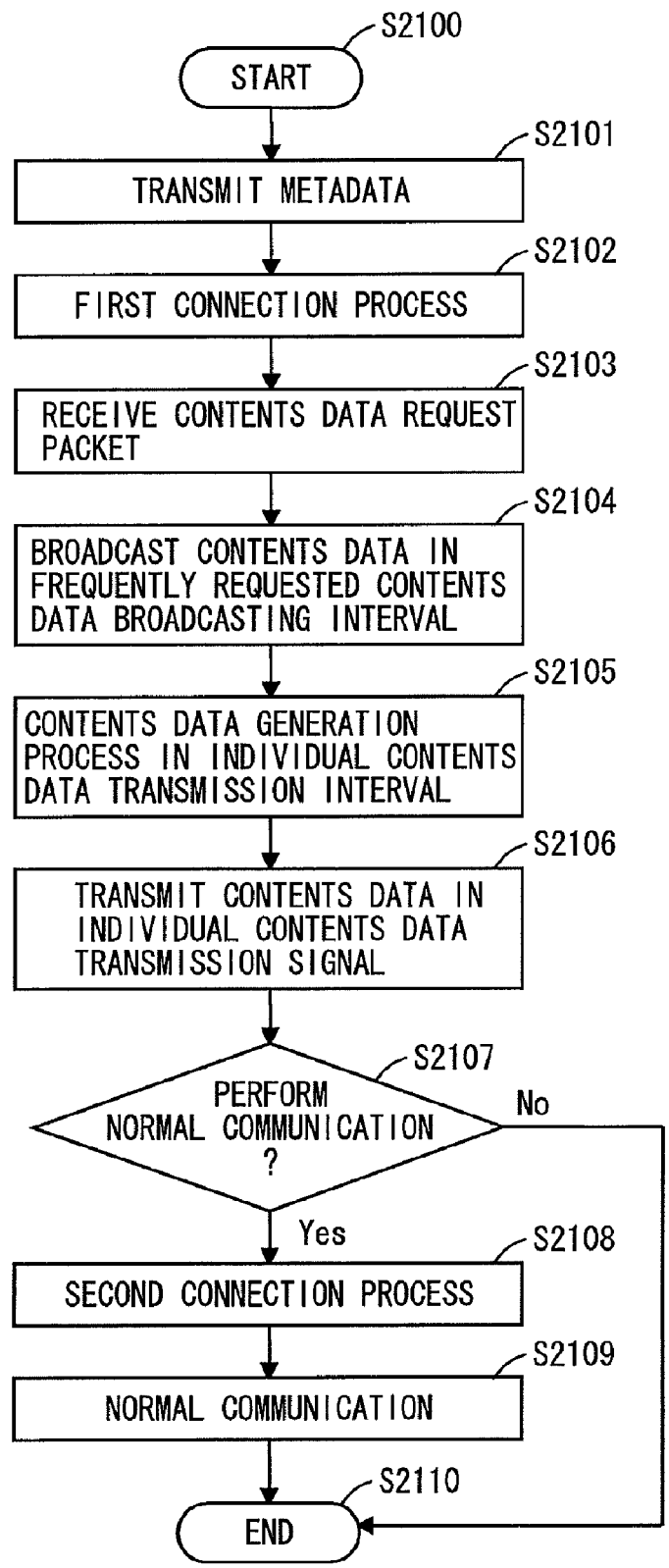
FIG. 23 is a diagram showing a flowchart of the integrated base station 101a according to embodiment 2 of the present invention.

FIG. 23 shows a flowchart of the integrated base station 101a according to embodiment 2. As shown in FIGS. 22 and 23, the integrated base station 101a transmits metadata 1906 to communication terminals 201a and 202a in the metadata transmission interval 2001 (step S2101). Next, the integrated base station 101a performs a first connection process for connection with the communication terminals 201a and 202a in the contents data request interval 2002 (step S2102), and receives contents data request packets 2009 and 2011 from the communication terminals 201a and 202a (step S2103).

The integrated base station 101a broadcasts the frequently requested contents data 1907 to the communication terminals 201a 202a in the frequently requested contents data broadcasting interval 2004 (step S2104). Next, the integrated base station 101a performs an individually requested contents data generation process in the individual contents data transmission interval 2005 (step S2105), and transmits the generated individually requested contents data 1908 to the communication terminals 201a and 202a (step S2106). The integrated base station 101a then determines whether or not to perform normal communication with the communication terminals 201a and 202a in the normal communication interval 2006 (step S2107). In the case of performing the normal communication, the integrated base station 101a performs the second connection process for connection with the communication terminals 201a and 202a to perform the normal communication (step S2109). In the case of not performing the normal communication (No in step S2107), the integrated base station 101a ends the processing (step S2110).

Figure 24:
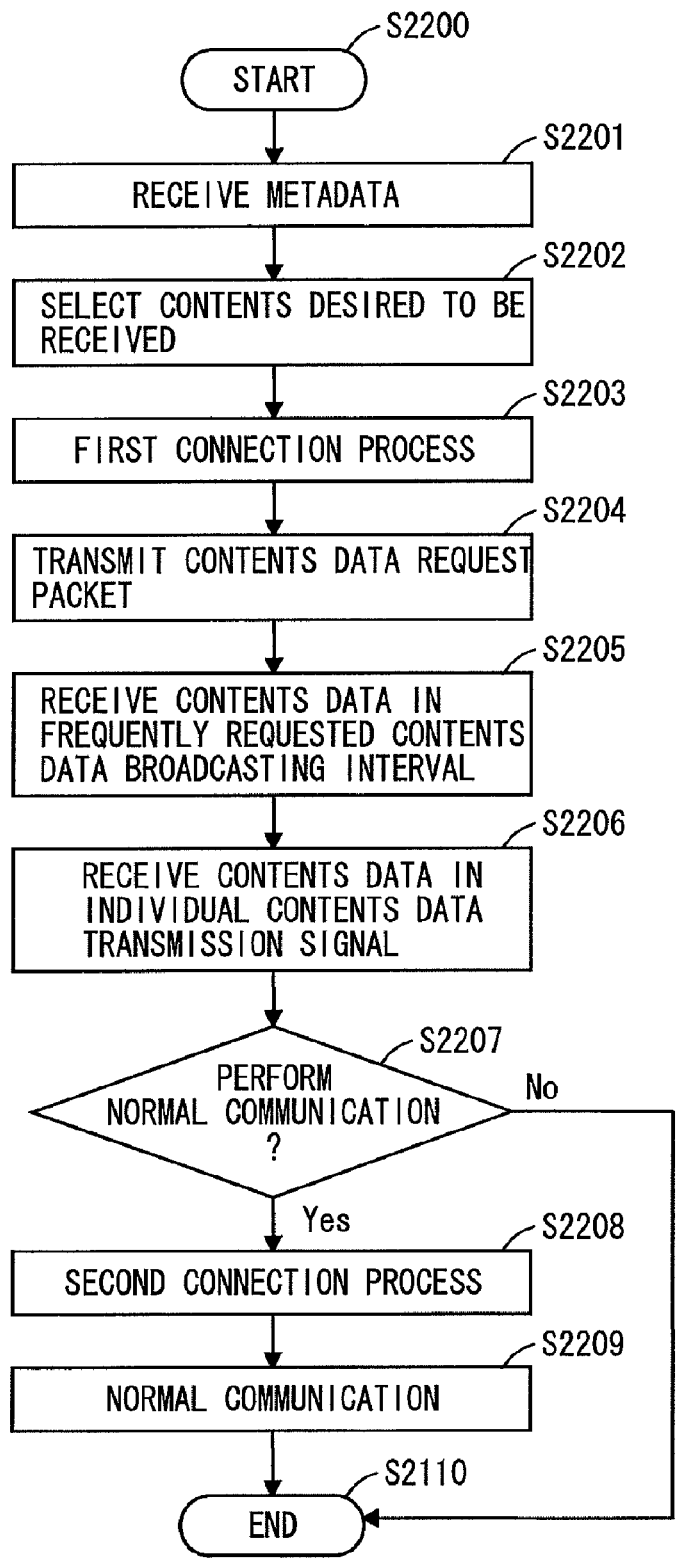
FIG. 24 is a diagram showing a flowchart of the communication terminal 201a according to embodiment 2 of the present invention.

FIG. 24 shows a flowchart of the communication terminal 201a according to embodiment 2. As shown in FIGS. 22 and 24, the communication terminal 201a first receives the metadata 1906 from the integrated base station 101a during the metadata transmission interval 2001 (step S2201). The communication terminal 201a selects, based on the received metadata 1906, contents data desired to be received (step S2202). The communication terminal 201a then performs the first connection process for connection with the integrated base station 101a in the contents data request interval 2002 (step S2203), and transmits the contents data request packet 2009 (step S2204).

Next, the integrated base station 201a receives the frequently requested contents data 1907 in the frequently requested contents data broadcasting interval 2004 (step S2205), and receives the individually requested contents data 1908 in the individual contents data transmission interval 2005 (step S2206). The communication terminal 201a then determines whether or not to perform normal communication with the integrated base station 101a (step S2207). In the case of performing the normal communication, the communication terminals 201a performs the second connection process for connection with the integrated base station 101a (step S2208) and performs the normal communication (step S2209). In the case of not performing the normal communication (No in step S2207), the communication terminal 201a terminates the processing (step S2110).

Figure 25:
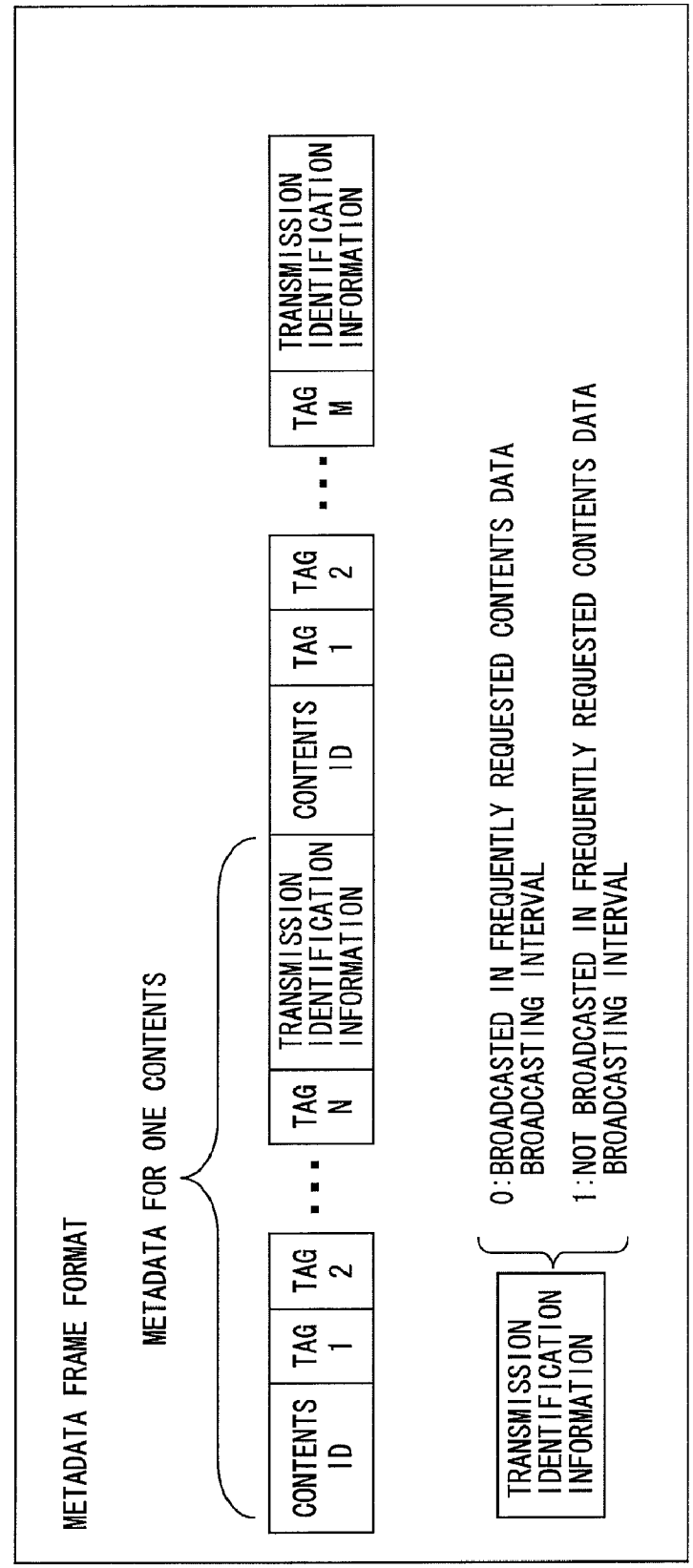
FIG. 25 is diagram showing an exemplary frame format of metadata.

FIG. 25 shows a frame format of metadata transmitted from the integrated base station 101a. As shown in FIG. 25, the metadata transmitted from the integrated base station 101a generally includes data of a plurality of contents. Metadata corresponding to certain contents includes a contents ID, a tag corresponding to the contents ID, and transmission identification information. The transmission identification information includes bit information for identifying whether or not contents data corresponding to the contents ID is to broadcast in the frequently requested contents data broadcasting interval 2004.

Figure 26:
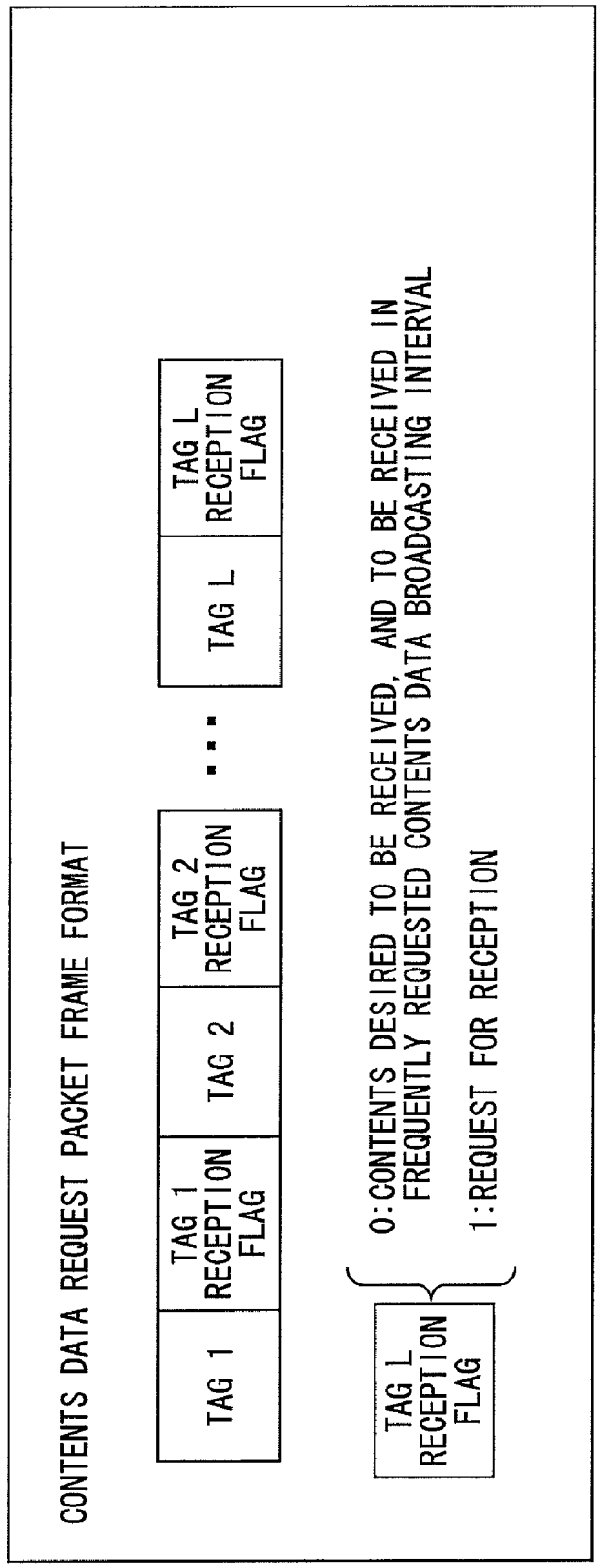
FIG. 26 is a diagram showing an exemplary frame format of a contents data request packet.

FIG. 26 shows a frame format of a contents data request packet to be transmitted to the integrated base station 101a by the communication terminal 201a. With reference to FIG. 26, the communication terminal 201a basically specifies contents data desired to be received by using a tag. Further, when the contents data desired to be received is scheduled to be received in the frequently requested contents data broadcasting interval 2004 at a later time, the communication terminal 201a sets an identification flag on a tag reception flag so as to indicate that the contents are desired to be received and is to be received later.

Accordingly, the integrated base station 101a is able to identify contents data having a high hit rate and contents data having a low hit rate, among the frequently requested contents data 1907. Thus, the integrated base station 101a is able to replace, in the frequently requested contents data 1907, contents data having a low hit rate with contents data requested very frequently.

Generally, a contents request made by users tends to be focused on specific contents. In accordance with embodiment 2, the contents data frequently requested by users is broadcasted in a fixed manner in the frequently requested contents data broadcasting interval 2004, whereas the remaining contents are broadcasted in the individual contents data transmission interval 2005, whereby an amount of contents, in the transmission queue, to be replaced by the integrated base station 101a is reduced. Accordingly, it is possible to reduce waiting time until data transmission.

Figure 27:
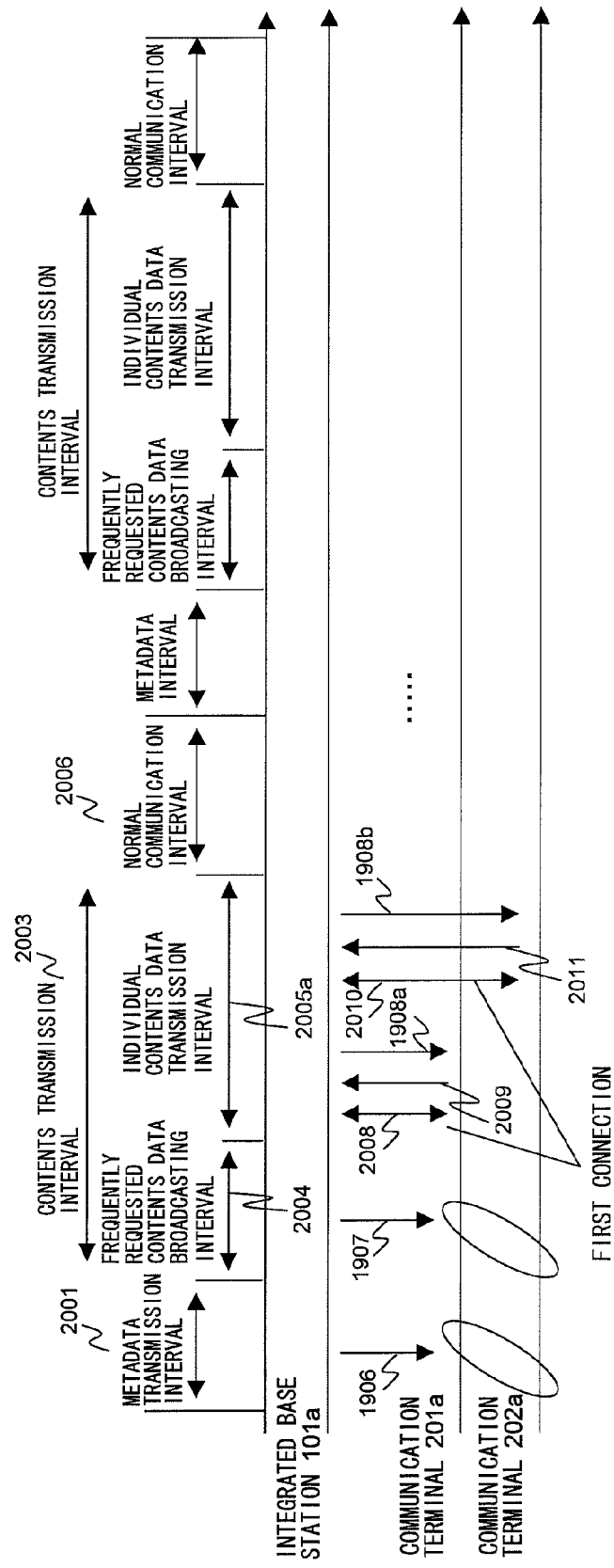

Above described configuration in embodiment 2 is an example in which the contents data request interval 2002 is provided, and based on information requested in the interval, the frequently requested contents data 1907 is broadcasted in the frequently requested contents data broadcasting interval 2004. However, the present invention is not limited to the configuration. For example, a configuration as shown in FIG. 27 may be applicable in which the integrated base station 101a does not have the contents data request interval 2002, and receives contents data requests 2009 and 2011 in the individual contents data transmission interval 2005a. The communication terminals 201a and 202a individually requests, in the individual contents data transmission interval 2005a, for contents data which has not been broadcasted in the frequently requested contents data broadcasting interval 2004. This type of method is referred to as a two-step broadcasting B method. Accordingly, the integrated base station 101a does not need collect the contents data together to generate a frame for broadcasting in accordance with the requests from the communication terminals 201a and 202a. Thus, reduction in a load on the integrated base station 101a can be expected.

Figure 28:
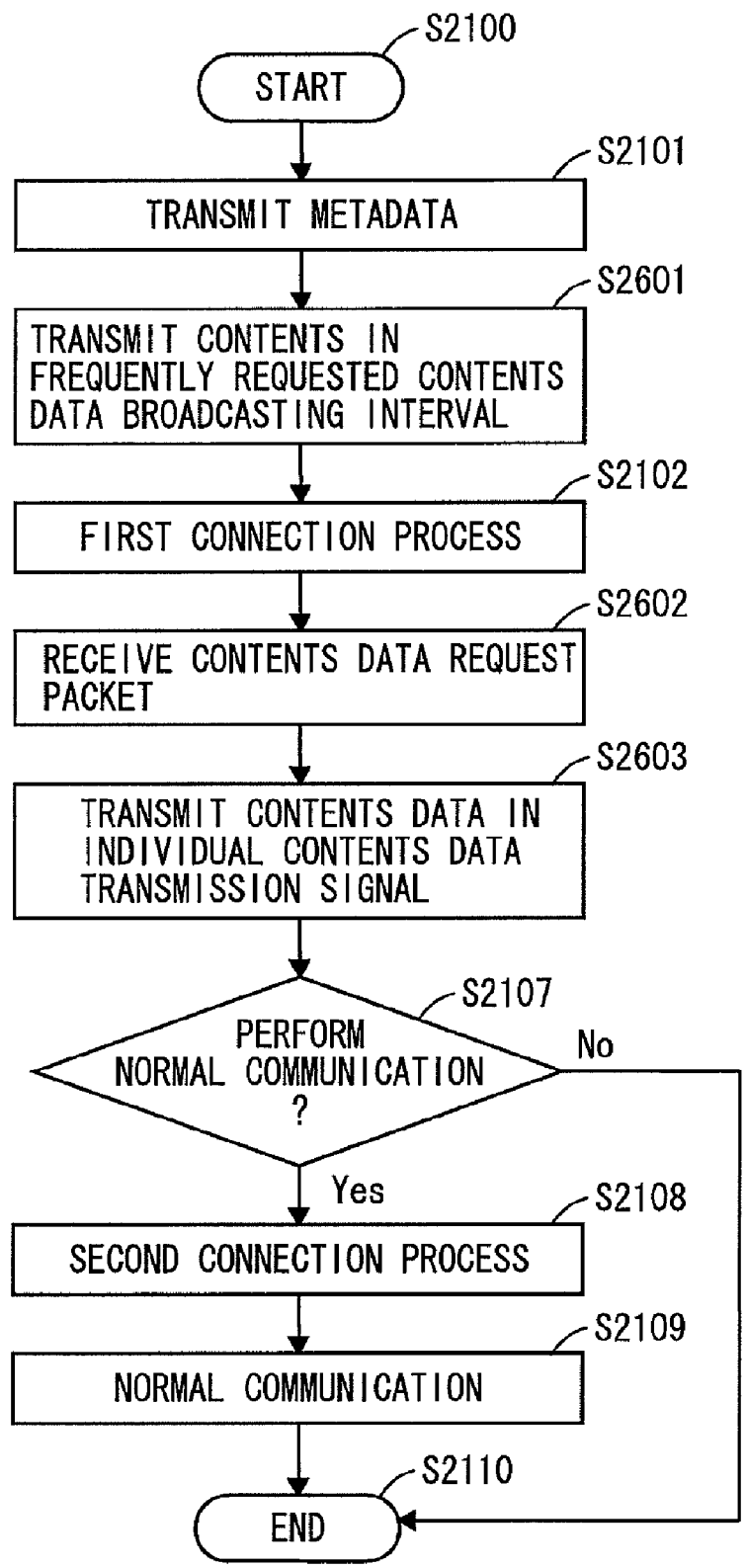

FIG. 28 shows a flowchart of the integrated base station 101a in the above-described method. As shown in FIGS. 27 and 28, the integrated base station 101a transmits metadata (step S2101), and broadcasts the frequently requested contents data 1907 in the frequently requested contents data broadcasting interval 2004 (step S2601). Next, the integrated base station 101a performs the first connection process for connection with the communication terminals 201a and 202a in the individual contents data transmission interval 2005a (step S2102), and receives contents data request packets 2009 and 2011 from the communication terminals 201a and 202a (step S2602). The integrated base station 101a transmits the individually requested contents data 1908a and 1908b corresponding to the requests (step S2603).

Figure 29:
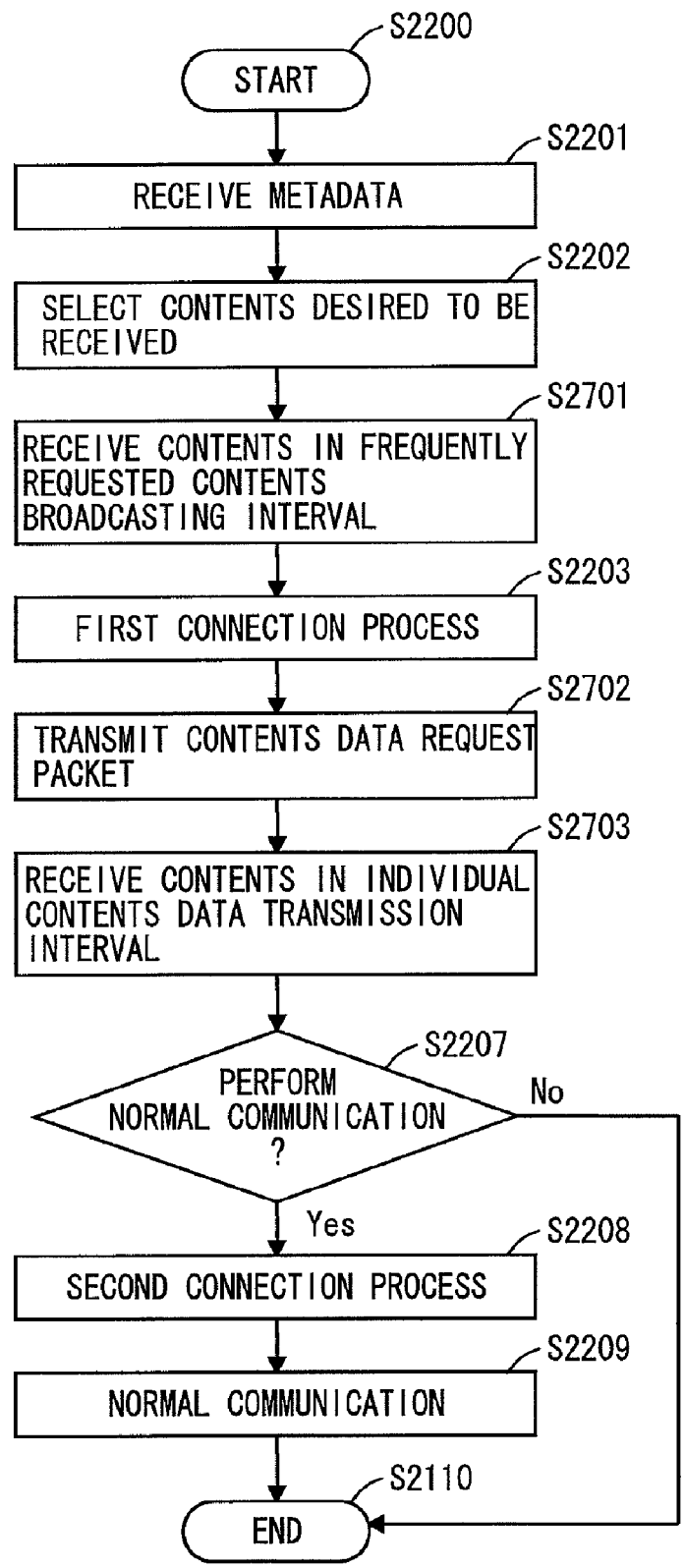

FIG. 29 shows a flowchart of the communication terminal 201a. As shown in FIGS. 27 and 29, after selection of contents desired to be received, the communication terminal 201a receives the frequently requested contents data 1907 in the frequently requested contents data broadcasting interval 2004 (step S2701). Next, the communication terminal 201a performs the first connection process for connection with the integrated base station 101a in the individual contents transmission interval 2005a (step S2203), transmits a contents data request packet 2009 (step S2702), and receives the individually requested contents data 1908a (step S2703).

Figure 30:
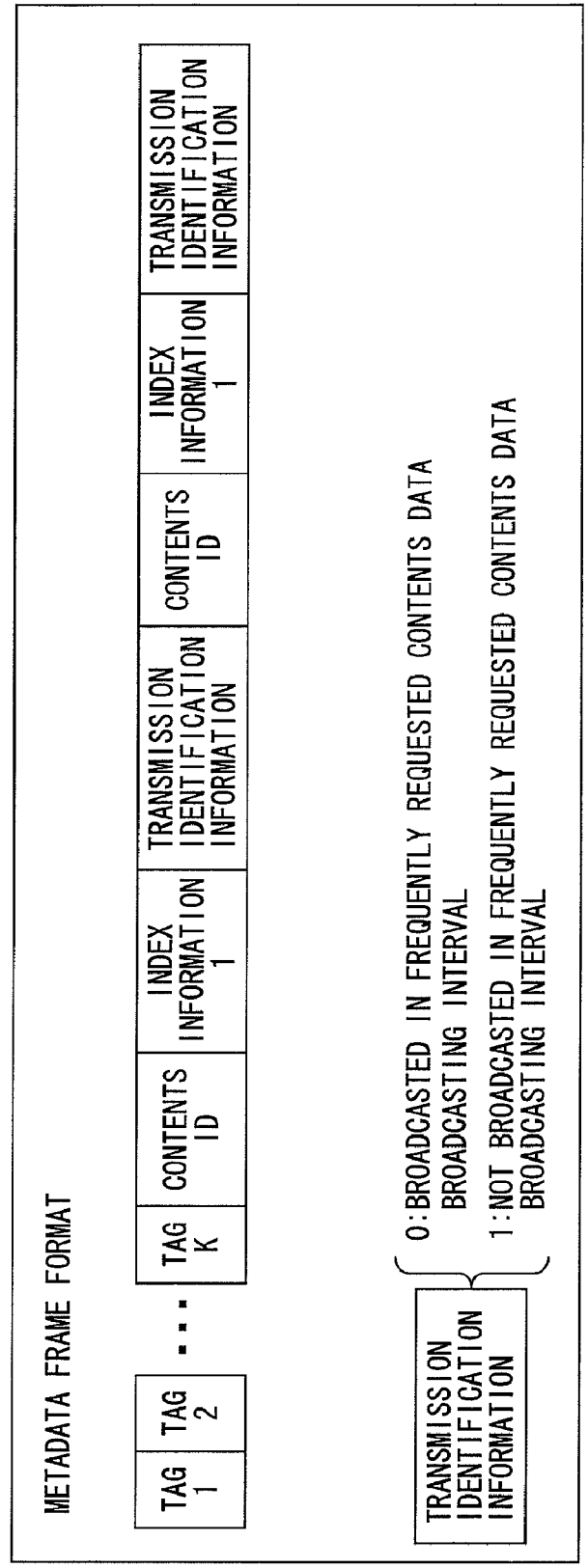
FIG. 30 is a diagram showing an exemplary frame format of metadata.

In embodiment 2 of the present invention, the frame format of the metadata transmitted from the integrated base station 101a is not limited to the format shown in FIG. 25. For example, as shown in FIG. 30, the frame format is configured such that tags are listed, and then index information, i.e., ID information of a tag included in contents, and the index information together with contents ID are added to the list of tags. Accordingly, tags of contents can be concentrated together, and consequently reduction in an amount of transmission data can be expected.

Figure 31:
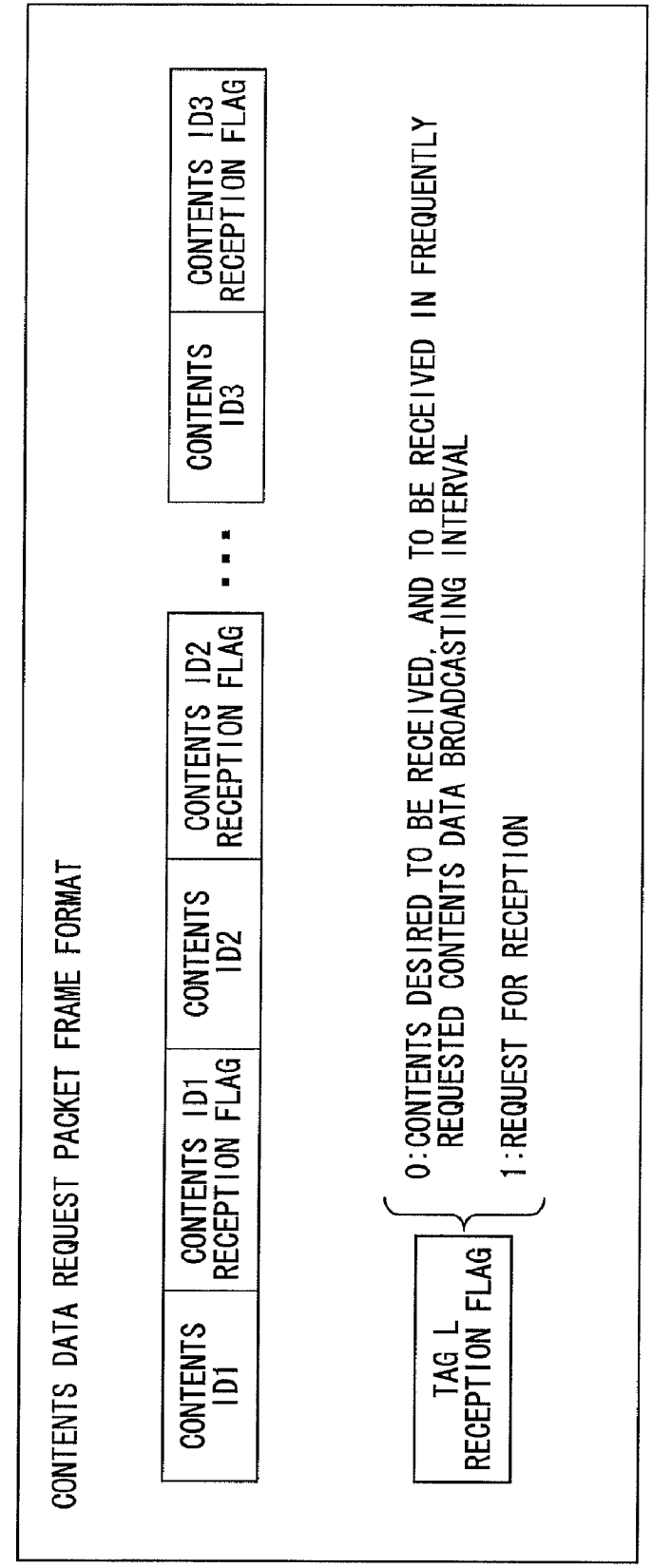
FIG. 31 is a diagram showing an exemplary frame format of a contents data request packet.

Further, the contents data request packet transmitted by the communication terminal 201a to the integrated base station 101a is not necessarily limited to a configuration in which a request for receiving desired contents data is based on the tags as shown in FIG. 26. Instead, as shown in FIG. 31, the contents data request packet may be configured such that a request for receiving desired contents data is based on the individual contents IDs. Accordingly, the communication terminal 201a is able to appropriately specify information that is highly preferred by the user, and to perform a request for contents transmission.

Figure 32:
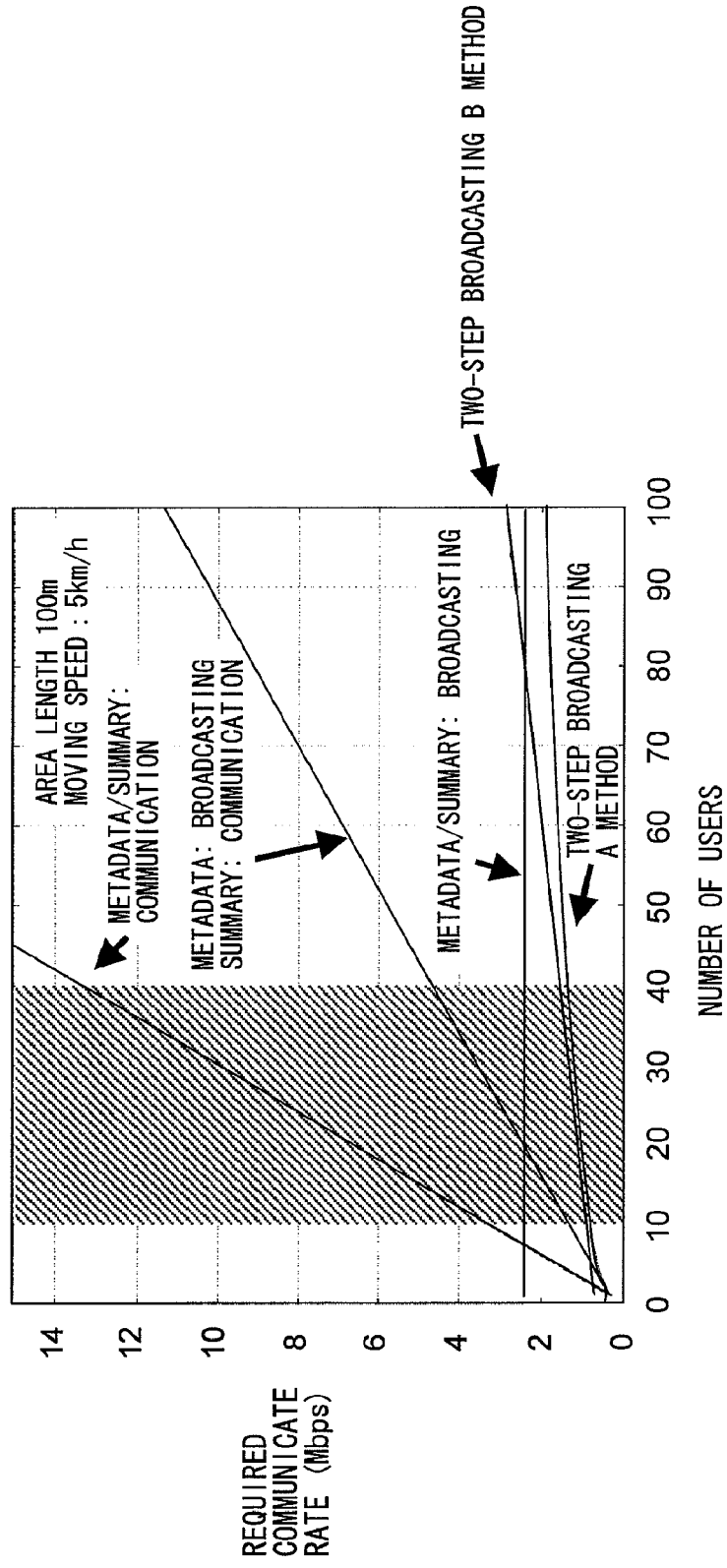
FIG. 32 is a diagram showing a result of simulation of communication rate required depending on the number of users of two-step broadcasting 2 and two-step broadcasting 3.

FIG. 32 shows a result of simulation of communication rates required depending on the number of users using the two-step broadcasting A method and the two-step broadcasting B method. Here, a communication area length of the wireless LAN is 100m (50m in radius), and a moving speed of the communication terminal 201a is 5 km/h supposing that the communication terminal is carried by a person walking Further, it is assumed that the frequently requested contents data broadcasting interval 2004 has the same length as the individual contents data transmission interval 2005a, and that 80% of requests from the communication terminal 201a are converged to 20% of contents. Still further, as comparative targets to the two-step broadcasting A method and two-step broadcasting B method, the following cases are considered: a case (1) where the integrated base station 101a transmits all the metadata and summaries by using communication, a case (2) where the integrated base station 101a transmits all the metadata and summaries by using broadcasting, and a case (3) where the metadata is transmitted by using broadcasting and the summaries are transmitted by using communication.

As shown in FIG. 32, in the case where the metadata and the summaries are transmitted by using communication, or in the case where the metadata is transmitted by using broadcasting and the summaries are transmitted by using communication, the amount of data to be transmitted increases as the number of users increases, and thus the communication rate required is increased accordingly. On the other hand, in the case where the metadata and the summaries are transmitted by using broadcasting, the communication rate required is constant regardless of the number of users. Suppose a case where, as a user density, 10 to 40 users, each having a technology proposed in the present invention, are present in an area of 100 m square. In such a case, the communication rate required based the two-step broadcasting A method and the two-step broadcasting B method is significantly decreased as compared to that based on another method.

Embodiment 3

Figure 33:
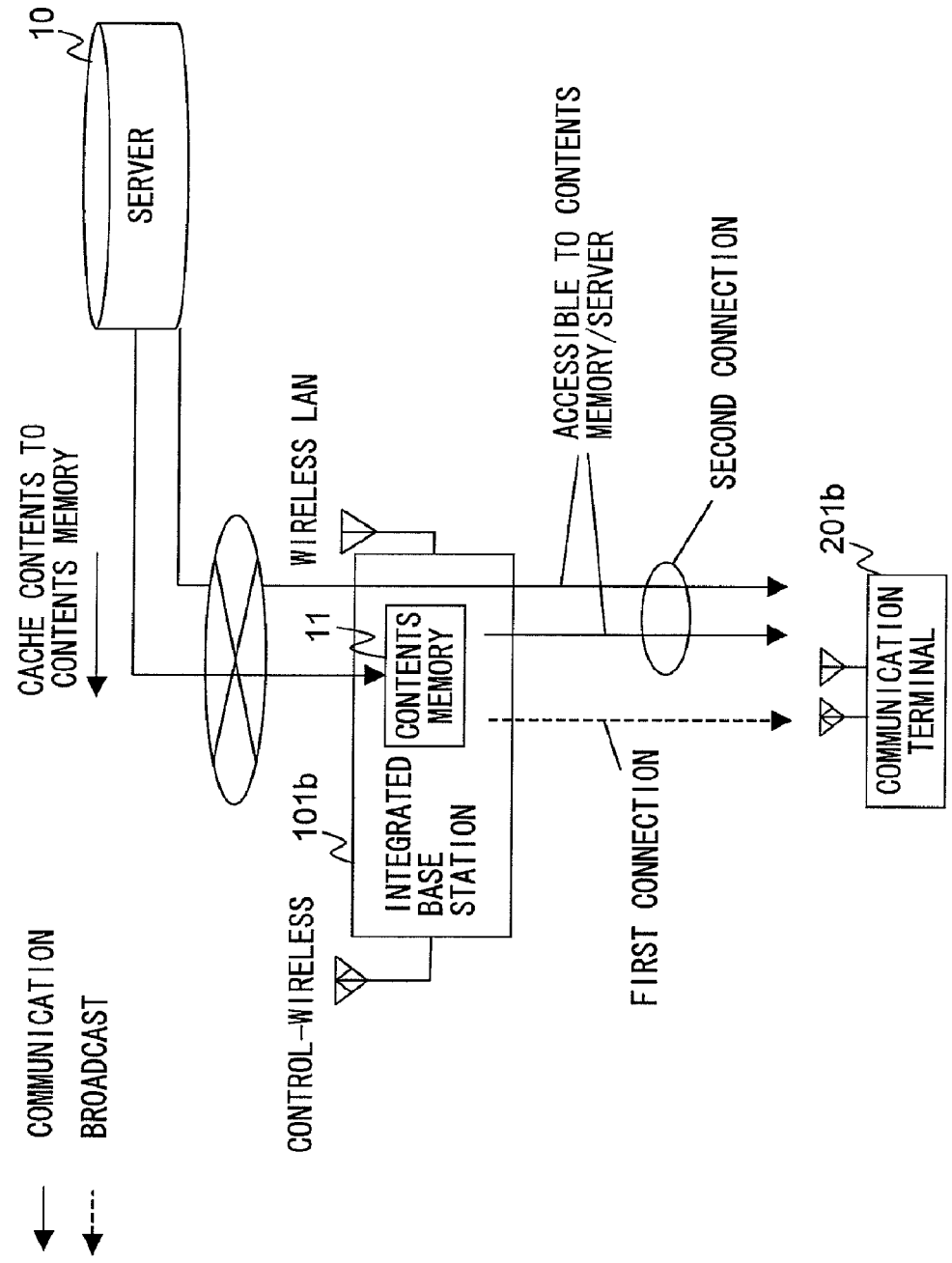
FIG. 33 is a schematic diagram showing an overall configuration of a wireless communication system according to embodiment 3 of the present invention.

FIG. 33 is a schematic diagram illustrating an overall configuration of a wireless communication system according to embodiment 3 of the present invention. In FIG. 33, the wireless communication system includes an integrated base station 101b, a communication terminal 201b, and a server 10. In embodiment 3, as compared to embodiments 1 and 2, in order to reduce time required before starting communication, other wireless communication (hereinafter referred to as control-wireless communication) than the wireless LAN communication is used, and communication channel information and identification information of the integrated base station 101b are exchanged in advance. Accordingly, it is possible to reduce time required for searching for a communication channel in the integrated base station 101b, for example, as shown in FIG. 3. In addition, the integrated base station 101b transmits beacons at predetermined intervals when the wireless LAN communication is used. Thus, it is possible to reduce waiting time during which the communication terminal 201b waits for transmission of the beacons from the integrated base station 101b.

The control-wireless communication may be adapted to all communication methods in which the integrated base station 101b and the communication terminal 201b operate independently of each other, and which allows spot communication. Since operation in energy saving mode is preferable, the communication method such as a Zigbee may be considered as a prospect of the control-wireless communication. By using the control-wireless communication requiring low power consumption, it is possible to reduce battery consumption in the communication terminal 201b. In addition, in the control-wireless communication, the communication terminal 201b preferably has a function of automatically waking up from a sleeping state to start communication (WOR: Wake On Radio) when entering a communication area. Accordingly, the communication terminal 201b waits while using a saved power in an area outside a communication area, and wakes up from the sleeping state when being moved into the communication area, so as to be automatically connected to the integrated base station 101b. Therefore, by using the control-wireless communication, the communication terminal 201b continuously searches for an area while using the saved power, and is able to be connected to the integrated base station 101b promptly upon detection of the area.

The Bluetooth may be one of the prospects for low power consumption technology, however, this method does not have the WOR function, and thus it is unfit to utilize Bluetooth to perform the above-described operation. In addition, it is desirable that a process time before start of communication is short. In this regard, Zigbee is more preferable than Bluetooth since Bluetooth requires about several seconds for connection. As another prospect, a DSRC (Dedicated Short Range Communication) system, which is a communication method developed for high-speed vehicles, is able to achieve high-speed connection, and thus is preferable. The DSRC is a wireless method capable of transmitting information to a communication terminal at a high speed. Thus, use of this method enables the communication terminal 201b to reduce time for transmitting/receiving contents from an integrated base station 101b, and thus this method is also preferable in this regard.

As a physical layer used for the control-wireless communication, various specified low power wireless communication such as a UHF band and the like, and a UWB (Ultra Wide Band) and the like may be used, in addition to the physical layer used for the above-described communication methods. Further, without limiting to the wireless communication, optical communication using an optical beacon, for example, may be used.

Figure 34:
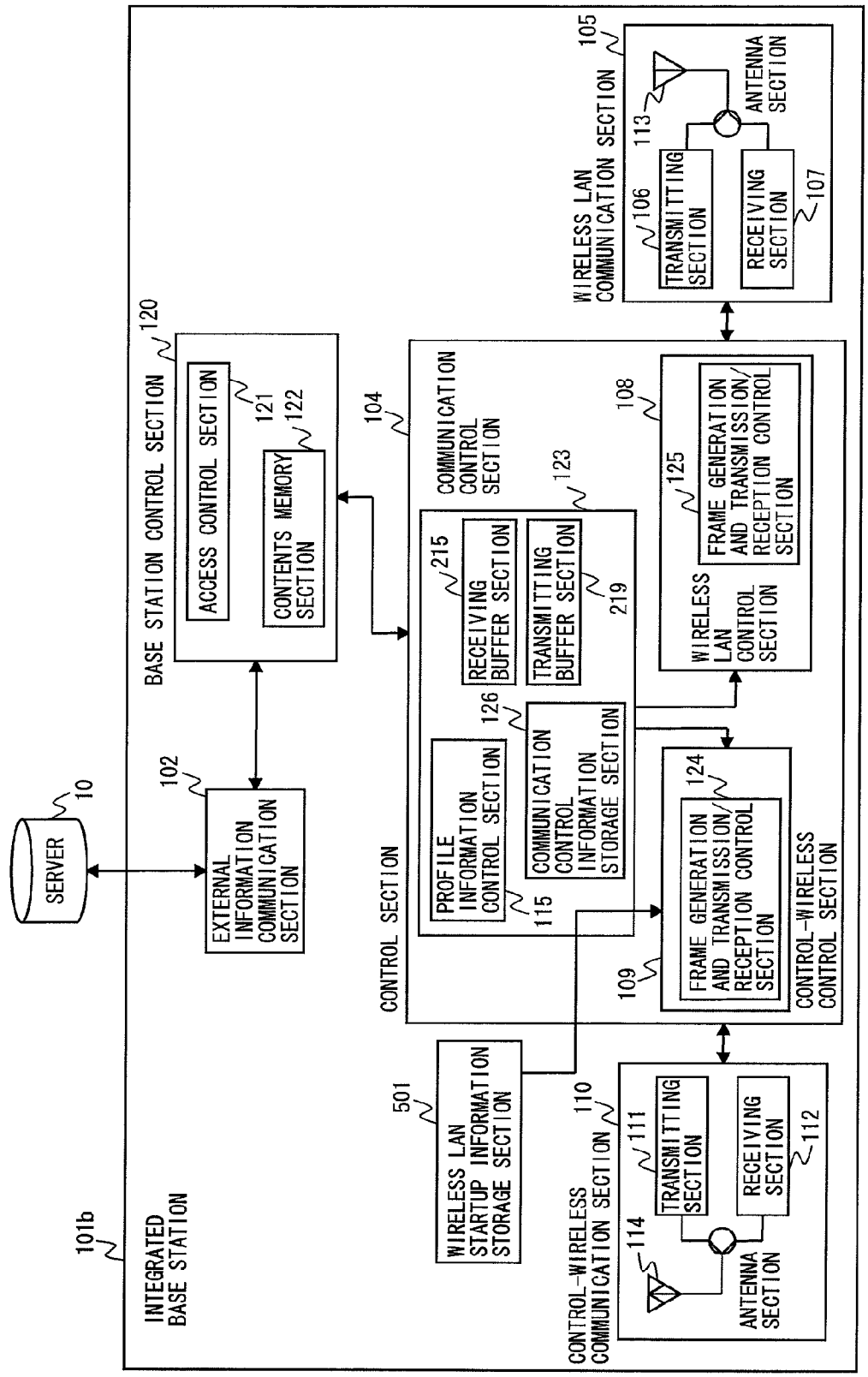
FIG. 34 is a block diagram showing an exemplary configuration of an integrated base station 101b according to embodiment 3 of the present invention.

FIG. 34 is a block diagram showing an exemplary configuration of the integrated base station 101b according to embodiment 3 of the present invention. In FIG. 34, the integrated base station 101b further includes a control-wireless communication section 110 in contrast to the integrated base stations 101 and 101a according to embodiments 1 and 2. A control section 104 further includes a control wireless control section 109. Respective sections in the integrated base station 101b are connected via a system bus, and thus are able to transfer data mutually. An external information communication section 102 is designed to transfer contents information from the server 10 to a memory 103 by means of a wired communication technology such as Ethernet (registered trademark), or to transfer information in the memory 103 to the server 10, conversely.

A base station control section 120 has an access restriction section 121 and a contents memory section 122. The access restriction section 121 monitors a connection type of the communication terminal 201b which is connected to the integrated base station 101b, and permits access from the communication terminal 201b to the server 10 and to the contents memory section 122 when the connection type is the second connection. On the other hand, the access restriction section 121 prohibits the access from the communication terminal 201b to the server 10 when the connection type is the first connection, and permits access to the contents memory section 122 only. The contents memory section 122 mainly caches highly public contents among information in the server 10. The highly public contents are, for example, typified by town tourist information, store information, news information, weather information, traffic information, and the like.

The control section 104 includes a communication control section 123, a control-wireless control section 109, and a wireless LAN control section 108. The communication control section 123 is a section for controlling the whole of the integrated base station 101, and includes a profile information control section 115, a communication control information storage section 126, a receiving buffer section 215, and a transmitting buffer section 219. The profile information control section 115 is designed to store information (i.e., profile information or the like) necessary for the communication terminal 201b to establish connection with the wireless LAN communication section 105 through communication. The profile information has been described above.

The communication control information storage section 126 stores therein an instruction set for controlling the control wireless control section 109 and the wireless LAN control section 108. The receiving buffer section 215 is used for buffering information received by the wireless LAN control section 108 and the control wireless control section 109. In a similar manner, the transmitting buffer section 219 is used for buffering information to be transmitted by using the wireless LAN control section 108 and the control wireless control section 109.

The control wireless control section 109 is a section for controlling the control-wireless communication, and includes a frame generation and transmission/reception control section 124 for controlling generation of a frame and transmission/reception of a frame. In a similar manner, the wireless LAN control section 108 is a section for controlling the wireless LAN communication, and includes a frame generation and transmission/reception control section 125. The wireless LAN communication section 105 includes a transmitting section 106, a receiving section 107, and an antenna section 113. Further, the control-wireless communication section 110 includes a transmitting section 111, a receiving section 112, and an antenna section 114. The wireless LAN startup information storage section 501 retains information for starting the wireless LAN communication section 804 of the communication terminal 201b, and transmits startup information to the control wireless control section 109, whereby the wireless LAN startup information is attached to a packet transmitted by using the control-wireless communication.

Figure 35:
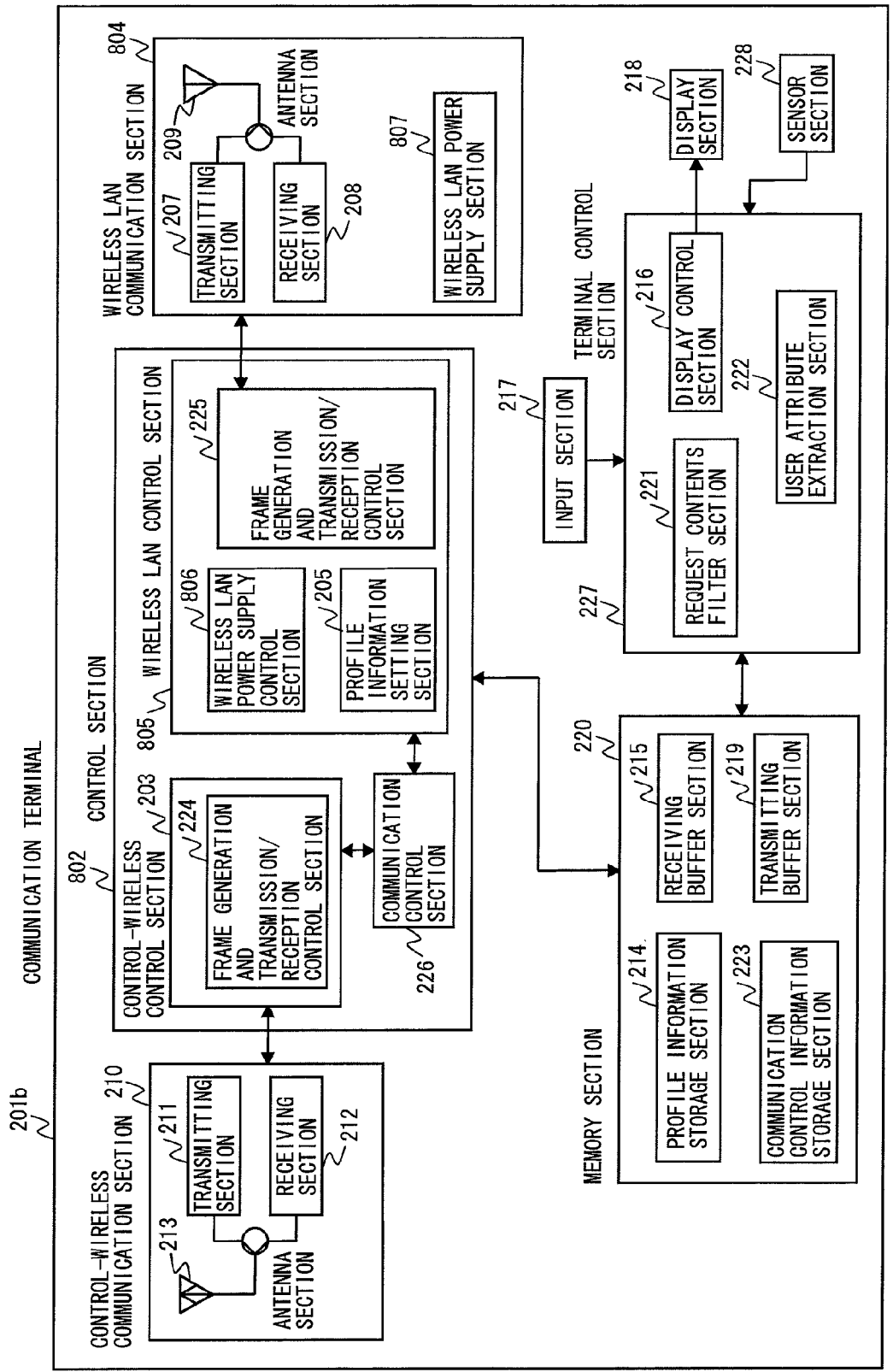
FIG. 35 is a block diagram showing an exemplary configuration of a communication terminal 201b according to embodiment 3 of the present invention.

FIG. 35 is a block diagram showing an exemplary configuration of the communication terminal 201b according to embodiment 3 of the present invention. As shown in FIG. 35, respective sections in the communication terminal 201b are connected via a system bus, and thus are able to transfer data mutually. A wireless LAN communication section 804 includes a transmitting section 207, a receiving section 208, an antenna section 209, and a wireless LAN power supply section 807. The control-wireless communication section 210 includes a transmitting section 211, a receiving section 212, and an antenna section 213.

The control section 802 includes a control-wireless control section 203, a communication control section 226, and a wireless LAN control section 805. The communication control section 226 controls the wireless LAN control section 805 and the control-wireless control section 203. The control-wireless control section 203 includes a frame generation and transmission/reception control section 224 for controlling generation and transmission/reception of a frame. The wireless LAN control section 805 includes a wireless LAN power supply control section 806, a profile information setting section 205, and a frame generation and transmission/reception control section 225. The profile information setting section 205 obtains, from a profile information storage section 214, profile information of the wireless LAN to be connected thereto, and sets connection information for its own wireless LAN communication.

The memory 220 is used for storing and buffering data of communication terminal 201b. The memory 220 includes a profile information storage section 214, a communication control information storage section 223, a receiving buffer section 215, and a transmitting buffer section 219. The profile information storage section 214 stores therein information (i.e., profile information or the like) which is received by the communication terminal 201b and is necessary for establishing connection with the integrated base station 101b. Further, the communication control information storage section 223 stores therein an instruction set necessary for the communication terminal 201b to perform communication.

The terminal control section 227 is a section for controlling terminal functions of the communication terminal 201b, and includes a request contents filter section 221, a display control section 216, and a user attribute extraction section 222. The display control section 216 controls information to be displayed on a display section 218 of the communication terminal 201b. The user attribute extraction section 222 extracts an attribute and a preference of a user, based on information from a sensor section 228. Based on a user attribute extracted by the user attribute extraction section 222, the request contents filter section 221 filters the metadata received from the integrated base station 101b to obtain contents which are considered to be highly preferred by the user of the communication terminal 201b. The request information obtained through filtering by the request contents filter section 221 is transmitted from the communication terminal 201b to the integrated base station 101b. Accordingly, the communication terminal 201b is able to receive contents that strongly correlate with the preference of the user of the terminal.

Description of the process thereafter is the same as that described in embodiment 1 or 2, and thus will be omitted.

In embodiment 3 of the present invention, the method has been described in which the integrated base station 101b transmits communication channel information and identification information to the communication terminal 201b by using control-wireless communication, so as to establish a high-speed connection with the integrated base station 101b. However, the control-wireless communication may not only transmit information for connecting to the integrated base station 101b rapidly. The integrated base station 101b may also transmit, for example, the metadata information by using the control-wireless communication. Accordingly, the communication terminal 201b is able to obtain contents information retained by the integrated base station 101b without starting the wireless LAN. Thus, when there is no information desired by the communication terminal 201b, the communication terminal 201b is able to operate without starting the wireless LAN, and consequently it is possible to reduce power consumption of the communication terminal 201b.

Further, the integrated base station 101b may transmit contents by using the control-wireless communication. That is, the integrated base station 101b retains, in the contents memory section 122, highly important information, among contents to be transmitted by using the wireless LAN, or simplified information which is obtained by reducing an amount of data of contents to be transmitted by using the wireless LAN, and transmits the information via the control-wireless communication. Accordingly, the following manner of usage may be proposed: a low function terminal including the control-wireless communication only, for example, obtains town information in an audio form, whereas a high function terminal including a wireless LAN function obtains detailed town information having guide maps, recommended spot information, and the like attached thereto by using the wireless LAN.

Embodiment 4

Embodiment 4 has a configuration based on embodiments 1 to 3 in which an antenna section 113 of an integrated base station 101 is replaced with a plurality of antennas.

Figure 36A:
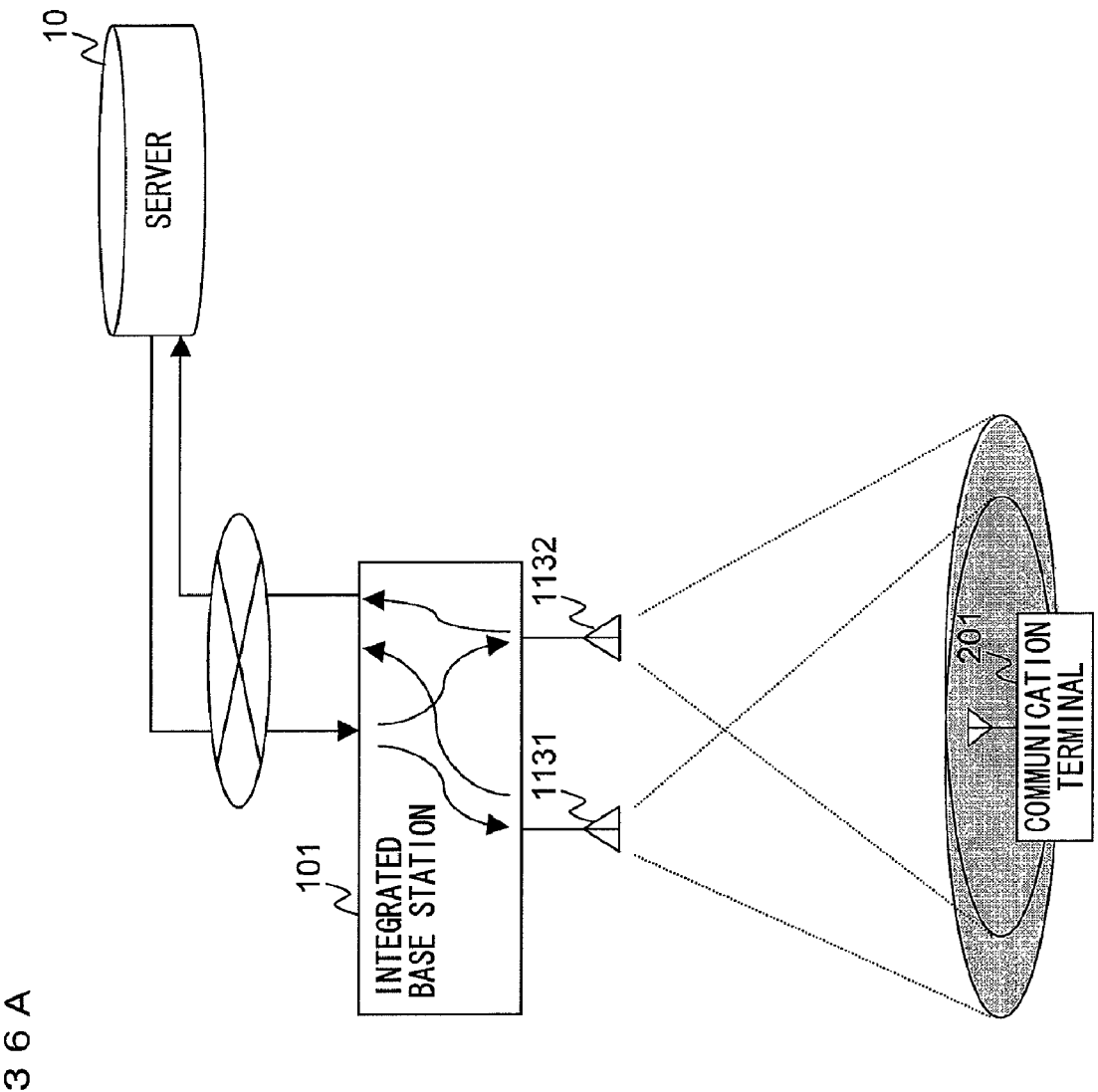
FIG. 36A is a diagram showing an exemplary overall configuration according to embodiment 1 or 2 of the present invention in which an antenna section 113 is replaced with a plurality of antennas 1131 and 1132.

FIG. 36A is a diagram showing an exemplary overall configuration in which the antenna section 113 used in embodiment 1 or 2 of present invention is replaced with a plurality of antennas. In FIG. 36A, a wireless communication system includes a server 10, the integrated base station 101, and a communication terminal 201. The integrated base station 101 includes a plurality of antenna sections 113. Here, a case will be illustrated where the antenna section 113 of the integrated base station 101 consists of antennas 1131 and 1132.

For transmission, the integrated base station 101 may use the plurality of antennas 1131 and 1132 to transmit a common piece of information from each of the antennas 1131 and 1132 in time-division. Alternatively, divided by cables or using a plurality of transmitting sections, a common piece of information may be transmitted simultaneously. For simultaneous transmission, a modulation scheme needs to be applied so as to avoid interference and deterioration of signals from different antennas. For example, preferably used are: a spread spectrum scheme; an orthogonal frequency division multiplexing (OFDM) modulation scheme; and an anti-multipath modulation scheme which includes redundancy in information symbols. Examples of the anti-multipath modulation scheme are: a PSK-VP scheme (Phase Shift Keying with Varied Phase) which has a redundant phase waveform introduced into information symbols of a differential phase shift keying; an MC-PSK scheme (Manchester Coded Phase Shift Keying); an SPSK scheme (Stepped Phase Shift Keying); and the like. Further, different redundant phase waveforms may be used for the antennas 1131 and 1132, individually.

Other examples of the anti-multipath modulation scheme are: a PSK-RZ scheme (Phase Shift Keying with Return-to-Zero) which has a redundant amplitude waveform introduced into information symbols of a differential phase shift keying; a DSK scheme (Double Shift Keying) performing a phase-shift twice depending on transmitting information; and the like. In addition, in order to avoid mutual interference and deterioration, there may be used: an FSK (Frequency Shift Keying) modulation scheme in which redundant signals are mutually superimposed, or different modulation parameters are arranged for respective antennas; an ASK (Amplitude Shift Keying) modulation scheme having a short duty cycle in which signals to be transmitted are displaced from and not superimposed mutually.

For receiving signals, the integrated base station 101 may combine signals received via the plurality of antennas 1131 and 1132, or select one having a good quality (signal intensity or the like). Alternatively, the integrated base station 101 may includes a plurality of receiving sections so as to combine signals by appropriately adjusting their phases, or to combine signals into a reception data sequence by selecting and joining a plurality of received data in data blocks without errors. The synthesis of the reception data sequence may be realized by encoding the signal on the transmission side in advance so as to detect errors.

Figure 36B:
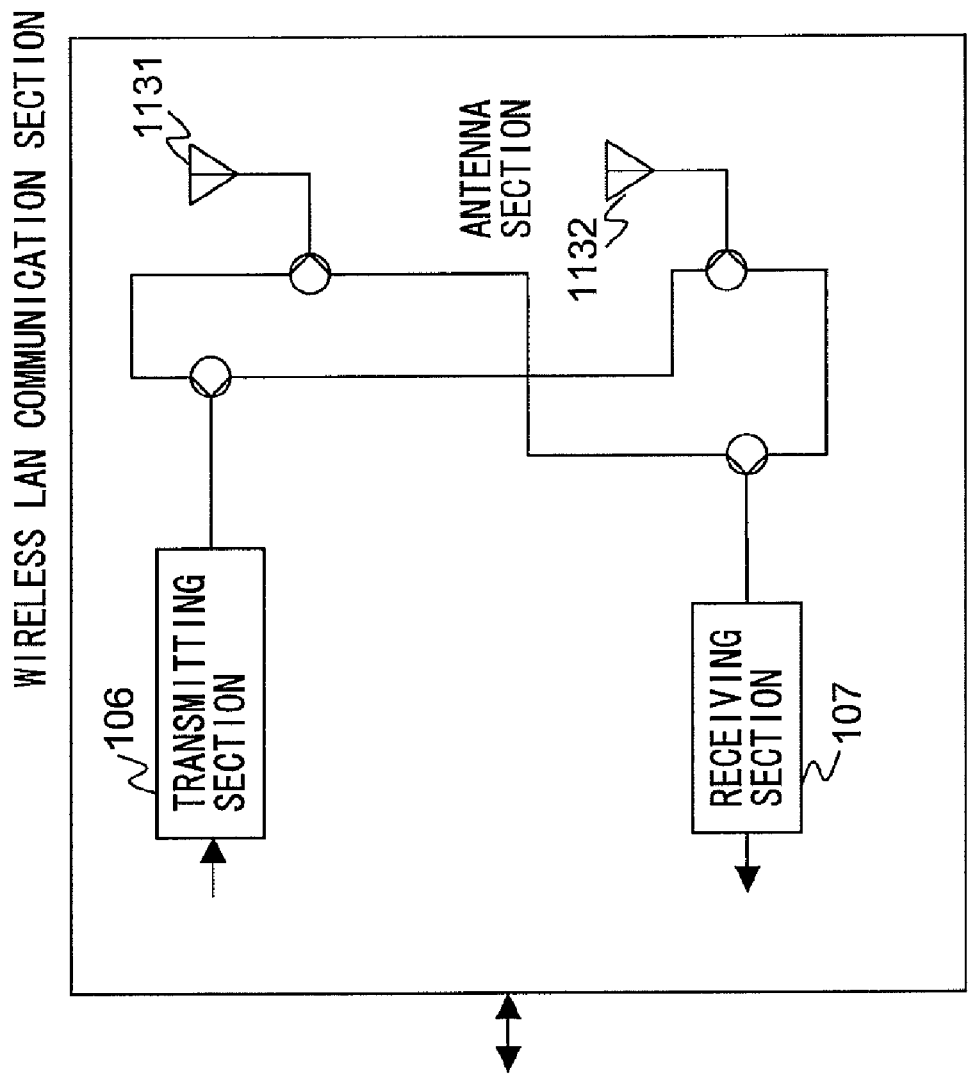
FIG. 36B is a diagram showing an exemplary configuration of a wireless LAN communication section which transmits/receives a signal using the plurality of antennas 1131 and 1132 shown in FIG. 36A.

FIG. 36B is a diagram showing an exemplary wireless LAN communication section transmitting/receiving a signal using the plurality of antennas 1131 and 1132 shown in FIG. 36A. In FIG. 36B, a signal transmitted from the transmitting section 106 is divided by cables, provided to the antennas 1131 and 1132, and then radiated, respectively. The signals received by the antennas 1131 and 1132 are combined together and inputted to a receiving section 107, and then detected and decoded. Appropriate delay which is decided depending on a modulation scheme needs to be added to the signals, but the delay insertion may be achieved by a difference between the lengths of the cables.

Figure 36C:
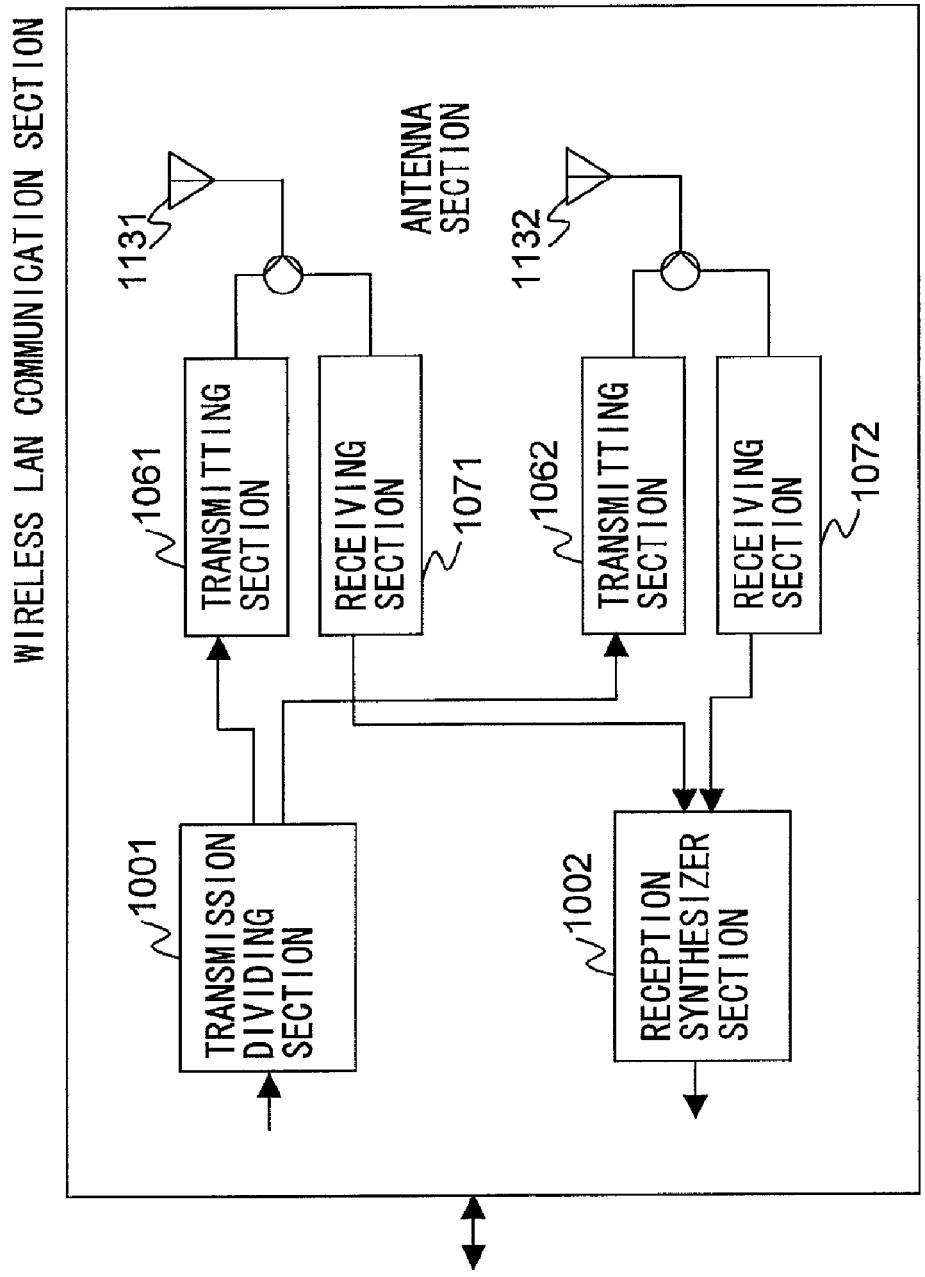
FIG. 36C is a diagram showing an exemplary configuration of the wireless LAN communication section which transmits/receives a signal using the plurality of antennas 1131 and 1132 shown in FIG. 36A.

FIG. 36C is a diagram showing an exemplary wireless LAN communication section which transmits/receives a signal using the plurality of antennas 1131 and 1132 shown in FIG. 36A. As shown in FIG. 36C, there are transmitting sections 1061 and 1062, and receiving sections 1071 and 1072 corresponding to the antennas 1131 and 1132, respectively. For transmission, a common piece of information or a transmitting signal is divided by a transmission dividing section 1001 and distributed to the transmitting sections 1061 and 1062 at appropriate timings, and are radiated via the antennas 1131 and 1132. Distribution may be made in any form such as transmission data, a transmission baseband signal, a high-frequency signal including a modulated intermediate frequency, and the like. For reception, signals received from the antennas 1131 and 1132 are detected or decoded at the receiving sections 1071 and 1072, respectively, and are combined by a reception combining section 1002 to obtain received data. For synthesis, the detected signals may be added together. Alternatively, the signals are encoded on the transmission side in advance such that errors therein can be detected, and, at the reception combining section 1002, pluralities of decoded data sequences are joined together into a received data sequence by selecting in data blocks without errors. Accordingly, the plurality of decoded data sequences are combined, and a received data sequence may be obtained.

FIG. 36D is a schematic diagram illustrating an exemplary case of an ASK modulation scheme having a short duty cycle, in which signals transmitted simultaneously are combined on a reception side. In this example, in the case of transmitting information "1", two kinds of transmission signal A for transmitting a high-frequency signal during only former half of a symbol and transmission signal B for transmitting the same during only latter half of the symbol, respectively, are transmitted via individual antennas simultaneously. In the case of transmitting the information "1" under a normal ASK modulation scheme, the high-frequency signal is transmitted during a whole one symbol, however, in this case, signals from the plurality of antennas 1131 and 1132 will be opposite to each other in phase, in some overlapped area, due to phase rotation caused by propagation delay time difference, and consequently the signals are cancelled by each other, and an area where signals cannot be received will occur. On the other hand, as in the case of the present invention, when a high-frequency signal is transmitted during only the former half of a symbol and during only the latter half of a symbol, such cancellation will not occur. That is, on the reception side, each half of the received waveforms, when each having a shorter propagation time than the symbol duration, are sequenced in a corresponding symbol. Thus, respective signals do not interfere with each other, and the information "1" and "0" can be decoded by detecting all the received power in the symbol. This example is not only applicable to wireless communication, but is also applicable to optical communication such as infrared light and the like, and an on-off keying (OOK) is applicable to the optical communication as it is. The above-described communication method is not only applicable to the wireless communication system, but is also applicable to a system of transmitting a signal using a plurality of antennas.

In the example shown in FIG. 36A, wireless areas covered by the plurality of antennas 1131 and 1132 are generally overlapped with each other. Accordingly, unstable communication, which is caused by fading due to multipath propagation derived from reflection and diffraction by surrounding objects, and caused by shadowing due to obstructions on a line of sight or a user carrying the communication terminal 201, are improved, and area boundaries are stabilized. Thus, a user can start communication promptly upon entrance to a communication area. To avoid the shadowing, the antennas 1131 and 1132 are preferably spaced at a wider distance.

Figure 37:
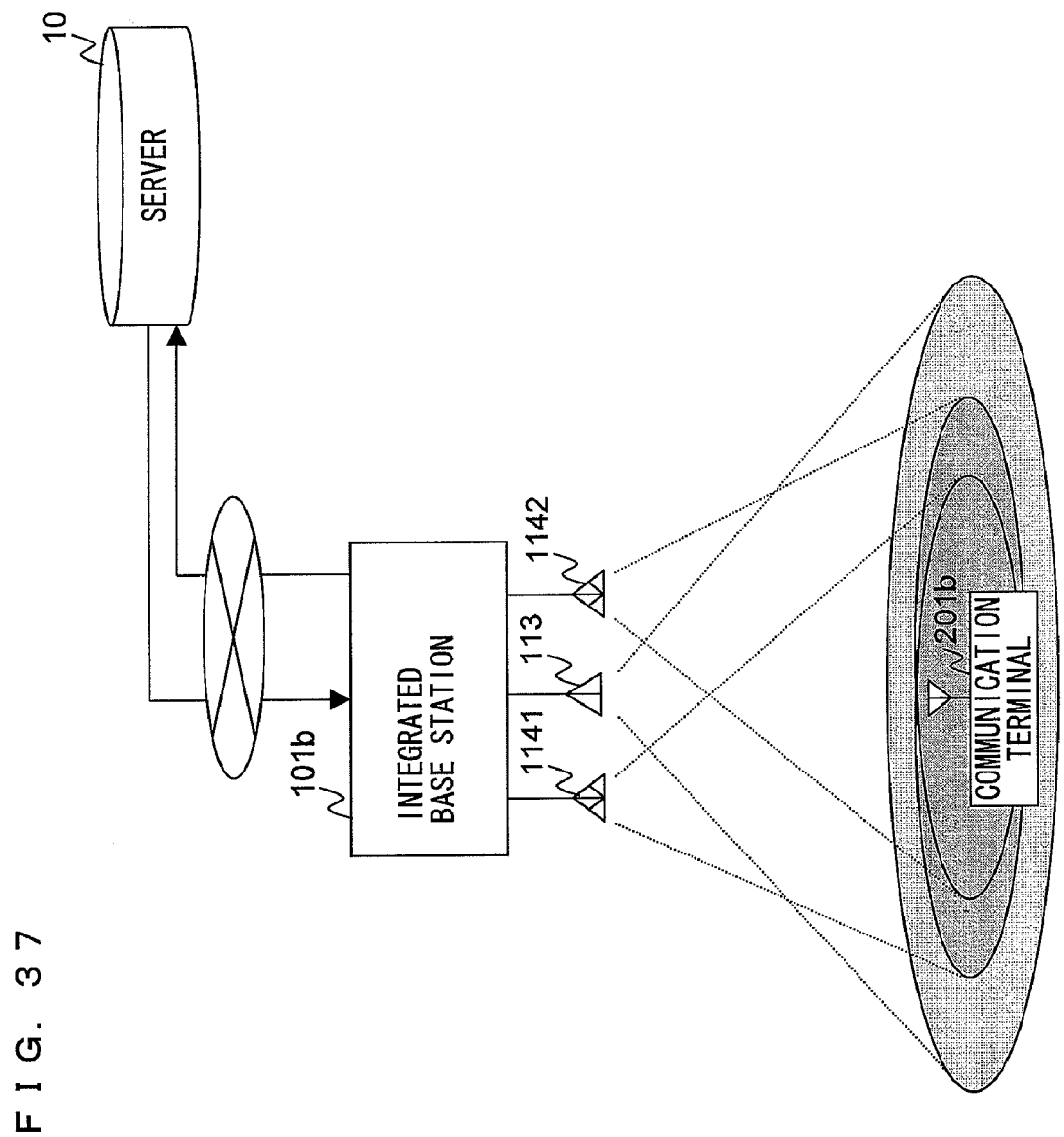
FIG. 37 is a diagram showing an exemplary overall configuration according to embodiment 3 of the present invention in which an antenna section 114 is replaced with a plurality of antennas.

FIG. 37 is a diagram showing an exemplary overall configuration according to embodiment 1 or 2 of present invention in which the antenna section 114 is replaced with a plurality of antennas. In FIG. 37, the wireless communication system includes an integrated base station 101b and a communication terminal 201b, and the integrated base station 101b includes a plurality of antenna sections 114. Here described is an example where two antennas 1141 and 1142 are used for the control-wireless communication, and an antenna 113 is used for the wireless LAN communication.

As compared to the example shown in FIG. 36A, the wireless communication system shown in FIG. 37 uses a plurality of antennas, and the plurality of antennas are used as control-wireless antennas 1141 and 1142, not as those for the wireless LAN communication. However, the plurality of antennas are used in the same manner as those in example shown FIG. 36A, and thus detailed description will be omitted. In the example shown in FIG. 37, wireless areas covered by the plurality of antennas 1141 and 1142 for the control-wireless communication are arranged so as to be overlapped with each other, in general. In addition, a wireless area covered by the antenna 113 for the wireless LAN communication is also arranged so as to be overlapped with the above wireless areas. The plurality of antennas 1141 and 1142 for the control-wireless communication reduces an effect of fading caused by multipath propagation and shadowing caused by obstructions, and thus area boundaries are stabilized. Accordingly, when the communication terminal 201b enters a wireless area, it is possible to start communication promptly, and also possible to allow the communication to be promptly switched to the wireless LAN communication. In this manner, it is possible for the integrated base station 101b and the communication terminal 201b to detect entrance of the communication terminal 201b into the wireless area of the integrated base station 101b while maintaining power saving, and to start communication promptly.

Figure 38:
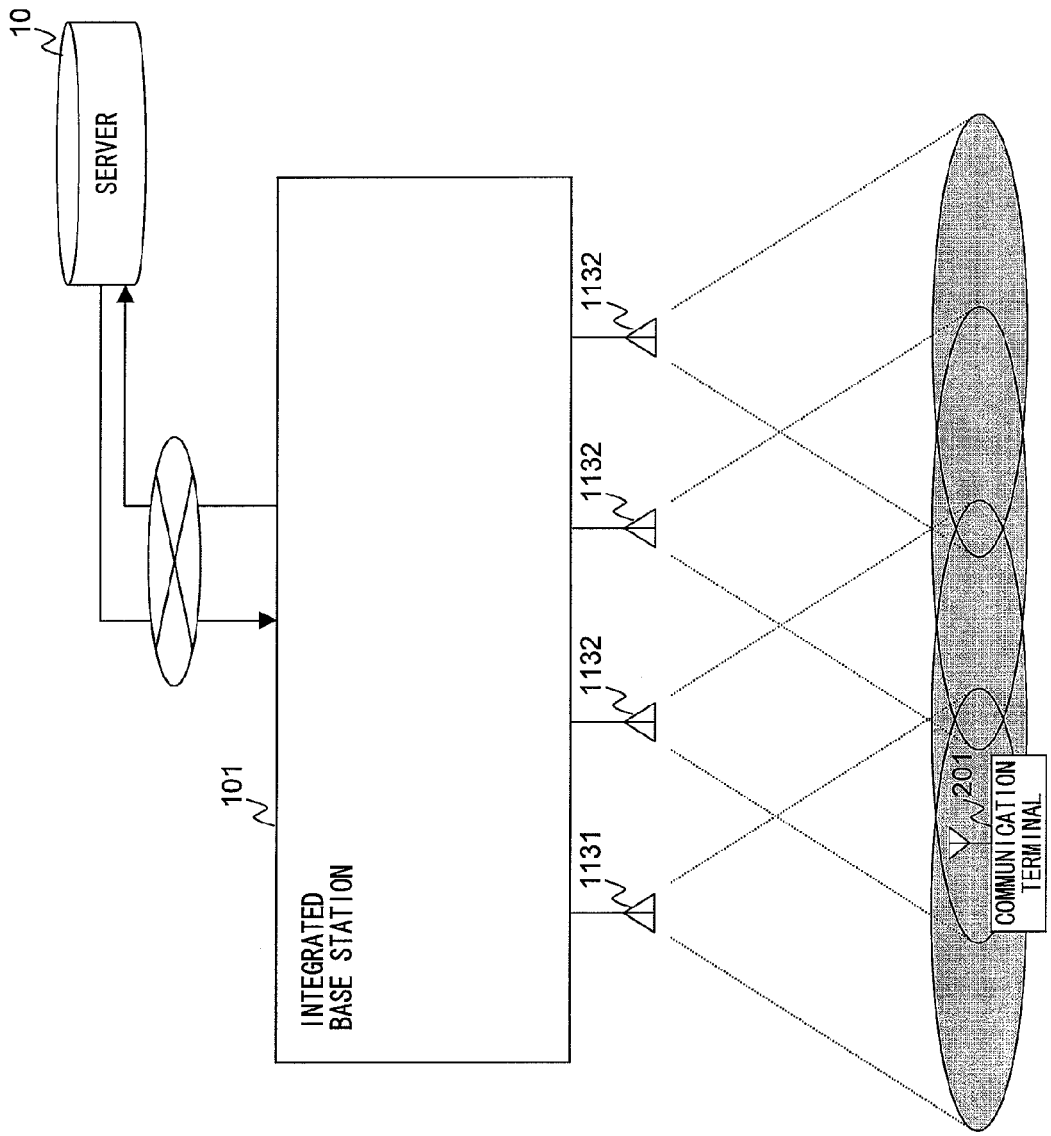
FIG. 38 is a diagram showing an exemplary overall configuration according to one of embodiments 1 to 3 of the present invention in which the antenna section is replaced with a plurality of antennas.

FIG. 38 is a diagram showing an exemplary overall configuration according to one of embodiments 1 to 3 of the present invention in which the antenna section is replaced with a plurality of antennas. In FIG. 38, a wireless communication system includes the integrated base station 101 and the communication terminal 201, and the integrated base station 101 includes a plurality of antenna sections. Here, described is an exemplary case where, as the antenna sections, four antennas 1131, 1132, 1133, and 1134 are provided to the integrated base station 101. The antenna sections may be for the wireless LAN communication, or may be for the control-wireless communication. In the case where the antenna sections are for the control-wireless communication, one or more antennas for the wireless LAN communication are needed additionally for covering one or more wireless areas which include the wireless areas covered by the plurality of antennas for the control-wireless communication. However, the one or more antennas are omitted here.

The plurality of antennas is used in the same manner as described above, and thus description thereof will be omitted. In the example shown in FIG. 38, the wireless areas covered by the plurality of antennas 1131, 1132, 1133, and 1134 are arranged linearly or planarly in a manner to be partially overlapped with one another. Accordingly, the wireless areas are configured artificially, and communication can be started promptly in such connected areas. When a plurality of antennas are used for the control-wireless communication, the wireless LAN communication areas are arranged so as to be included in the connected areas for the control-wireless communication, whereby communication using the control-wireless communication is started before the communication terminal 201 enters the wireless LAN area, and the communication can be promptly switched to the wireless LAN communication.

Figure 39A:
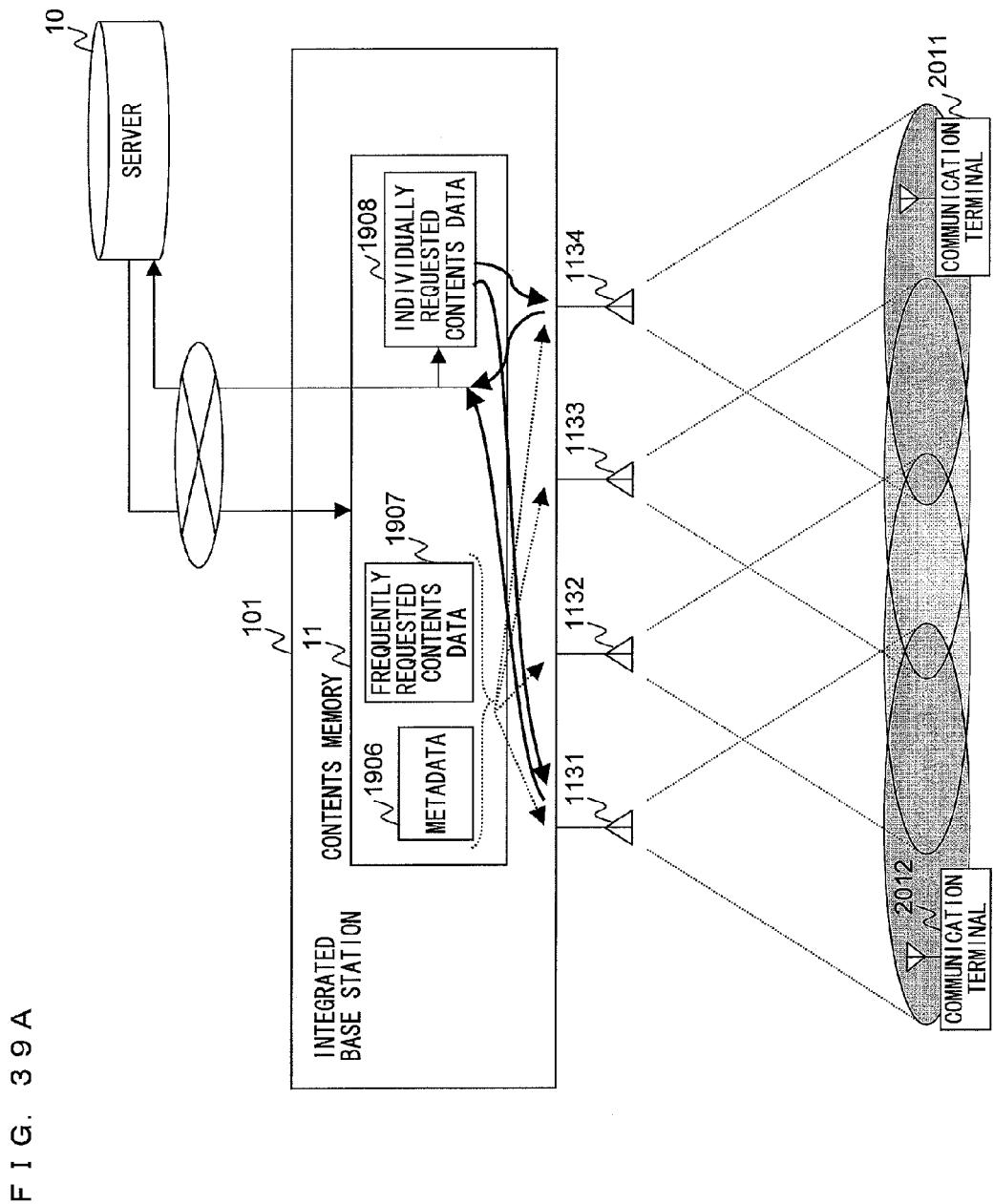
FIG. 39A is a diagram showing an exemplary overall configuration according to one of embodiments 1 to 3 of the present invention in which the antenna section is replaced with a plurality of antennas.

FIG. 39A is a diagram showing an exemplary overall configuration according to one of embodiments 1 to 3 of the present invention in which the antenna section is replaced with a plurality of antennas. In FIG. 39A, a wireless communication system includes the integrated base station 101 and a communication terminal 2011 or 2012, and the integrated base station 101 includes a plurality of antenna sections. Here, described is an exemplary case where, as the antenna sections, the four antennas 1131, 1132, 1133, and 1134 are provided to the integrated base station 101. In this case as well, the antenna sections may be used for the wireless LAN communication, or may be used for the control-wireless communication.

In the case where the antenna sections are for the control-wireless communication, one or more antennas for the wireless LAN communication are needed for covering one or more wireless areas which include the wireless areas covered by the plurality of antennas for the control-wireless communication. However, the one or more antennas are omitted here. The integrated base station 101 has a contents memory 11 including therein metadata 1906, frequently requested contents data 1907, and individually requested contents data 1908.

Figure 39B:
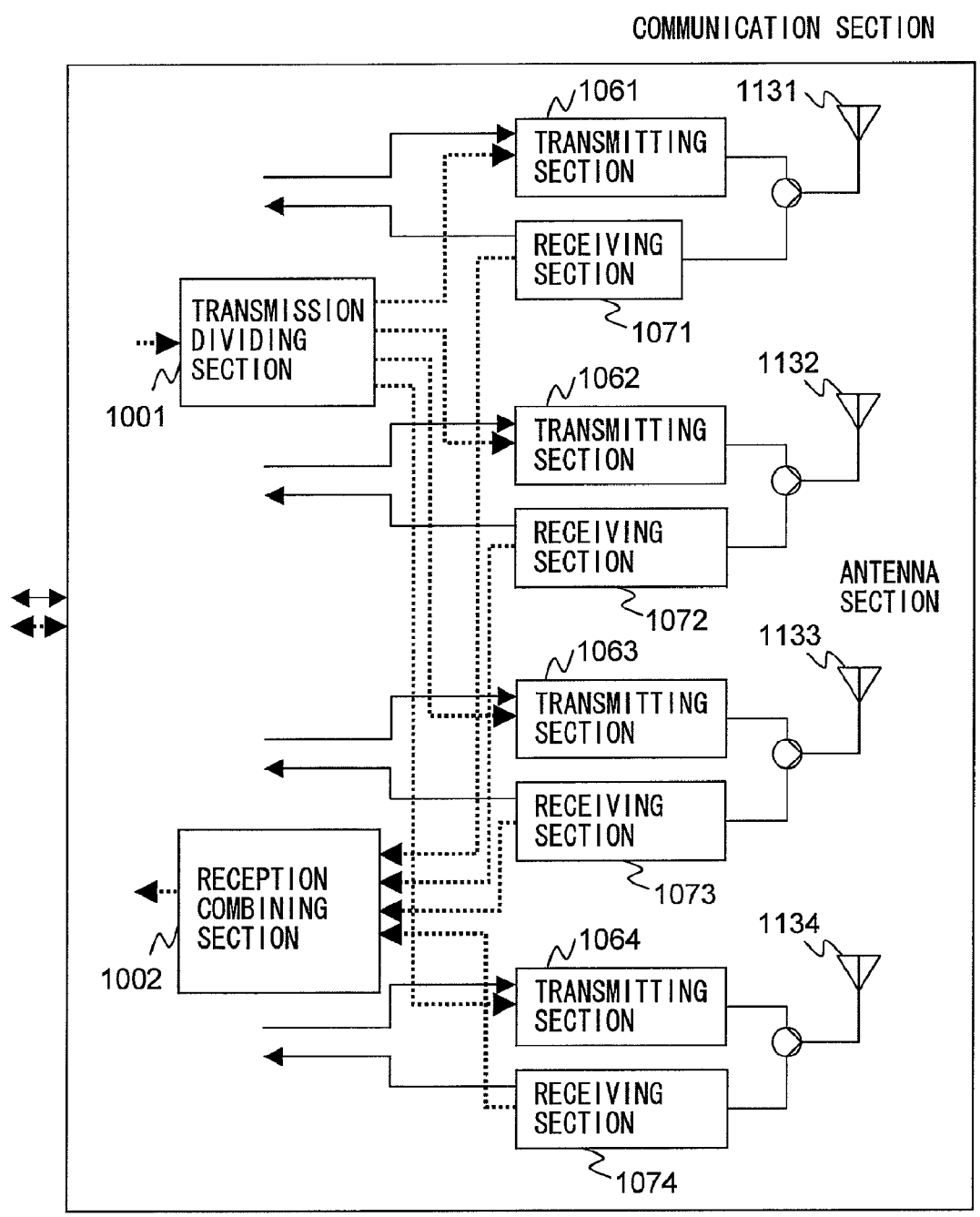
FIG. 39B is a diagram showing an exemplary configuration of a communication section which transmits/receives a signal using a plurality of antennas shown in FIG. 39A.

FIG. 39B is a diagram showing an exemplary configuration of a communication section transmitting/receiving a signal using the plurality of antennas shown in FIG. 39A. As shown in FIG. 39B, the communication section includes transmitting sections 1061, 1062, 1063, and 1064, and receiving sections 1071, 1072, 1073, and 1074, which correspond to antennas 1131, 1132, 1133, and 1134, respectively. Depending on the type of data to be transmitted/received, information can be transmitted/received to/from the four antennas simultaneously via a transmission dividing section 1001 and a reception combining section 1002. Alternatively, different pieces of information can be transmitted/received to/from the antennas, individually.

The plurality of antennas is used in the same manner as described above, and thus description thereof will be omitted. In the example shown in FIG. 39A, the wireless areas covered by the plurality of antennas 1131, 1132, 1133, and 1134 are arranged linearly or planarly in a manner to be at least partially overlapped with one another. Starting of communication, broadcasting of the metadata 1096, and broadcasting of the frequently requested contents data 1907 are performed in the same manner as those shown in FIG. 38, and thus description thereof will be omitted. The individually requested contents data 1908 is transmitted in a different manner. That is, a request for the data is made from an antenna (the antenna 1134 or 1131, in this case) of the communication terminal 2011 or 2012, and corresponding individually requested contents data is returned from the same individual antenna.

In this manner, the metadata 1906 and the frequently requested contents data 1907 which are common to all terminals are transmitted (or received) via all the antennas 1131, 1132, 1133, and 1134, whereas the individually requested contents data 1908 which is requested by individual communication terminals is transmitted/received via individual antennas independently of one another. As a result, it is possible to achieve superior response and throughput as a whole.

Further, process procedures performed by the respective function blocks described in the respective embodiments of the present invention may be realized by a CPU interpreting and executing predetermined program data capable of executing the above-described process procedures stored on a storage device (a ROM, a RAM, a hard disc, and the like). In this case, the program data may be introduced into the storage device via a storage medium, or may be directly executed on the storage medium. Here, the storage medium includes: a semiconductor memory such as a ROM, a RAM, a flash memory and the like; a magnetic disc memory such as a flexible disc, hard disc, and the like; an optical disc memory such as a CD-ROM, a DVD, a BD, and the like; and a memory card and the like. Further, the storage medium is a notion including a communication medium such as a phone line, a carrier path, and the like.

Further, each of the respective function blocks described in the respective embodiments of the present invention is typically executed as an LSI, an integrated circuit. The function blocks may be each provided in a chip form, or some or all of the function blocks may be provided in a chip form. The LSI may be referred to as an IC, a system LSI, a super LSI, an ultra LSI depending on the degree of integration.

Further, the method of integration is not limited to the LSI, and may be realized by a dedicated circuit or a general purpose processor. Alternatively, an FPGA (Field Programmable Gate Array) which is programmable after manufacturing the LSI, or a reconfigurable processor enabling reconfiguration of connection or setting of a circuit cell in the LSI may be used. Still alternatively, a configuration may be used in which, a hardware resource includes a processor, a memory, and the like, and the processor executes and controls a control program stored in a ROM.

Still further, in the case where another integration technology replacing the LSI becomes available due to an improvement of a semiconductor technology or due to emergence of another technology derived therefrom, the function blocks may be integrated using such a new technology. For example, biotechnology may be applied.

The present invention is useful, for example, as a technology which allows a user to receive a large amount of communication contents and to display contents desired by the user when his/her communication terminal passes through a communication area of an access point.

While the invention has been described in detail, the foregoing description is in all aspects illustrative and not restrictive. It is understood that numerous other modifications and variations can be devised without departing from the scope of the invention.

What is claimed is:

1. A wireless base station connected to a server that distributes contents and connected to at least one wireless communication terminal, the wireless base station comprising: an external communication control section that controls communication with the server; a contents memory section that stores at least a part of the contents received from the server; an access restriction section that monitors a type of connection with the at least one wireless communication terminal, and for restricting access for connection from the at least one wireless communication terminal to the server or to the wireless base station; a wireless communication section that communicates with the at least one wireless communication terminal in accordance with a predetermined communication method; and a control section that controls the wireless communication section, wherein the control section controls the wireless communication section, and establishes connection with the at least one wireless communication terminal by using a first connection which does not require an authentication procedure for the connection with the at least one wireless communication terminal, or by using a second connection which requires the authentication procedure for connection with the at least one wireless communication terminal, the access restriction section permits access from the at least one wireless communication terminal to the contents memory section and prohibits access from the at least one wireless communication terminal to the server when the type of connection with the at least one wireless communication terminal is the first connection, and permits access from the at least one wireless communication terminal to both of the contents memory section and the server when the type of connection with the at least one wireless communication terminal is the second connection the contents memory section stores therein frequently requested contents data that is frequently requested from the at least one wireless communication terminal, and individually requested contents data that is less frequently requested as compared to the frequently requested contents data, an interval of the first connection includes a frequently requested contents data broadcasting interval and an individual contents data broadcasting interval, and the control section controls the wireless communication section, and collectively broadcasts, to the at least one wireless communication terminal, the frequently requested contents data in the frequently requested contents data broadcasting interval, and transmits the individually requested contents data, which is requested by the at least one wireless communication terminal, in the individual contents data broadcasting interval.

2. The wireless base station according to claim 1, wherein
the contents memory section further stores therein metadata relating to the frequently requested contents data and to the individually requested contents data, and
the control section controls the wireless communication section, transmits the metadata to the at least one wireless communication terminal before the first connection is established, and receives a contents data request packet from the at least one wireless communication terminal in the interval of the first connection.

3. The wireless base station according to claim 1, wherein the contents memory section interchanges the frequently requested contents data and the individually requested contents data with each other in accordance with frequency of requests from the at least one wireless communication terminal.

4. The wireless base station according to claim 1, wherein the control section omits the authentication procedure in the predetermined communication method when using the first connection for connection with the at least one wireless communication terminal, and executes the authentication procedure in the predetermined communication method when using the second connection for connection with the at least one wireless communication terminal.

5. The wireless base station according to claim 1, wherein the contents memory section stores therein contents that are not subjected to access restriction.

6. The wireless base station according to claim 1, wherein
the wireless communication section includes:
a first wireless communication section that communicates with the at least one wireless communication terminal in accordance with a first wireless communication method; and
a second wireless communication section that communicates with the at least one wireless communication terminal in accordance with a second wireless communication method, and
prior to the first wireless communication section starting communication with the at least one wireless communication terminal, the control section controls the second wireless communication section, and transmits, to the at least one wireless communication terminal, profile information that is necessary for the first wireless communication section to communicate with the at least one wireless communication terminal.

7. The wireless base station according to claim 6, further comprising at least one antenna for the first wireless communication section and a plurality of antennas for the second wireless communication section, wherein
a wireless area covered by the at least one antenna for the first wireless communication section and wireless areas covered by the plurality of antennas for the second wireless communication section are arranged so as to be at least partially overlapped with one another.

8. The wireless base station according to claim 6, further comprising a plurality of antennas for the first wireless communication section and at least one antenna for the second wireless communication section, wherein
wireless areas covered by the plurality of antennas for the first wireless communication section and a wireless area covered by the at least one antenna for the second wireless communication section are arranged so as to be at least partially overlapped with one another.

9. A wireless base station connected to a server that distributes contents and connected to at least one wireless communication terminal, the wireless base station comprising: an external communication control section that controls communication with the server; a contents memory section that stores at least a part of the contents received from the server; an access restriction section that monitors a type of connection with the at least one wireless communication terminal, and for restricting access for connection from the at least one wireless communication terminal to the server or to the wireless base station; a wireless communication section that communicates with the at least one wireless communication terminal in accordance with a predetermined communication method; and a control section that controls the wireless communication section, wherein the control section controls the wireless communication section, and establishes connection with the at least one wireless communication terminal by using a first connection which does not require an authentication procedure for the connection with the at least one wireless communication terminal, or by using a second connection which requires the authentication procedure for connection with the at least one wireless communication terminal, the access restriction section permits access from the at least one wireless communication terminal to the contents memory section and prohibits access from the at least one wireless communication terminal to the server when the type of connection with the at least one wireless communication terminal is the first connection, and permits access from the at least one wireless communication terminal to both of the contents memory section and the server when the type of connection with the at least one wireless communication terminal is the second connection, the contents memory section stores therein frequently requested contents data that is frequently requested from the at least one wireless communication terminal, and individually requested contents data that is less frequently requested as compared to the frequently requested contents data, and the control section controls the wireless communication section, and collectively broadcasts, to the at least one wireless communication terminal, the frequently requested contents data before the first connection is established, and transmits the individually requested contents data, which is requested by the at least one wireless communication terminal, in4tae an interval of the first connection.

10. The wireless base station according to claim 9, wherein
  the contents memory section further stores therein metadata relating to the frequently requested contents data and the individually requested contents data, and
  the control section controls the wireless communication section, transmits the metadata to the at least one wireless communication terminal before collecting together and broadcasting, to the at least one wireless communication terminal, the frequently requested contents data, and receives a contents data request packet from the at least one wireless communication terminal in the interval of the first connection.

11. The wireless base station according to claim 9, wherein the contents memory section interchanges the frequently requested contents data and the individually requested contents data with each other in accordance with frequency of requests from the at least one wireless communication terminal.

12. A wireless base station connected to a server that distributes contents and connected to at least one wireless communication terminal, the wireless base station comprising: an external communication control section that controls communication with the server; a contents memory section that stores at least a part of the contents received from the server; an access restriction section that monitors a type of connection with the at least one wireless communication terminal, and for restricting access for connection from the at least one wireless communication terminal to the server or to the wireless base station; a wireless communications section that communicates with the at least one wireless communication terminal in accordance with a predetermined communication method; a control section that controls the wireless communication section; and a plurality of antennas, wherein the control section controls the wireless communication section, and establishes connection with the at least one wireless communication terminal by using a first connection which does not requires an authentication procedure for the connection with the at least one wireless communication terminal, or by using a second connection which requires the authentication procedure for connection with the at least one wireless communication terminal, the access restriction section permits access from the at least one wireless communication terminal to the contents memory section and prohibits access from the at least one wireless communication terminal to the server when the type of connection with the at least one wireless communication terminal is the first connection, and permits access from the at least one wireless communication terminal to both of the contents memory section and the server when the type of connection with the at least one communication terminal is the second connection, a plurality of antenna, wherein wireless areas of a plurality of wireless areas covered by the plurality of antennas are arranged so as to be at least partially overlapped with one another, the contents memory section stores therein frequently requested contents data that is frequently requested by the at least one wireless communication terminal, and individually requested contents data that is less frequently requested as compared to the frequently requested contents data, and wherein contents are transmitted transmission to the at least one wireless communication terminal, the wireless communication section: transmits the frequently requested contents data to the at least one wireless communication terminal from the plurality of antennas; and
transmits the individually requested contents data to the at least one wireless communication terminal via an antenna the plurality of antennas, the antenna having received a request from the at least one wireless communication terminal.

13. A wireless communication terminal connected, via a wireless base station, to a server that distributes contents, the wireless communication terminal comprising: a wireless communication section that communicates with the wireless base station in accordance with a predetermined communication method; a control section that controls the wireless communication section; and a terminal control section that controls transmission of information regarding a contents request to the wireless base station, wherein the control section controls the wireless communication section, and establishes connection with the wireless base station by using a first connection which does not require an authentication procedure for the connection with the wireless base station, or by using a second connection which requires the authentication procedure for connection with the wireless base station, and after receiving from the wireless base station, from among contents data stored in a contents memory section of the wireless base station, metadata relating to frequently requested contents data that is frequently requested and individually requested contents data that is less frequently requested as compared to the frequently requested contents data, (i) contents data of which reception is desired is determined from the received metadata, and (ii) information regarding a contents request specifying the determined contents data by means of a tag is transmitted to the wireless base station.

14. The wireless communication terminal according to claim 13, wherein
  an interval of the first connection with the wireless base station includes a frequently requested contents data broadcasting interval and an individual contents data broadcasting interval, and
  when the contents data of which reception is desired is to be received in the frequently requested contents data broadcasting interval, an identification flag for identifying the contents data of which reception is desired is set for the information regarding the contents request.

15. The wireless communication terminal according to claim 13, wherein
- an interval of the first connection with the wireless base station includes a frequently requested contents data broadcasting interval and an individual contents data broadcasting interval, and
- in the individual contents data broadcasting interval, information regarding a contents request for requesting contents data that is not broadcasted in the frequently requested contents data broadcasting interval is transmitted to the wireless base station and the requested contents data is received.

16. A method implemented by a wireless base station connected to a server that distributes contents and connected to a wireless communication terminal, the wireless base station comprising a contents memory section that stores therein at least a part of the contents received from the server, the method comprising: an external communication controlling step of controlling communication with the server; an access restricting step of monitoring a type of connection with the wireless communication terminal, and of restricting access for connection from the wireless communication terminal to the server or to the wireless base station; and a wireless communication controlling step of controlling communication with the wireless communication terminal, wherein the wireless communication controlling step establishes connection with the wireless communication terminal by using a first connection which does not require an authentication procedure for the connection with the wireless communication terminal, or by using a second connection which requires the authentication procedure for connection with the wireless communication terminal, the access restricting step permits access from the wireless communication terminal to the contents memory section and prohibits access from the wireless communication terminal to the server when the type of connection with the wireless communication terminal is the first connection, and permits access from the wireless communication terminal to both of the contents memory section and the server when the type of connection with the wireless communication terminal is the second connection the contents memory section of the wireless base station stores therein frequently requested contents data that is frequently requested by the wireless communication terminal, and individually requested contents data that is less frequently requested as compared to the frequently requested contents data, and a step of collectively broadcasting the frequently requested contents data to the wireless communication terminal, and a step of transmitting the individually requested contents data, which is requested by the wireless communication terminal, are performed in an interval of the first connection.

17. A method implemented by a wireless communication terminal connected to a server distributing contents via a wireless base station, the method comprising: a wireless communication step of performing communication with the wireless base station in accordance with a predetermined communication method; and a terminal control step of controlling transmission of information regarding contents request to the wireless base station, wherein the wireless communication step establishes connection with the wireless base station by using a first connection which does not require an authentication procedure for the connection with the wireless base station or by using a second connection which requires the authentication procedure for connection with the wireless base station and after receiving from the wireless base station, from among contents data stored in a contents memory section of the wireless base station, metadata relating to frequently requested contents data that is frequently requested by wireless communication terminals communicating with the wireless base station and individually requested contents data that is less frequently requested as compared to the frequently requested contents data, (i) contents data of which reception is desired is determined from the received metadata and (ii) information regarding a contents request specifying the determined contents data by means of a tag is transmitted to the wireless base station, as the terminal control step.

* * * * *

UNITED STATES PATENT AND TRADEMARK OFFICE
CERTIFICATE OF CORRECTION

Page 1 of 1

PATENT NO. : 8,345,648 B2
APPLICATION NO. : 12/504806
DATED : January 1, 2013
INVENTOR(S) : Tsutomu Mukai It is certified that error appears in the above-identified patent and that said Letters Patent is hereby corrected as shown below:

In the Claims:

In column 31, lines 31-32 (claim 1), "which requires the authentication procedure for connection" should read --which requires the authentication procedure for the connection--.

In column 33, lines 7-8 (claim 9), "which requires the authentication procedure for connection" should read --which requires the authentication procedure for the connection--.

In column 33, lines 66-67 (claim 12), "does not requires an authentication procedure for the connection" should read --does not require an authentication procedure for the connection--.

In column 34, line 2 (claim 12), "procedure for connection with the at least one wireless" should read --procedure for the connection with at least one wireless--.

In column 34, line 13 (claim 12), "of antenna, wherein wireless areas of a plurality of wireless" should read --antennas, wherein wireless areas of a plurality of wireless--.

In column 34, line 28 (claim 12), "least one wireless communication terminal via an antenna the" should read --least one wireless communication terminal via an antenna of the--.

In column 34, line 45 (claim 13), "procedure for connection with the wireless base station" should read --procedure for the connection with the wireless base station--.

In column 35, line 31 (claim 16), "authentication procedure for connection with the wireless" should read --authentication procedure for the connection with the wireless--.

In column 36, line 25 (claim 17), "authentication procedure for connection with the wireless" should read --authentication procedure for the connection with the wireless--.

Signed and Sealed this
Fourteenth Day of May, 2013

Teresa Stanek Rea
*Acting Director of the United States Patent and Trademark Office*